United States Patent [19]

Tani et al.

[11] Patent Number: 5,793,031
[45] Date of Patent: Aug. 11, 1998

[54] TWO-DIMENSIONAL ENCODED SYMBOL READING DEVICE WITH PLURAL OPERATING MODES

[75] Inventors: Nobuhiro Tani; Harumi Aoki; Keiji Sawanobori, all of Tokyo, Japan

[73] Assignee: Asahi Kogaku Kogyo Kabushiki Kaisha, Tokyo, Japan

[21] Appl. No.: 560,964

[22] Filed: Nov. 20, 1995

Related U.S. Application Data

[63] Continuation-in-part of Ser. No. 405,027, Mar. 16, 1995, abandoned, and a continuation-in-part of Ser. No. 218,227, Mar. 25, 1994, abandoned.

[30] Foreign Application Priority Data

| Mar. 25, 1993 | [JP] | Japan | 5-90620 |
| Mar. 25, 1993 | [JP] | Japan | 5-90621 |
| Mar. 25, 1993 | [JP] | Japan | 5-90622 |
| Mar. 25, 1993 | [JP] | Japan | 5-90623 |
| Mar. 25, 1993 | [JP] | Japan | 5-90624 |
| Mar. 25, 1993 | [JP] | Japan | 5-90625 |
| Mar. 16, 1994 | [JP] | Japan | 6-71575 |

[51] Int. Cl.$^6$ ............................................. G06K 7/10
[52] U.S. Cl. ........................................ 235/462; 235/454
[58] Field of Search ............................. 235/472, 462, 235/454, 455

[56] References Cited

U.S. PATENT DOCUMENTS

| 4,349,730 | 9/1982 | Pfeifer et al. | 235/472 |
| 4,703,364 | 10/1987 | Asada et al. | 358/285 |
| 4,817,185 | 3/1989 | Yamaguchi et al. | 382/59 |
| 4,974,260 | 11/1990 | Rudak | 382/57 |
| 4,984,285 | 1/1991 | Kano et al. | 382/50 |
| 5,294,783 | 3/1994 | Hammond, Jr. et al. | 235/462 |
| 5,315,097 | 5/1994 | Collins Jr, et al. | 235/472 |
| 5,365,048 | 11/1994 | Komiya | 235/462 |
| 5,396,053 | 3/1995 | Swartz et al. | 235/462 |
| 5,414,251 | 5/1995 | Durbin | 235/462 |

FOREIGN PATENT DOCUMENTS

| 6-333068 | 12/1994 | Japan . |
| 6-333075 | 12/1994 | Japan . |
| 6-333076 | 12/1994 | Japan . |
| 6-333077 | 12/1994 | Japan . |
| 6-333078 | 12/1994 | Japan . |
| 6-333079 | 12/1994 | Japan . |
| 7-306908 | 11/1995 | Japan . |

*Primary Examiner*—Donald T. Hajec
*Assistant Examiner*—Karl Frech
*Attorney, Agent, or Firm*—Greenblum & Bernstein P.L.C.

[57] ABSTRACT

An encoded symbol reader for reading and decoding an image of an encoded symbol is capable of operating in three modes and has a CCD, a display, and a light source. In each mode, the reading of an encoded symbol is initiated by a trigger switch. In the first mode, the CCD, display and light source are continuously driven and remain in an ON state. In the second mode, the CCD, display and light source are turned OFF when a decoding operation is completed after the trigger switch is released. In the third mode, the CCD, display, light source are turned OFF after a predetermined period has elapsed after the decoding operation is completed and the trigger switch is released. While operating in the third mode, during the predetermined interval, the re-reading of another symbol can be immediately executed without having to wait for the components to warm up.

31 Claims, 41 Drawing Sheets

Fig. 20

| ANALOG SIGNAL LEVEL (V) | | | | | | | | | | | | | | | | |
|---|---|---|---|---|---|---|---|---|---|---|---|---|---|---|---|---|
| | 0 | 1/3 | 2/3 | 1 | 4/3 | 5/3 | 2 | 7/3 | 8/3 | 3 | 10/3 | 11/3 | 4 | 13/3 | 14/3 | 5 |
| D1 | ○ | — | ○ | — | ○ | — | ○ | — | ○ | — | ○ | — | ○ | — | ○ | — |
| D2 | ○ | ○ | — | — | ○ | ○ | — | — | ○ | ○ | — | — | ○ | ○ | — | — |
| D3 | ○ | ○ | ○ | ○ | — | — | — | — | ○ | ○ | ○ | ○ | — | — | — | — |
| D4 | ○ | ○ | ○ | ○ | ○ | ○ | ○ | ○ | — | — | — | — | — | — | — | — |

Fig. 21

|    | A1 | A2 |
|----|----|----|
| P1 | 0  | 1  |

Fig. 22

|    | A1 | A2 | A3 |
|----|----|----|----|
| P1 | 0  | 1  | 0  |
| P2 | 0  | 0  | 1  |

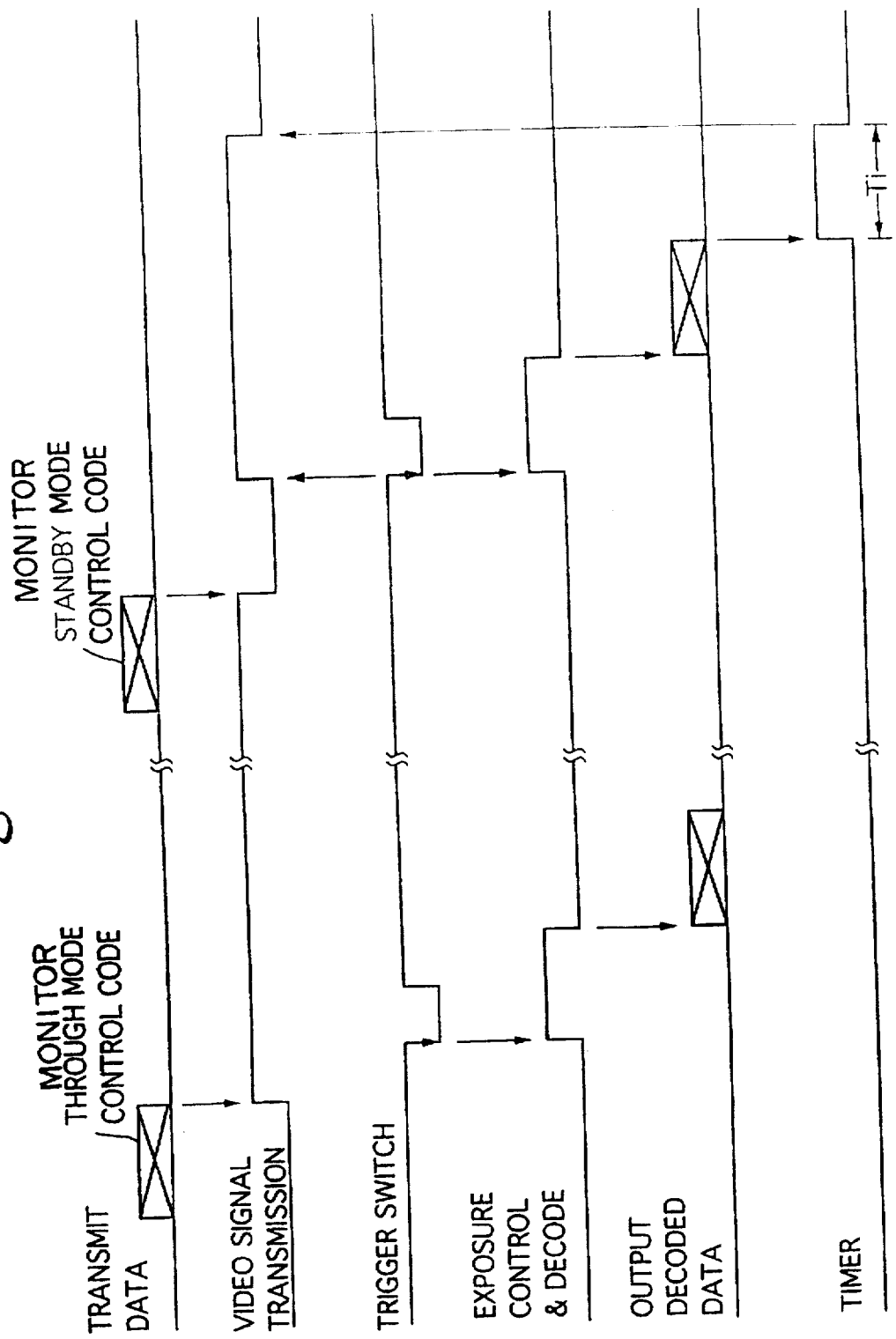

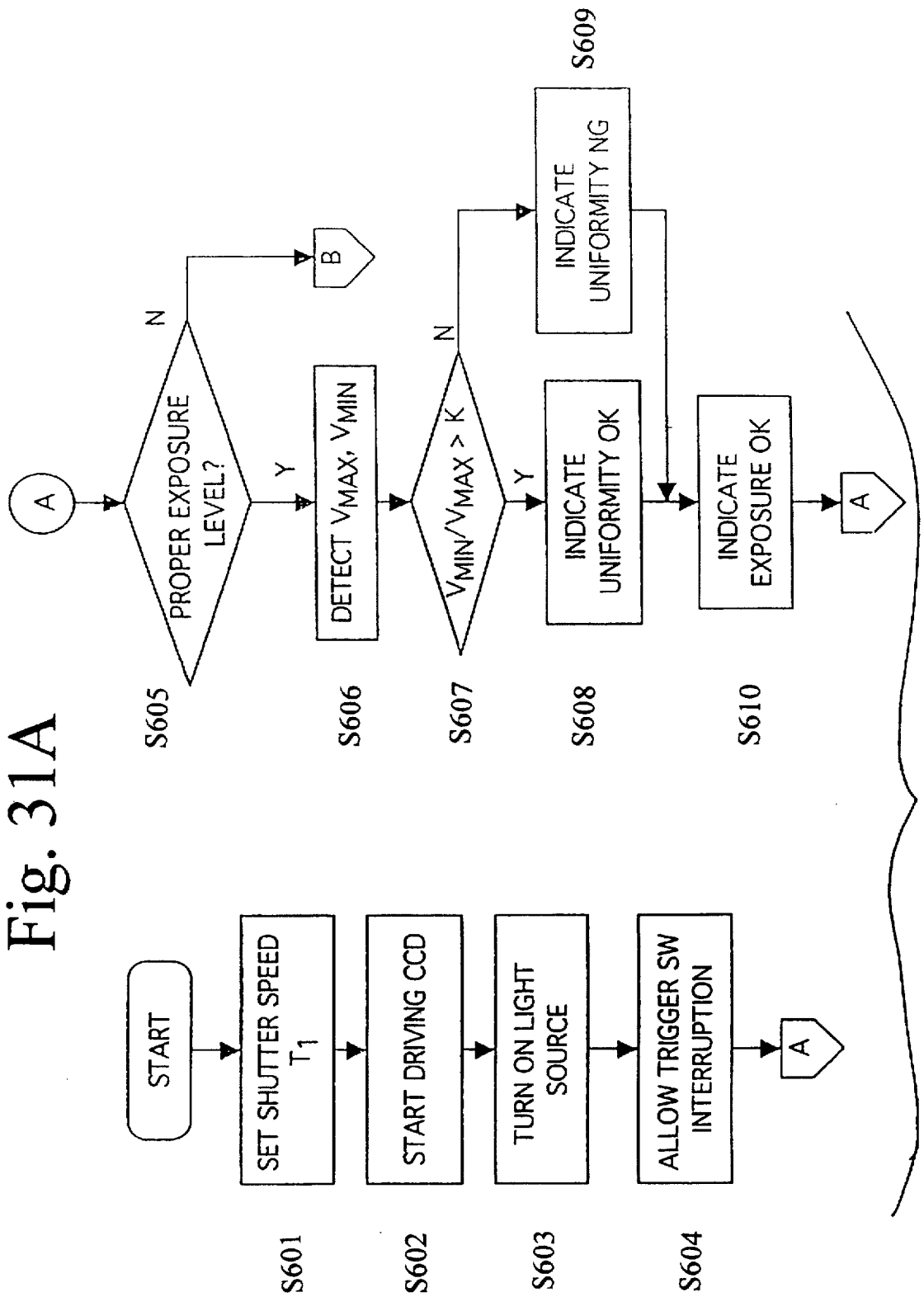

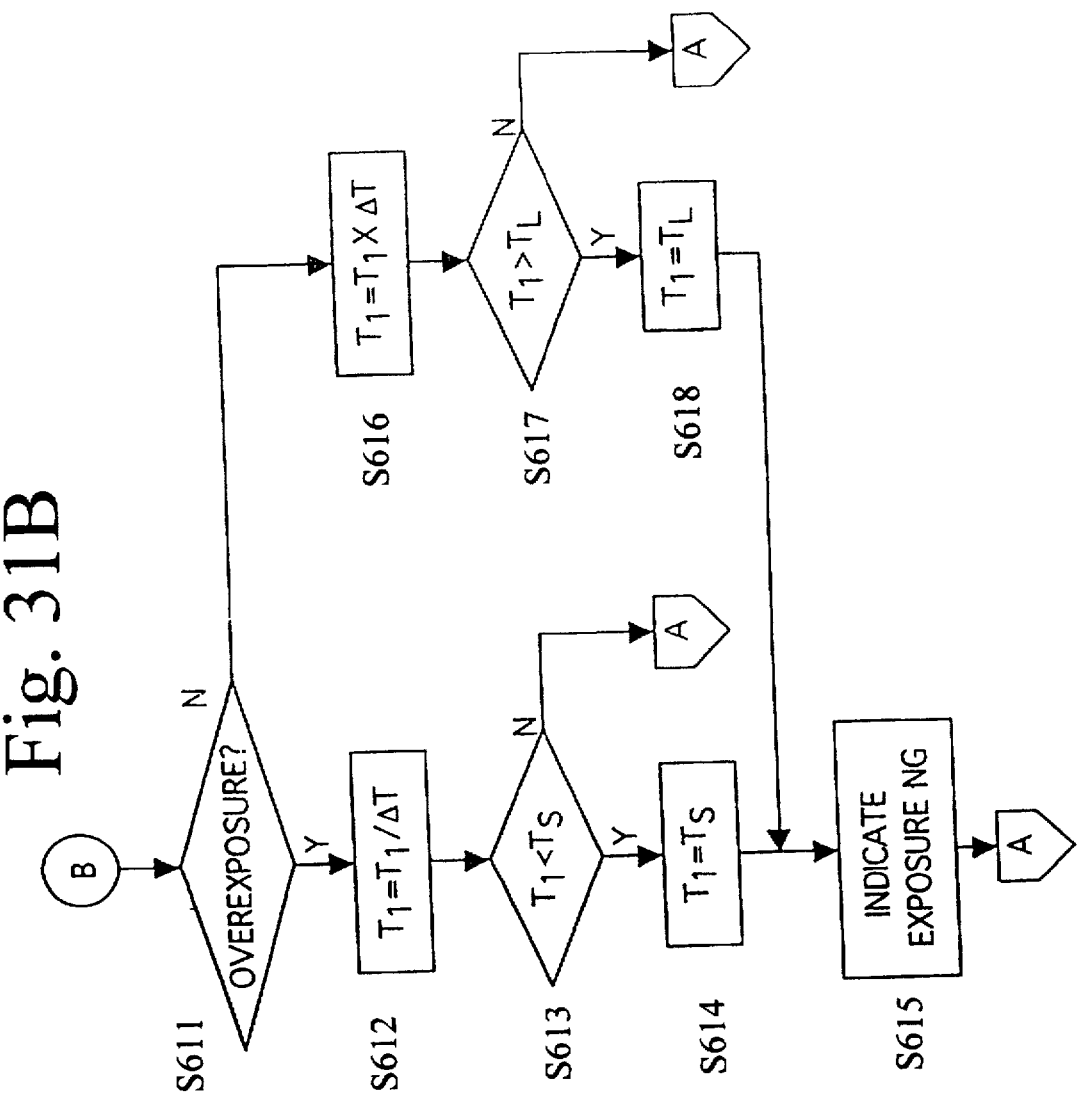

TWO-DIMENSIONAL ENCODED SYMBOL READING DEVICE WITH PLURAL OPERATING MODES

CROSS REFERENCE TO RELATED APPLICATIONS

The present application is a continuation-in-part of U.S. patent application Ser. No. 08/405,027, filed on Mar. 16, 1995, in the name of Harumi AOKI entitled "Encoded Symbol Reader," now abandoned and U.S. patent application Ser. No. 08/218,227, filed on Mar. 25, 1994, in the names of Nobuhiro TANI, Harumi AOKI, and Keiji SAWANOBORI entitled "Symbol Reading Device" now abandoned. The disclosures of each of the above-listed parent applications are expressly incorporated by reference, in their entireties, herein. The present application does not include substantive disclosure not present in the parent applications; and is thus a continuation-in-part only because no single one of the parent applications alone includes all of the presently disclosed material.

BACKGROUND OF THE INVENTION

2. Field of the Invention

The present invention relates to a symbol reading device used to read (i.e., decode) encoded symbols. More particularly, the present invention relates to an encoded symbol reading device to read (i.e., decode) two dimensional tessellated codes, which are an encoded representation of alphanumeric information.

3. Background Information

Recently, point-of-sale systems have employed symbol reading devices in order to scan bar-code labels on products, thereby increasing the speed at which products can be processed through a check-out of a store. However, bar-code labels store data in only one dimension (i.e., the scanning direction) and therefore can only store a limited amount of data.

To overcome the problem of limited data storage, a new type of symbol which stores data in two directions has been proposed. This new type of symbol (hereinafter referred to as a two-dimensional symbol) uses a tessellated pattern to store the data.

To read the encoded symbols, hand-held encoded symbol reading devices are available which have an image sensor such as a charge coupled device (CCD) for reading and decoding two dimensional tessellated pattern codes. These symbol readers have a grid-like pattern of white and black areas, where the pattern changes in both the horizontal (X-axis) and vertical (Y-axis) directions.

One general hand-held encoded symbol reading device has a casing with an opening defined at one end which is covered with a transparent plastic panel. The casing houses a CCD image sensor facing the opening and is electrically connected to a signal processor, a plurality of light-emitting diodes (LEDs), and a condensing lens positioned in front of a photodetector surface of the CCD. Light is emitted from the LEDs and is projected through the opening to a two-dimensional encoded symbol, such as a bar code that is to be read by the encoded symbol reading device. The emitted and projected light is reflected from the encoded symbol back into the opening, and focused by the condensing lens onto the image sensor or photodetector surface of the CCD. The CCD converts the applied light into image signals, which are then converted by the signal processor into a digital signal. The digital signal is then decoded, and the original alphanumeric information can be retrieved.

Conventionally, the image sensor performs a line scan on the tessellated pattern code. After scanning each line, the data is stored sequentially in a memory. In order to decode the information stored in the memory, a complex data marking system is employed to separate data corresponding to each scanned line, from data corresponding to an adjacent scanned line. However, if any of the data markers become corrupted, all the data stored in the memory will be invalid, since the demarcation of the scanning line data is no longer possible. The symbol must therefore be read again, which makes the process of reading the encoded symbols time consuming and bothersome.

In the conventional symbol reading device, the image of the encoded symbol is either viewed through an external monitor or not viewed at all. However, if the encoded symbol is viewed through the external monitor, more power is required to operate the system. Further, since the viewing is required only for a brief period, while the user is aligning the symbol reading device with the encoded symbol, more power than necessary is used. Further still, if the encoded symbol is not viewed on the external monitor in order to save power, it is not possible to quickly align the symbol reading device with the encoded symbol, and therefore, more time is spent trying to decode and read the encoded symbol.

SUMMARY OF THE INVENTION

It is therefore an object of the present invention to provide an improved two-dimensional encoded symbol reader, which can read an image of an encoded symbol, and output the image to a monitor for a predetermined time interval. With this improved encoded symbol reader, the image of the encoded symbol can be viewed, but unnecessary consumption of power can be prevented since the image is not continuously transmitted to the monitor.

It is another object of the present invention to provide an encoded symbol reader which can be operated in at least two modes of operation, where one mode of operation allows continuous transmission of the image to the monitor, and the other mode of operation inhibits the transmission of the image to the monitor except for the predetermined time interval or immediately after a predetermined event.

According to one aspect of the present invention, there is provided an encoded symbol reader for reading a two-dimensional encoded symbol, the encoded symbol reader being operable at least in a first and second first operational mode. The encoded symbol reader includes a device for reading an image of the encoded symbol, the reading device outputting image data corresponding to the read image, and a device for processing the output image data, the processing device outputting a video signal corresponding to the output image data. When the encoded symbol reader operates in the first operation mode, the processing device continuously outputs the video signal. When the encoded symbol reader operates in the second operation mode, the processing device outputs the video signal until a predetermined operation has been executed, the output of the video signal being inhibited after the predetermined operation.

According to another aspect of the present invention, there is provided an encoded symbol reader for reading a two-dimensional encoded symbol, the encoded symbol reader being operable at least in a first and a second operation mode. The encoded symbol reader includes a mechanism for reading an image of the encoded symbol, the reading mechanism outputting an electrical signal corresponding to the read image; and a mechanism for processing the output electrical signal, the processing mechanism outputting a video signal corresponding to the output electrical signal. When the encoded symbol reader operates in the first operation mode, the processing mechanism continuously outputs the video signal. Further, when the encoded symbol reader operates in the second operation mode, the processing mechanism outputs the video signal until a predetermined time interval has elapsed after a predetermined operation has been executed. Then the output of the video signal is inhibited after the predetermined time interval has elapsed.

Preferably, the processing mechanism includes a mechanism for decoding the electrical signal. Further, the predetermined operation comprises an operation of decoding the electrical signal.

Optionally, the encoded symbol reader further includes a device for triggering the predetermined operation. The triggering device can be a switch which is manually actuated. However, if the encoded symbol reader is used in an automated process, such as a factory production line, then the triggering device could be automatically actuated.

Alternatively, the encoded symbol reader further includes a light source for illuminating the encoded symbol. The light source is turned ON when the predetermined operation is triggered by the triggering device. Further, if the encoded symbol reader operates in the second operation mode and the predetermined interval has elapsed, then the light source is turned OFF. The light source can include a laser diode, a halogen lamp or an LED. The light source can also be an external light source which is powered by the encoded symbol reader, or powered separately.

Triggering of the predetermined operation is inhibited while the predetermined operation is being executed. Furthermore, the triggering of the predetermined operation is allowed to be executed during the predetermined interval.

Still optionally, the reading mechanism comprises an image receiving device which is turned ON when the predetermined operation is triggered. Further, the image receiving device is turned OFF if the encoder symbol reader operates in the second operation mode and the predetermined interval has elapsed. The image receiving device can include a CCD or any other imaging device.

Furthermore, the video signal is output from the encoded symbol reader to a device for displaying an image. The display device can include an external monitor having a CRT, or a monitor built into the encoded symbol reader.

According to another aspect of the present invention, there is provided an encoded symbol reader comprising a mechanism for reading an image of an encoded symbol, the reading mechanism outputting an electrical signal corresponding to the read image; a mechanism for processing the output electrical signal, the processing mechanism outputting a video signal corresponding to the output electrical signal; and a mechanism for receiving data related to a mode of operation of the encoded symbol reader. When the data receiving mechanism receives data related to a predetermined mode of operation, the processing mechanism is inhibited from outputting the video signal upon reception of the data related to the predetermined mode of operation. Further, the processing mechanism is allowed to output the video signal while the output electrical signal is processed, and for a predetermined period after the output electrical signal has been processed.

The data can be received from an external computer and transferred to a microprocessor of the encoded symbol reader. Alternatively, the data could be stored in a memory of the encoded symbol reader, and transferred to the microprocessor after the appropriate data was selected by a switch on an operation panel.

BRIEF DESCRIPTION OF THE DRAWINGS

FIG. 20 shows the relationship between the serial data shown in FIG. 12 and an analog signal level;

FIG. 21 shows the relationship between the value of the bit P1 shown in FIG. 12 and the selection of lines A1 and A2 shown in FIG. 9;

FIG. 22 shows the relationship between the value of the bits P1 and P2 shown in FIG. 14 and the selection of lines A1, A2 and A3 shown in FIG. 13;

FIG. 28 is a timing chart illustrating an operation of the monitor through mode and the monitor standby mode procedures;

FIGS. 31A and 31B show a flowchart of an illumination measurement mode;

FIG. 37 shows a chart of a decoding procedure when an image reverse procedure is ON;

DETAILED DESCRIPTION OF THE ILLUSTRATED EMBODIMENTS

Figure 1:
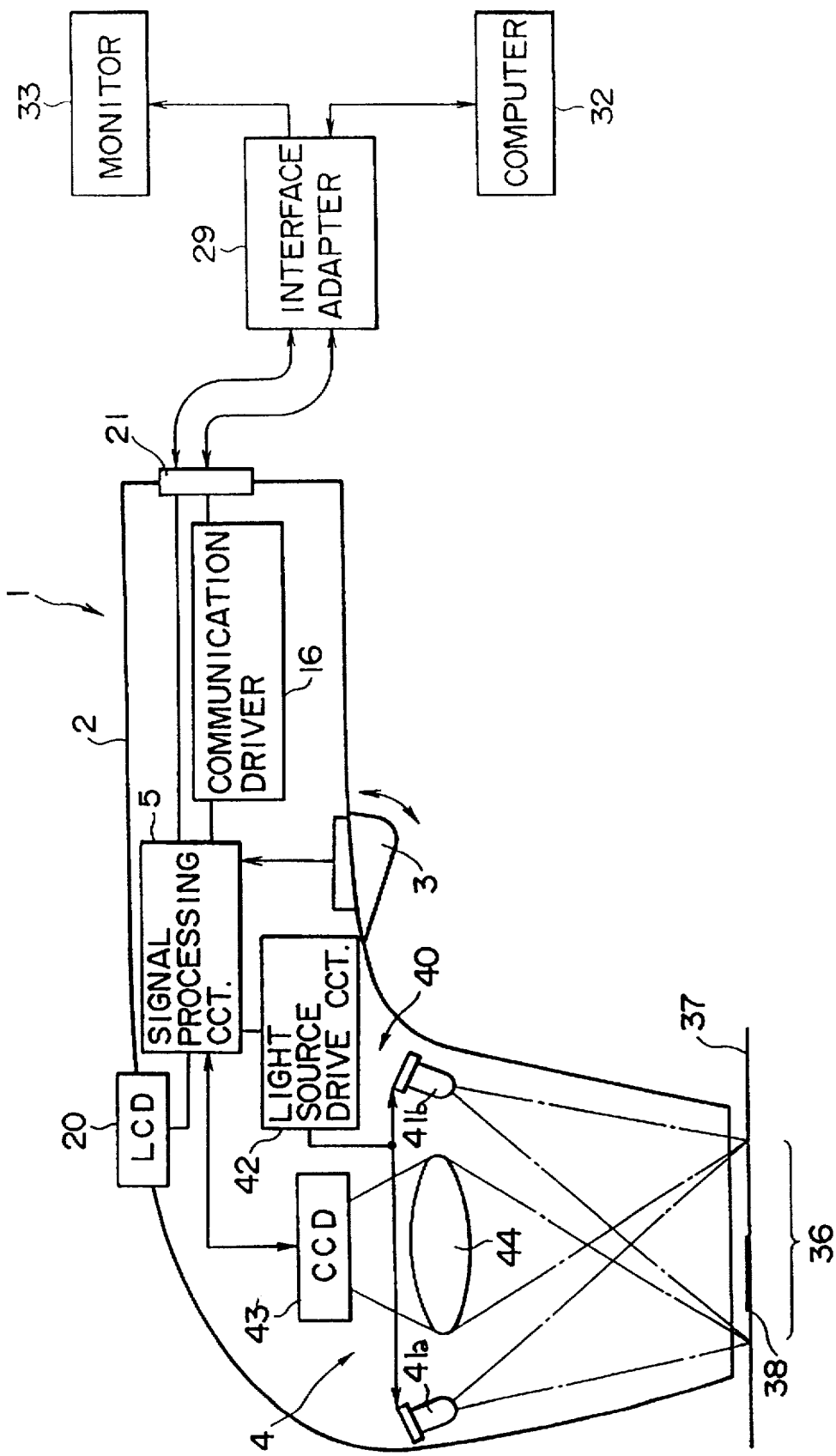
FIG. 1 is a diagram of a symbol reading device according to the present invention.

FIG. 1 is a block diagram of a symbol reading device embodying the present invention. The symbol reading device 1 has a casing 2, in which a light projection unit 40 and a reading unit 4 for reading an encoded data symbol 38 are integrally provided.

The light projection unit 40 has a pair of light sources 41a, 41b, and a light source driving circuit 42. A light emitting diode (LED), a halogen lamp, a semiconductor laser or the like can be used as the light source. Although there are two light sources 41a, 41b shown in the embodiment, the light projection unit 40 can be modified to have only one light source. Further, if the ambient light is bright enough, a light source is not required, since sufficient light is available for the encoded data symbol to be read. Further, if an encoded data symbol is backlit and therefore an optical image is projected, the optical image can be read by the reading unit and the symbol can be decoded.

Between the pair of light sources 41a, 41b, a charge coupled device (CCD) 43 and the reading unit 4 are provided. The CCD 43 functions as an area sensor. The reading unit 4 includes an optical system 44 through which light reflected from a reading area 36 is directed to the CCD 43. In the CCD 43, a plurality of imaging sensing elements (hereinafter referred to as pixels) are arranged in matrix. Each pixel of the CCD 43 accumulates an electrical charge in accordance with the intensity of the received light. The charge accumulated in each pixel is subsequently discharged to form an image signal.

In the embodiment, the sensitivity of the CCD 43 is sufficient to distinguish the entire area of the encoded data symbol 38. It is also possible to use a colored data symbol and a color sensitive CCD for decoding more complicated data.

The optical system consists of various optical elements such as a lens, a prism, a filter, a mirror, and the like.

When the pair of light sources 41a, 41b are driven by the light source driving circuit 42, the encoded data symbol 38 (and the reading area 36) is illuminated with light emitted by the light sources 41a, 41b. The reflected light from the reading area 36 is focused on the light receiving surface of the CCD 43 by the optical system 44. The CCD 43 outputs an analog image signal in accordance with the intensity of the received light. The output signal is fed to a signal processing circuit 5 where it is converted to a digital signal for further processing.

Figure 2:
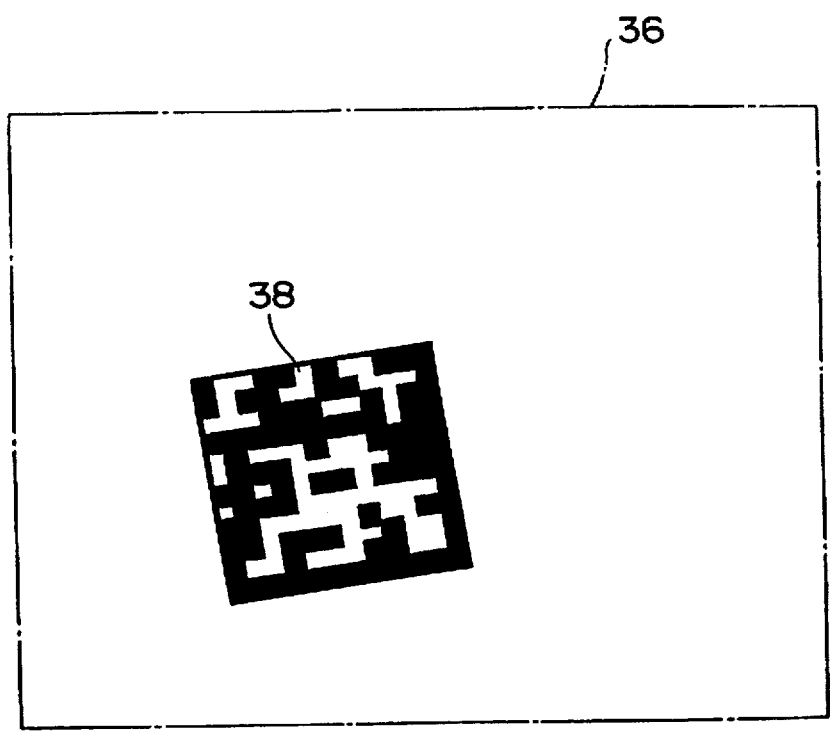
FIG. 2 shows a reading area and a symbol to be read by the reading device.

FIG. 2 shows the encoded data symbol 38 contained within a reading area 36. In general, the encoded data symbol 38 has a data area and a frame area. In the data area, n×n (n is an integer greater than one) black or white (or transparent) small cells are arranged in matrix. The luminance of light reflected from the cell represents 0 (zero) or 1 (one) in binary form. A combination of the black and white cells define desired information. The configuration of the encoded data symbol is not limited to that described above. Any type of two-dimensional symbol code can be used.

Figure 3:
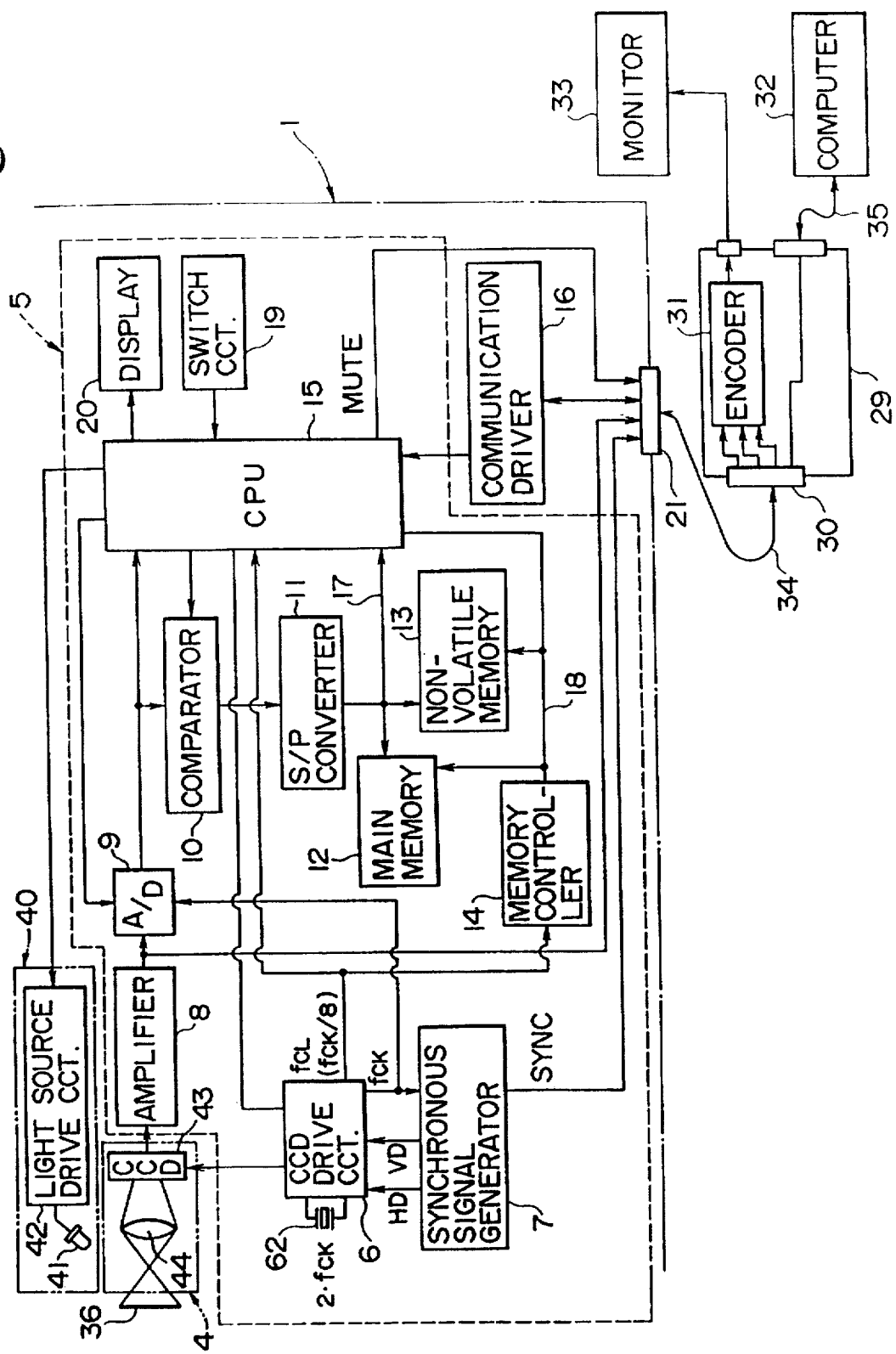
FIG. 3 is a diagram illustrating the electrical construction of the symbol reading device.

FIG. 3 shows a block diagram of the signal processing circuit 5 and the connections to the other elements of the symbol reading device 1 according to a first embodiment of the present invention. The signal processing circuit 5 comprises a CCD drive circuit 6, a synchronous signal generator 7, an amplifier 8, a comparator 10, a serial/parallel converter 11, a main memory 12, a non-volatile memory (EEPROM) 13, a memory controller 14, a CPU 15, a switch circuit 19 and an LCD display driver 20.

The CCD drive circuit 6 generates a clock signal having a frequency fCK. The clock signal fCK is transmitted to synchronous signal generator 7 and an A/D converter 9.

The synchronous signal generator 7 generates a horizontal synchronous signal (HD) and a vertical synchronous signal (VD) based on the clock signal fCK and transmits both signals to the CCD drive circuit 6. A horizontal CCD drive signal is generated based on the clock signal fCK while the vertical CCD drive signal is generated based on the HD and VD signals. The horizontal and vertical CCD drive signals are then output to the CCD 43.

In the CCD drive circuit 6, a second clock signal fCL is generated by combining a divided clock signal fCK/8, VD and HD. This clock signal fCL is output to the memory controller 14 and the CPU 15. Further, the synchronous signal generator 7 generates a SYNC signal based on the clock signal fCK. The SYNC signal is output to a terminal 21 where it is used by a monitor 33 to display an image of the encoded data symbol 38.

The analog image signal output by CCD 43 is amplified by the amplifier 8 and fed to the A/D converter 9 where it is converted into an 8-bit digital image signal having 256 steps of gradation. The amplified analog image signal is also transmitted to the terminal 21.

The 8-bit digital image signal is transmitted from the A/D converter 9 to the comparator 10. At the same time, threshold data Sij is transmitted to the comparator 10 from the memory 13 via a data bus 17 and the CPU 15. The 8-bit digital image signal is compared with the threshold data Sij which is also an 8-bit digital signal to generate 1-bit quantized digital data.

The eight 1-bit quantized digital data are converted into one 8-bit parallel data by the serial/parallel converter 11. The 8-bit parallel data is stored in main memory 12 in accordance with the address determined by the address counter of the memory controller 14. In this embodiment, an 8-bit data bus is connected from the serial/parallel converter 11 to the CPU 15, thus the serial/parallel converter 11 outputs 8-bit data.

The non-volatile memory 13 is shown as an EEPROM, but any non-volatile memory device, including a magnetic/optical recording medium, may be used. If the latter type of recording medium is used, it is preferable that the data be loaded into a memory device (RAM) before being used.

The image data stored in main memory 12 is read out and processed with various enhancements and decoded in the CPU 15. The decoded data is transmitted to the terminal 21 via a communication driver, such as an RS-232C interface driver (not shown).

The memory controller 14 has an address counter which determines the address of the main memory 12. Data is written to the memory 12 synchronously with the combined clock signal fCL, at the address determined by the memory controller 14.

The CPU 15 has a second address counter which determines the address of non-volatile memory 13 when threshold data Sij is written to, or read from, the memory 13.

A switch circuit 19 comprises a main switch for turning the symbol reading device ON or OFF, a mode switch for switching between a read mode or a test mode, and a monitor switch for switching between a monitor through mode (continuous mode) or a monitor cut mode for viewing an image of the encoded data symbol 38 on the monitor 33. The switch circuit 19 further comprises an exposure switch for setting an exposure value, and a field/frame select switch for selecting between the method of storing the two fields of the frame (discussed below).

The status of the monitor switch is input to the CPU 15. If the monitor cut mode is selected, a mute signal generator inside the CPU generates a HIGH signal, otherwise if the monitor through mode (continuous mode) is selected, a LOW signal is generated. The mute signal is transmitted to the terminal 21.

If the monitor through mode is selected and the main switch is ON, the light source drive circuit 42 will drive the light sources 41a, 41b continuously. However, if the monitor cut mode is selected and the main switch is ON, the light sources 41a, 41b are driven only when a trigger switch 3 is ON.

A display unit 20 is controlled by the CPU 15 to display decoded information. For example a NG/OK (no good/good) indication, a date, and shutter speed conditions can be displayed. The display unit 20 may have an LCD, a green LED or a red LED to indicate the above conditions.

The terminal 21 and an interface adapter 29 are connected by a cable 34. The analog image signal, SYNC signal, and mute signal are inputted to an encoder 31, which generates an NTSC video signal which is output if the mute signal is LOW. If the mute signal is HIGH, the video signal is not transmitted to the display 33.

The decoded data is also applied to the terminal 21, and is transmitted to a computer 32 through the interface adapter 29 and cable 35.

Figure 4:
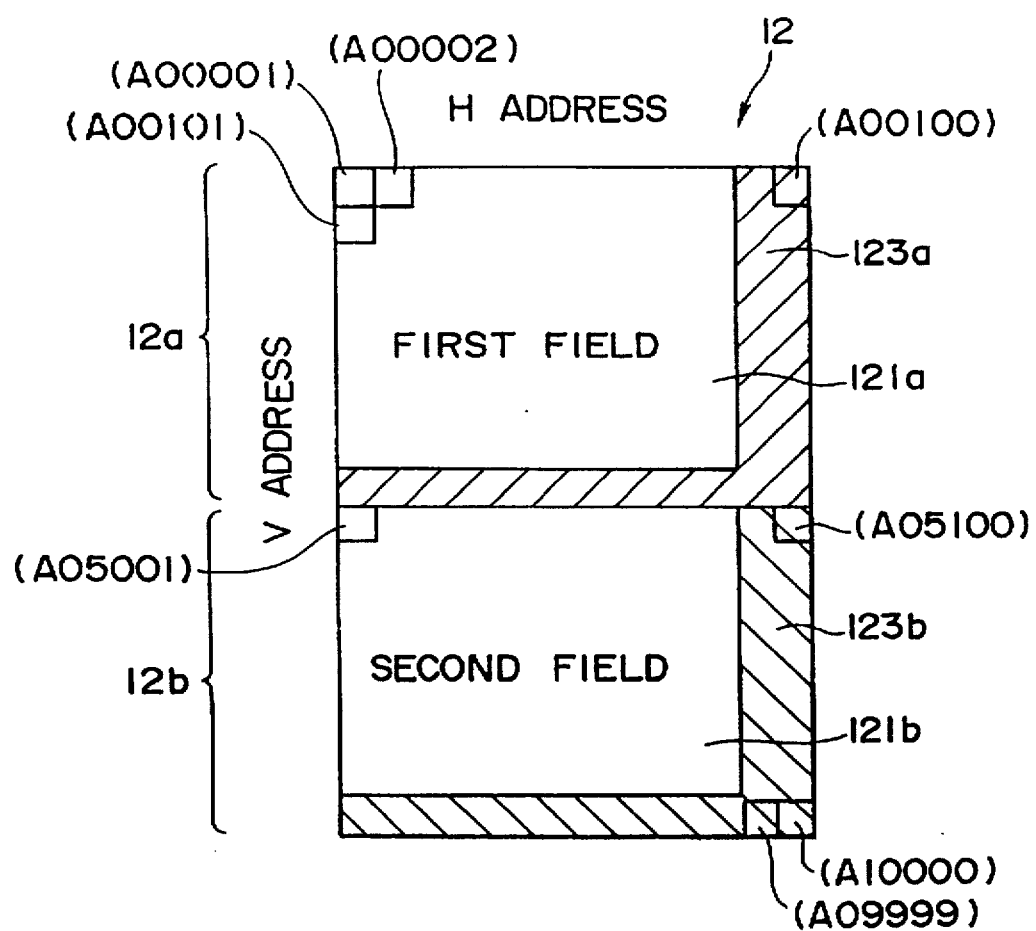
FIG. 4 is a diagram illustrating the relationship between the scanning fields and the memory addressing.

FIG. 4 illustrates the location in the main memory 12 of two storage areas: a first area 12a for a first field, and a second area 12b for a second field. The first area 12a includes an image data storing area 121a and a blanking area 123a; the second area 12b has an image data storing area 121b, and a blanking area 123b. The blanking areas 123a and 123b are to the right and bottom of the image storing areas 121a and 121b.

The address is controlled based on the clock signal fCL. More specifically, the address in the horizontal direction is updated based on the clock signal fCL. The CPU 15 controls the start of the writing of data corresponding to each scan line, the changing to the top of the succeeding line, and the changing to the other field.

The main memory 12 stores eight bits of binary data at each address in order to improve efficiency. As shown in FIG. 4, the address A00001 stores data corresponding to the leftmost 8 pixels of the first scanning line, and the address A00101 stores data corresponding to the leftmost 8 pixels of the second scanning line. This is repeated for all scanning lines. Thus, the first image storing area 121a stores data corresponding to the first scanned field of the reading area 36. Similarly, the second image storing area stores data corresponding to the second scanned field of the reading area 36.

When 8-bit data is stored in the main memory 12, the memory controller 14 determines the address based on a third clock signal fCK/8. The CPU 15 controls the memory controller 14 based on the timing of the VD signal to initiate storing the data, thus the address is determined as A00001.

Initially, the memory address is set to A00001. The 8-bit parallel data for the first horizontal scan line is stored on the first line of memory. If there is more data for the first field, the remaining data is stored on the second line of memory. When the data for the second scan line is to be stored, the CPU 15 controls the memory controller 14 based on the HD signal, and the left-most address (A00101) is sent to the memory controller 14. The leftmost 8-bit data for the second scan horizontal line is stored at this address, over-writing any data that may have overflowed from the first scan line. This process is repeated for every horizontal scan line. Thus, the leftmost 8-bit data is stored at the leftmost address for each scan line.

The data for the second field is stored in a similar manner in the second image memory area 121b. When the first field data has been stored, the CPU 15 controls the memory controller 14, based on the VD signal, to assign the address A05001 to the beginning of the second field.

As described above, the CPU 15 controls the memory controller 14 based on the clock signal fCL. It is also possible to employ a memory controller which receives the clock signal fCL, or a memory controller that operates synchronously with the horizontal and vertical synchronous signals HD and VD.

The CPU 15 reads the data stored as above synchronously with a clock signal different from the clock signal fCL, but the same as the clock signal used for image processing. In this embodiment, the CPU 15 can assign the address and read the data.

To read the data, the CPU 15 controls the memory controller 14 to assign the address from which the data is read. Accordingly, the address of the top left of the first field (A00001) is assigned. Then the data is read from left to right, and top to bottom.

As described above, the image data of the left edge of each scan line is written at the left portion of the memory 12. Thus, the position of a point on the light receiving area of the CCD 43 corresponds to a position on the first or second field of the main memory 12. As a result, it becomes easy to process the image data, simplifying and increasing the speed of the processing circuit.

Before reading an encoded data symbol, the symbol reading device 1 obtains the threshold data Sij. The threshold data Sij is obtained by reading a white chart with an exposure time set to half of that required when an actual symbol is read. The exposure time can be adjusted by changing the shutter speed (i.e., the integration time of the CCD 43). Thus, if the encoded data symbol is read at a shutter speed of 1/60 sec., the threshold data Sij is obtained using a shutter speed of 1/120 sec.

Figure 5:
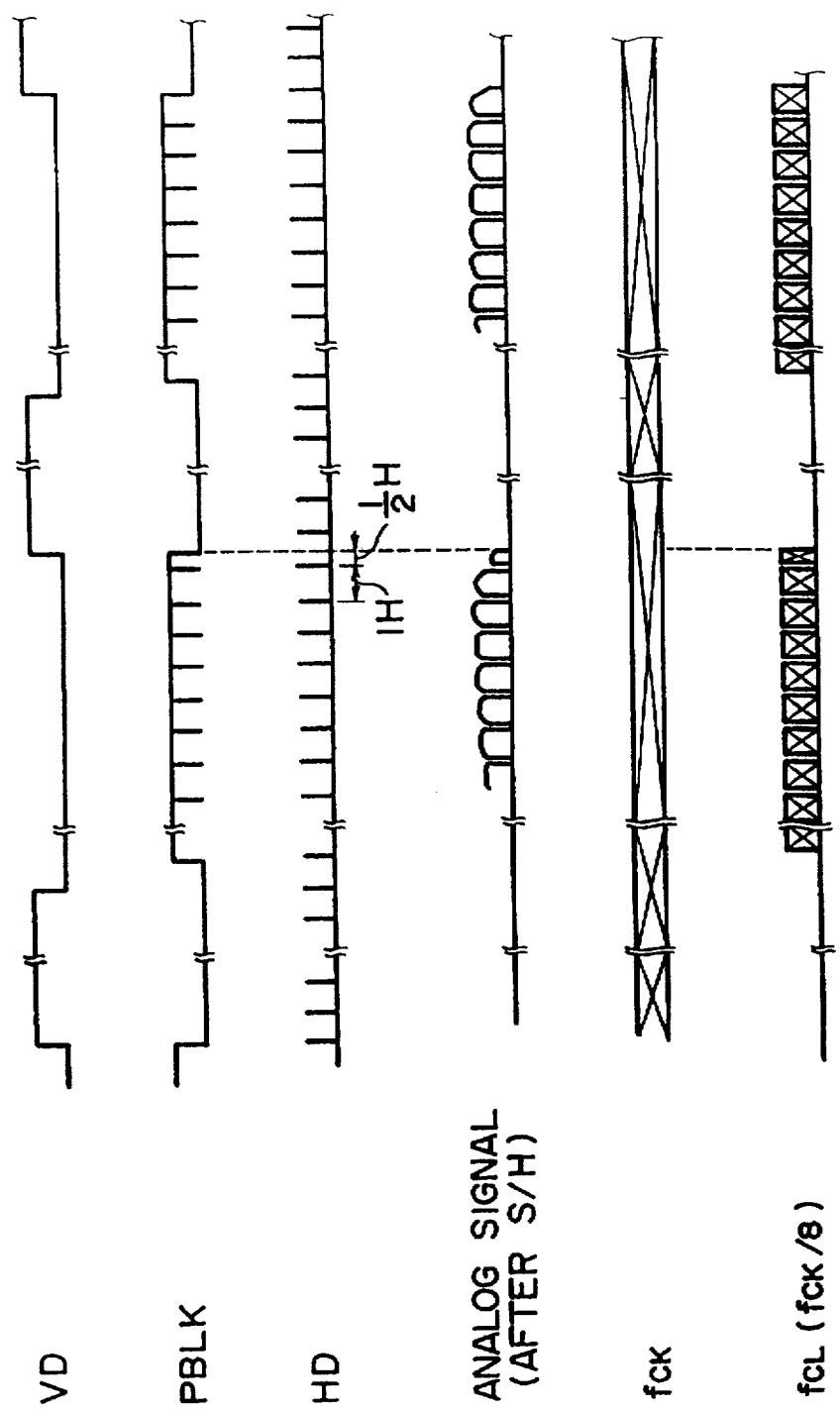
FIG. 5 is a timing chart showing the generation of threshold data.

By reading the test chart, an analog image signal is obtained as shown in FIG. 5. The analog image signal is synchronously converted to 8-bit digital signals in accordance with the clock signal fCK. In other words, the analog signal is sampled based on the clock signal fCK, and A/D converted. As described above, the HD and VD signals are synchronized with the clock signal fCK.

Figure 6:
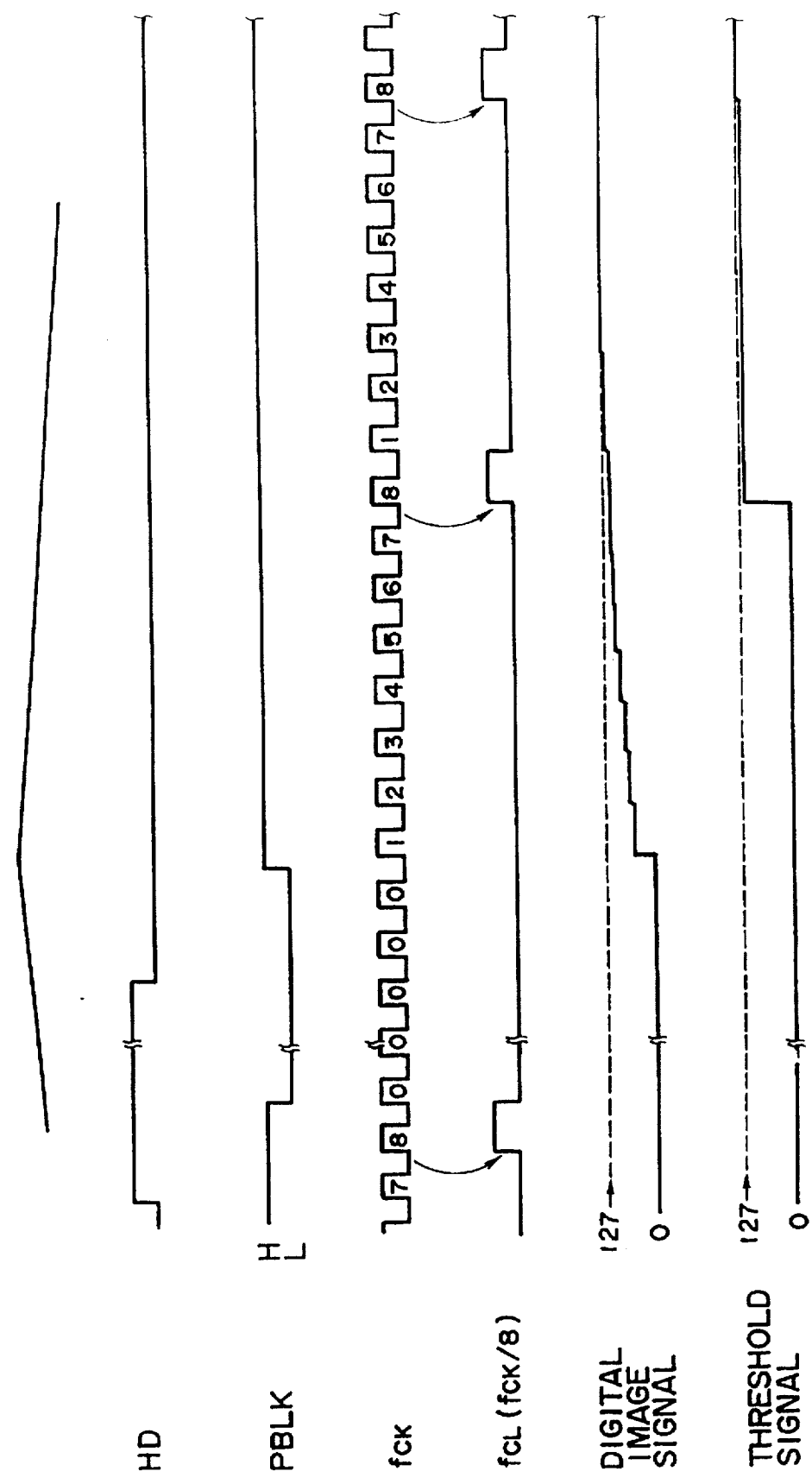
FIG. 6 is shows a portion of the data illustrated in FIG. 5, on an expanded time scale.

The 8-bit digital signal is obtained as shown in the expanded timing diagram of FIG. 6. The value of the 8-bit digital data shown in FIG. 6 is approximately 127, which corresponds to gray when the shutter speed is 1/60 sec.

In this embodiment, the image data is detected on the rising edge of the clock signal fCL pulse and stored as the threshold value in the non-volatile memory 13 via the data bus 17. This 8-bit value represents a brightness level of one pixel, and is therefore different from the 8-bit data output by the serial/parallel converter 11. The address of the memory 13 when the threshold data Sij is written, is generated by an address counter provided within the CPU 15. Thus, each 8-bit data is used as the threshold data Sij for the 8 pixels read between two adjacent fCL clock pulses.

A pre-blanking signal PBLK is generated by combining the HD and VD signals. The PBLK signal is used for synchronizing the clock signal fCL to the HD and the VD signals. While the PBLK signal is LOW, blanking of the clock signal fCL occurs. While the PBLK signal is HIGH, the clock signal fCK is divided, and based on the divided clock signal, the clock signal fCL is generated.

Further, each of the clock signal fCK pulses labeled "0" are ignored, and those labeled "1" through "8" are divided. Thus, the clock signal fCL which is synchronized with the HD signal is obtained. In this embodiment, the clock signal fCL and the HD signal have a constant phase difference.

Since the data detected for every eighth pixel is used as the threshold data Sij, the memory storage requirements are greatly reduced. Therefore, the threshold data Sij is written or read out synchronously with the clock signal fCL, which has a frequency fCK/8, and is synchronized with the HD and VD signals. Thus, memory space is saved, and the memory access time is reduced. If sufficient memory space is available, the memory may be controlled to store the threshold data Sij of all the pixels.

Figure 18A:
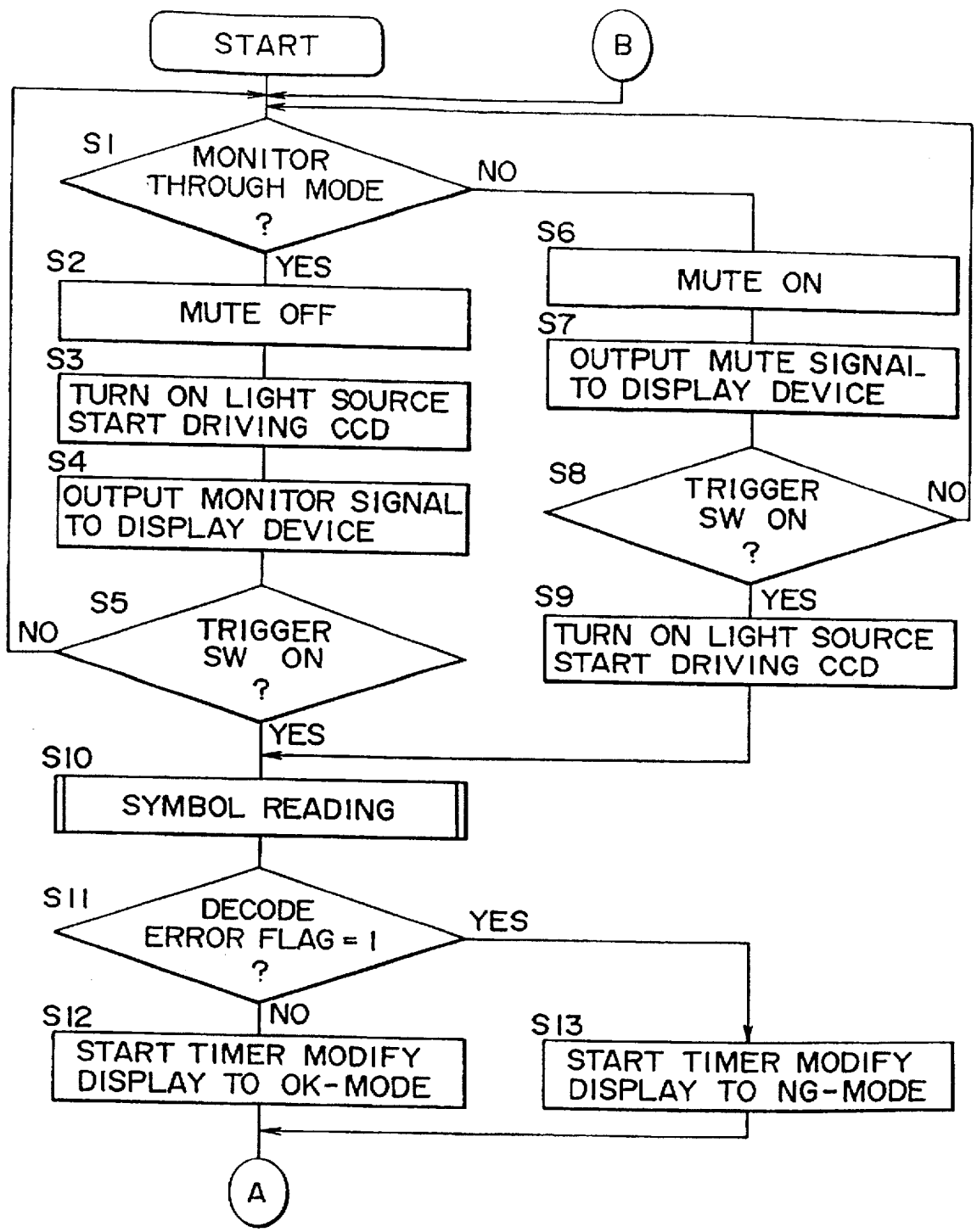
FIGS. 18A and 18B are flowcharts illustrating the main operation of the symbol reading device.
Figure 18B:
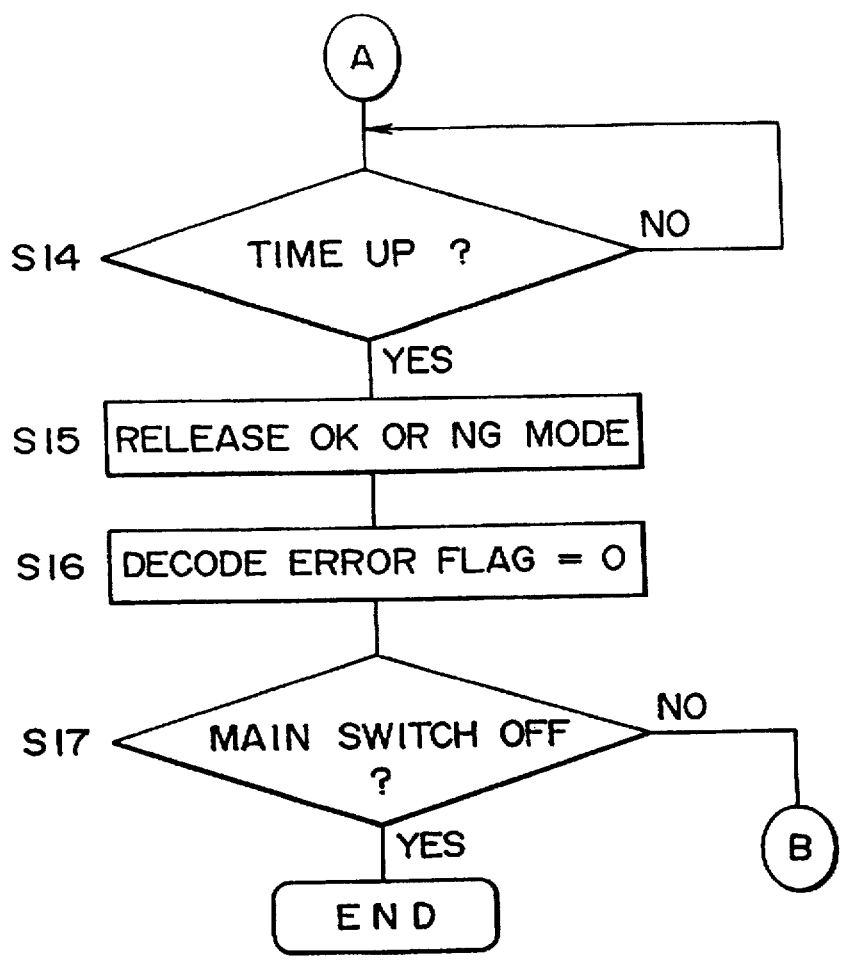

The operation of the symbol reading device according to the first embodiment will be described below with reference to FIGS. 18A, and 18B.

Operation begins when the symbol reading device is turned ON. If the monitor through mode (continuous mode) is selected in S1, then mute is turned OFF in S2. The light sources 41a, 41b are turned ON and the CCD 43 is driven in S3. The output monitor signal is sent to the display device 33 in S4. At S5, it is determined whether the trigger switch 3 is ON. If the trigger switch 3 is ON, control proceeds to S10 where the symbol reading subroutine is initiated. If the trigger switch is OFF, control returns to S1 and the process repeats as described above.

If the monitor through mode (continuous mode) is not selected (S1:N), the mute signal is turned ON in S6 and output to the terminal 21 in S7. The interface adapter 29 uses the mute signal to determine whether the output image signal should be sent to the monitor 33. If the trigger switch 3 is ON in S8, control proceeds to S9 where light sources 41a, 41b are turned ON and the CCD 43 is driven. Control then goes to S10 where the symbol reading subroutine is initiated. If the trigger switch 3 is not turned ON, control goes to S1.

Figure 19A:
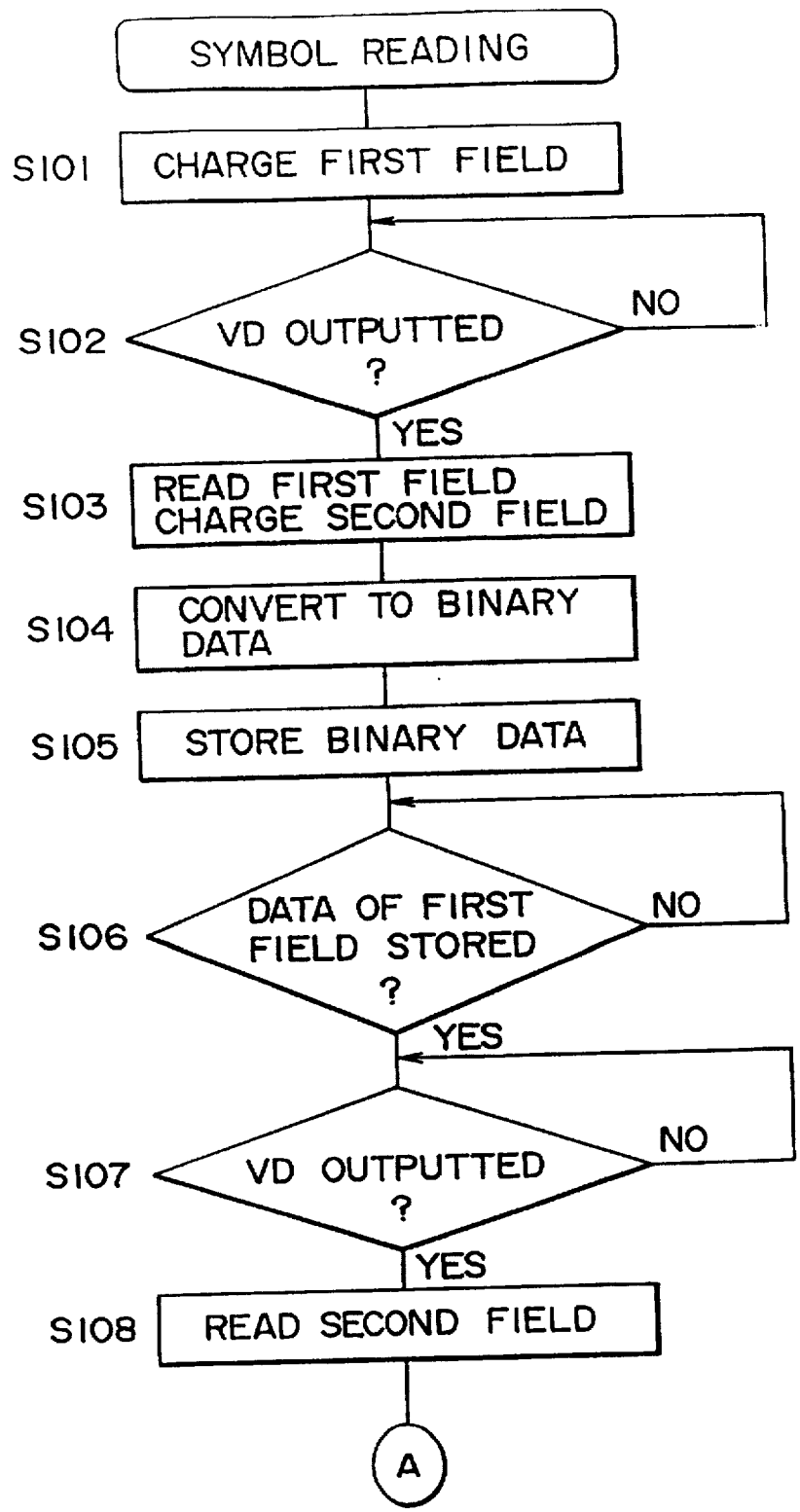
FIGS. 19A and 19B are flowcharts illustrating a symbol reading operation.
Figure 19B:
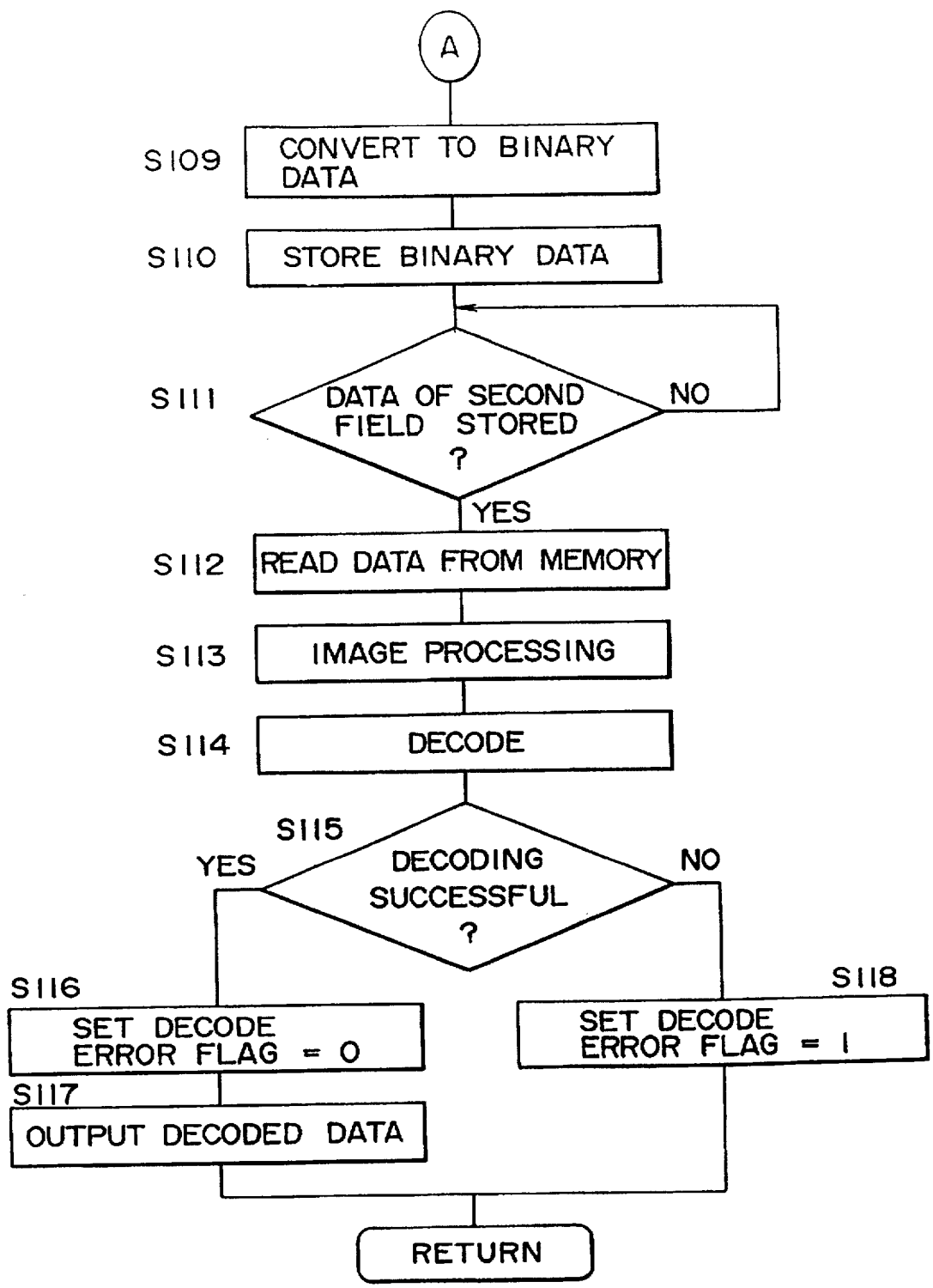

The symbol reading subroutine at S10 will be explained with reference to FIGS. 19A and 19B.

At S101, the CCD 43 is charged by the CCD drive circuit 6. The synchronous generator 7 outputs the VD signal at S102. The first field data is then read by the CCD 43 and transferred to the A/D converter 9. Simultaneously, the CCD 43 is charged in order to read the second field data.

When the symbol data is read, the A/D converted image data is compared with the threshold data Sij in the comparator 10 and 1-bit binary data is obtained. Eight 1-bit binary data are converted into one 8-bit parallel data by the serial/parallel converter 11, as described previously and shown in the timing diagram in FIG. 7.

The digital image data and the threshold data Sij are compared on a pixel-by-pixel basis. If the image data is equal to or greater than the threshold data Sij, a HIGH signal is output from the comparator 10. If the image data is less than the threshold data Sij, a LOW signal is output.

Reading the threshold data Sij from the non-volatile memory 13 is performed synchronously with the clock signal fCL, which has a frequency of fCK/8. Comparison of the image data and the threshold data Sij is performed synchronously with the clock signal fCK.

The CPU 15 has a memory for temporarily storing threshold data Sij. The threshold data Sij read out of the memory 13 is stored in the temporary memory. This threshold data Sij is retained until the next data is loaded in accordance with the clock signal fCL. The CPU 15 transmits the same data to the comparator 10 eight times, since the same threshold data Sij is used to compare eight pixels.

The CPU 15 counts the clock signal fCL within a predetermined period of time and obtains the timing of horizontal and vertical synchronous signals HD and VD. For example, when the number of pixels of one line is 512, the number of clock pulses (fCL) detected is 64. Thus, the timing of the horizontal synchronous signal HD is known. As the blanking period is relatively long compared with the horizontal period, the vertical synchronous signal VD can be determined from clock signal fCL and the timing of the horizontal synchronous signal HD.

Figure 7:
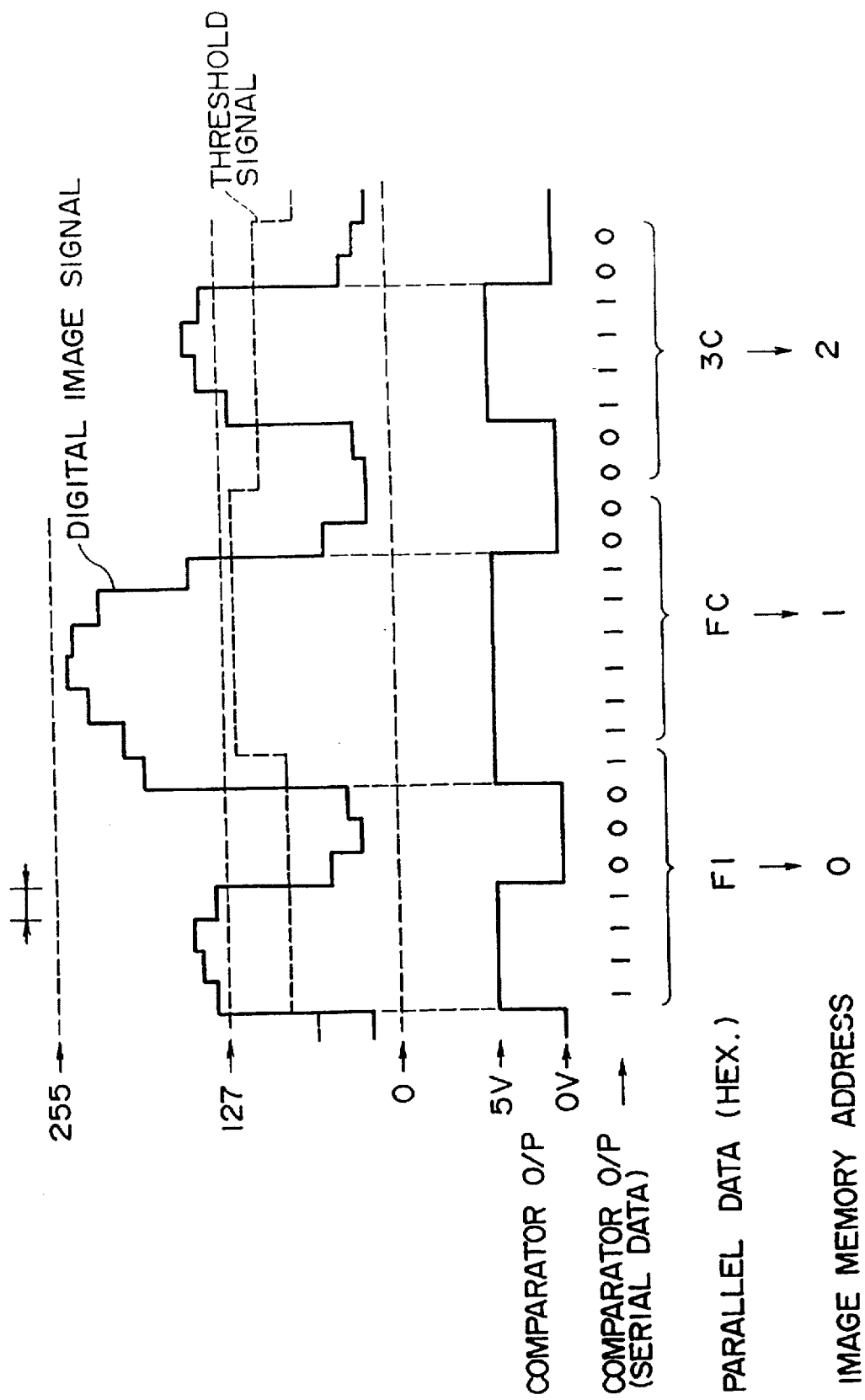
FIG. 7 is a timing chart illustrating the relationship between a digital image signal and its corresponding parallel data.

Since the CPU 15 performs the function described above, the CPU 15 can control the addressing of each memory synchronously with the horizontal and vertical synchronous signals HD and VD. The CPU 15 can transmit an instruction to start writing/reading to the memory controller 14 synchronously with the horizontal/vertical synchronous signals HD and VD. Accordingly, a series of sequential image processes can be performed efficiently. FIG. 7 shows the 1-bit binary data, the converted 8-bit data, and the memory addresses described in the above operation.

Referring again to FIG. 19A, the 8-bit data output by the serial/parallel converter 11 is stored in the main memory 12 in S105. If it is determined that the data for the first field has been stored at S106, control goes to S107 where VD is again output and the second field data is read at S108. This data is converted to binary data, compared with the threshold data Sij and stored in steps S109 and S110, in a manner similar to the data for the first field.

Then at S111, it is determined whether the second field data has been stored. At S112, if all the second field data has been stored, the data can be read out of the main memory 12, then processed in S113 and decoded in S114. Since at each address, 8-bit data is stored, the writing and reading of image data can be performed quickly.

If the data is successfully decoded (S115:Y) then the decode error flag is set to "0" in S116, and the decoded data is output in S117. If the data is not successfully decoded, the decode error flag is set to "1". Thereafter, control returns to step S11 (in FIG. 18A) of the main program where the decode error flag is checked.

Referring again to FIG. 18A, if there is no error (i.e., decoding is successful), the timer is started and the display 20 is update to show the OK mode, in S12. At S13, if the decoding has an error, the timer is started and the display 20 is updated to show the NG mode.

If time has elapsed at S14, the display modes are released at S15 and the decode error flag is set to "0" at S16. If the main switch is OFF in S17, then the program ends, otherwise control returns to S1.

The testing function of the symbol reading device will be described with reference to FIG. 8.

Figure 8:
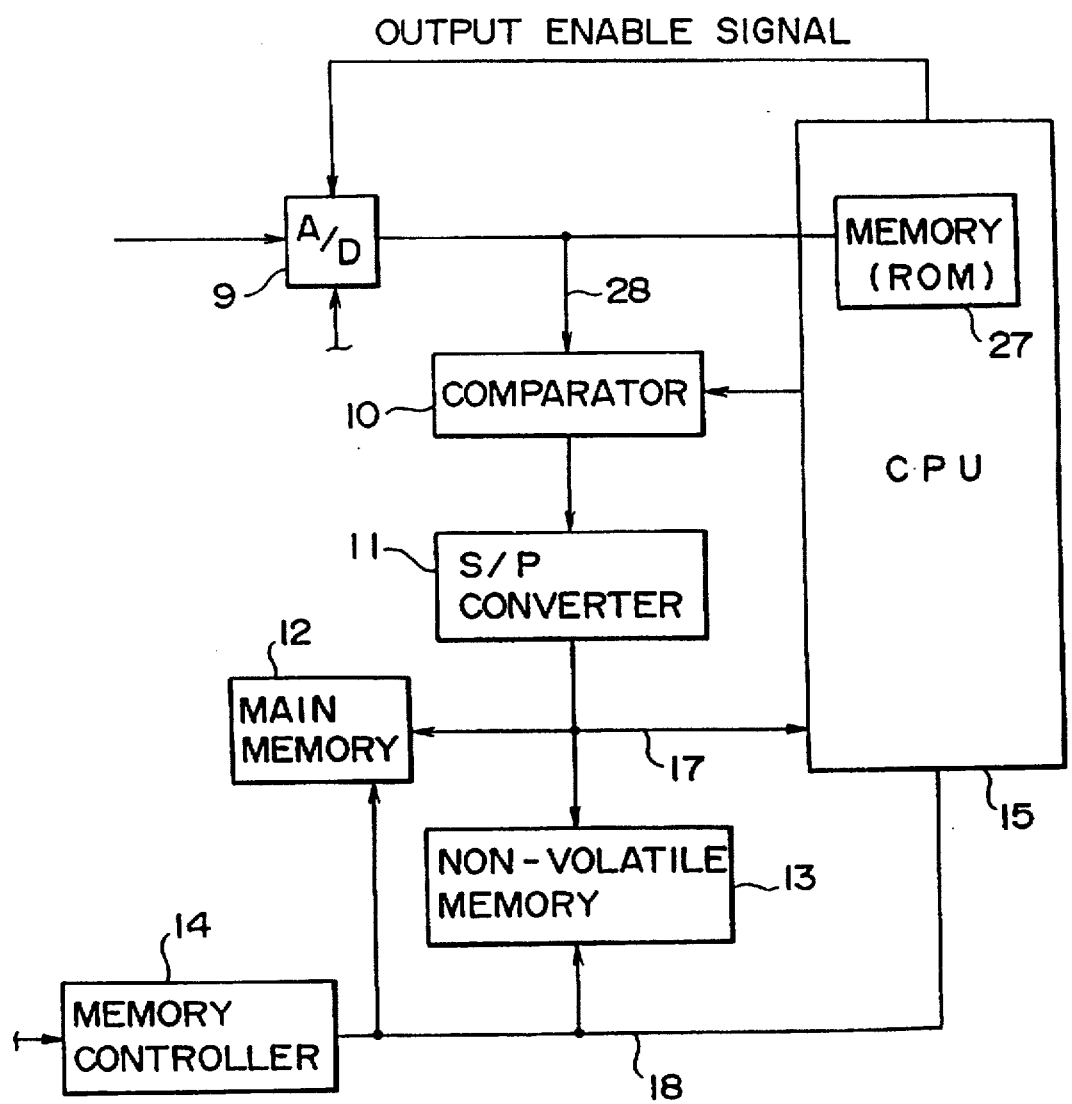
FIG. 8 is a block diagram showing a control unit and its peripheral circuitry.
Figure 15:
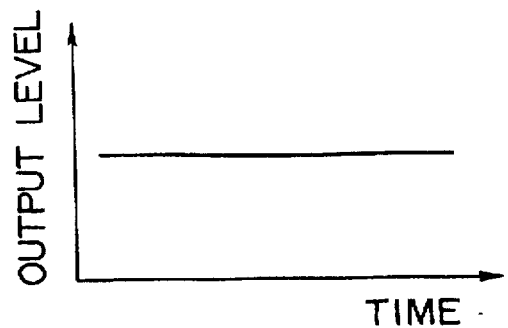
FIG. 15 is a graph showing a waveform of an example of a reference video signal.
Figure 16:
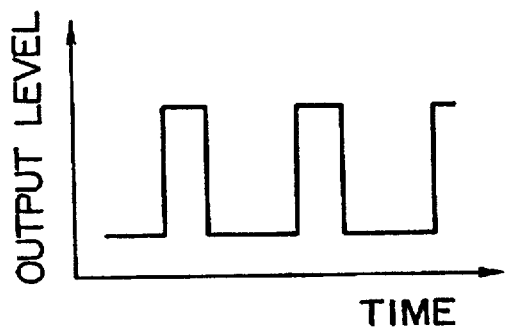
FIG. 16 is a graph showing a waveform of another example of a reference video signal.
Figure 17:
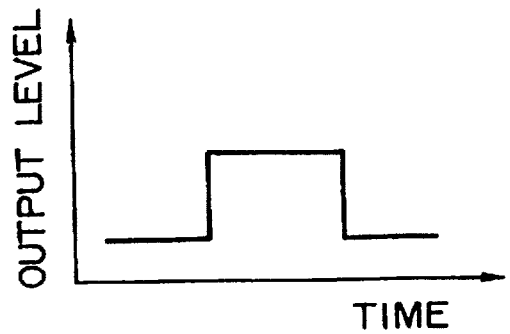
FIG. 17 is a graph showing a waveform of another example of a reference video signal.

FIG. 8 shows part of the circuit shown in FIG. 3. The CPU 15 has a memory 27 which stores a reference image signal. The reference image signal is a sample image data used for testing or demonstration. Examples of reference data are shown in FIGS. 15 through 17, but are not limited to these. Any other data can be used as the reference data. Further, it is preferable that the reference data has a pattern similar to actual symbol data.

The A/D converter 9 and the memory 27 are connected to the comparator 10 through a common line 28. Thus, data from the A/D converter 9 and data from the memory 27 are selectively input to the comparator 10 through the common line 28.

When the reading mode is selected with the switch circuit 19, the data in the memory 27 is not read, and is therefore not transmitted to the comparator 10. In this case, the CPU 15 sends an output-enable signal to the A/D converter 9. If the test mode is selected, the CPU 15 disables the A/D converter 9, inhibiting the output of an image signal, and the reference data is transmitted from the memory 27 to the comparator 10. The memory 27 also stores reference threshold data Sij. When the test mode is selected, the reference image data and the reference test data are transmitted to the comparator 10 and the 1-bit binary data is generated, as previously described.

In the test mode, the comparator 10 outputs 1-bit binary data based on the reference image data and the reference threshold data Sij. The 1-bit binary data are then stored in the memory 12 in a similar manner to that described above. When the 1-bit binary data for one frame have been stored in the memory 12, the data are transmitted to the CPU 15, image processing is applied, and then the data is decoded.

As described above, according to this embodiment, the operation of the comparator 10, the serial/parallel converter 11, and the main memory 12 can be tested easily and accurately, without connecting any external testing devices.

In this embodiment, the reference data is stored in the memory 27. It is possible to store the reference data in another memory device such as a disk type recording medium.

Figure 9:
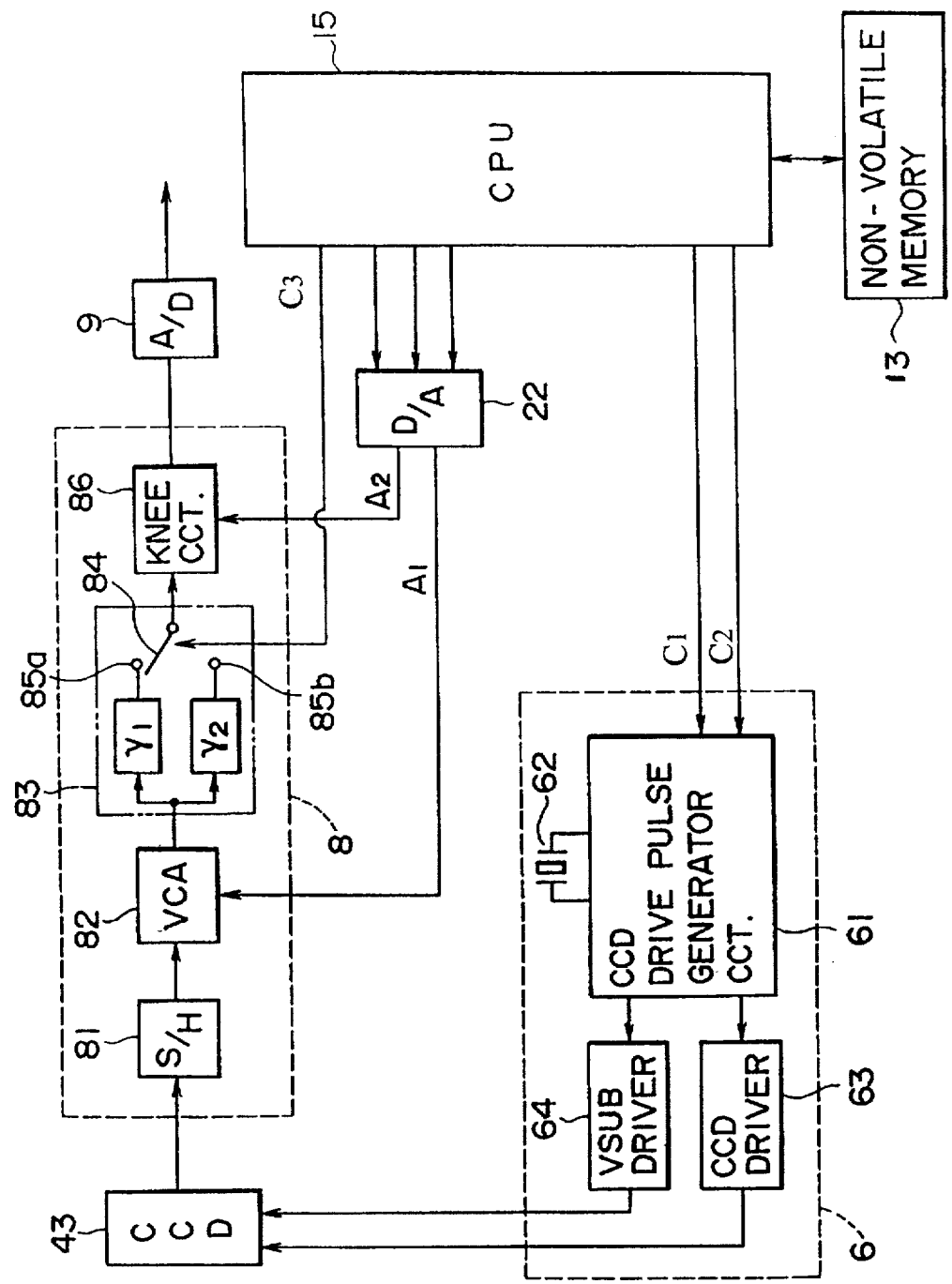
FIG. 9 is a block diagram showing a CCD (Charge Coupled Device) drive circuit and an amplifier circuit.

Referring now to FIG. 9, there is illustrated a second embodiment according to the present invention. The second embodiment is similar to the first embodiment described above, but is provided with an exposure controlling system. Elements similar to those previously described in the first embodiment are identified by the same reference numerals used hereinbefore.

The CCD drive circuit 6 has a CCD drive pulse generator 61, a CCD driver 63, and a VSUB driver 64. The VSUB driver 64 controls the driving voltage of the CCD 43. When a VSUB signal transmitted from the VSUB driver 64 to the CCD 43 is LOW, the driving voltage is approximately 10 volts, to control blooming.

If the VSUB signal is HIGH, the driving voltage is set to approximately 30 to 40 volts, and the CCD 43 is reset (discharged). By inputting the VSUB signal in the form of a periodic pulse signal, the accumulated charge in the CCD 43 is periodically cleared. Therefore, if the interval of the VSUB signal pulses, and the timing of the charge transferring from each pixel of the CCD 43 to a vertical transfer CCD are adjusted, the shutter speed can be changed as necessary. Note, that the transferring of the charges from pixels to the vertical transfer CCD is performed during the vertical blanking period.

The performance of the CCD drive pulse generator 61 is controlled by the CPU 15 through control signals C1 and C2 (1-bit digital signals). That is, the shutter speed is selected based on the combination of the values C1 and C2, which are shown in Table 1.

TABLE 1

| Shutter Speed | C1 | C2 |
| --- | --- | --- |
| 1/60 sec. | 0 | 0 |
| 1/125 sec. | 1 | 0 |
| 1/250 sec. | 0 | 1 |
| 1/500 sec | 1 | 1 |

The amplifier 8 includes an S/H (sample and hold circuit) 81, a VCA (voltage controlled amplifier) 82, a gamma compensation circuit 83, and a knee circuit 86. These are arranged relative to the CCD 43 as shown in FIG. 9. The VCA 82 is a circuit which changes its amplification (i.e., the sensitivity) in accordance with the voltage of a control signal A1.

There are two gamma compensation circuits having different gamma characteristics γ1 and γ2. The gamma circuits have terminals 85a and 85b, respectively. Switch 84 selects between one of the two characteristics γ1 and γ2. The gamma circuits are switched based on a 1-bit digital control signal C3 transmitted from the CPU 15 as shown in Table 2, below.

TABLE 2

| Characteristic | C3 |
| --- | --- |
| γ1 | 0 |
| γ2 | 1 |

Figure 10:
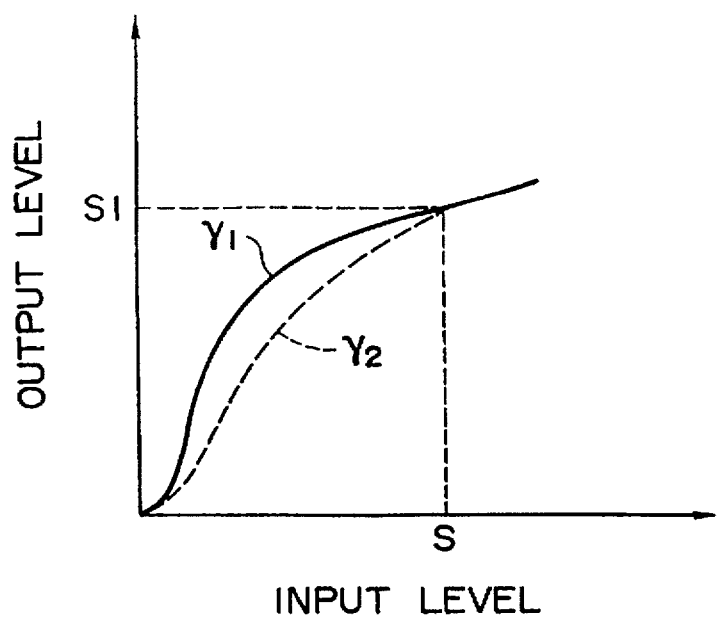
FIG. 10 is a graph showing a gamma characteristics between the amount of light and the output of the CCD circuit.

FIG. 10 shows the gamma characteristic γ1 and γ2 of the compensation circuits. The circuit modifies the input signal when the magnitude of the input signal is equal to or less than S. For example, if a magnitude of the input signal is S, the output is S1, corresponding to a white display. If the input level is greater than S, the gamma characteristic becomes linear and the output is also S.

Figure 11:
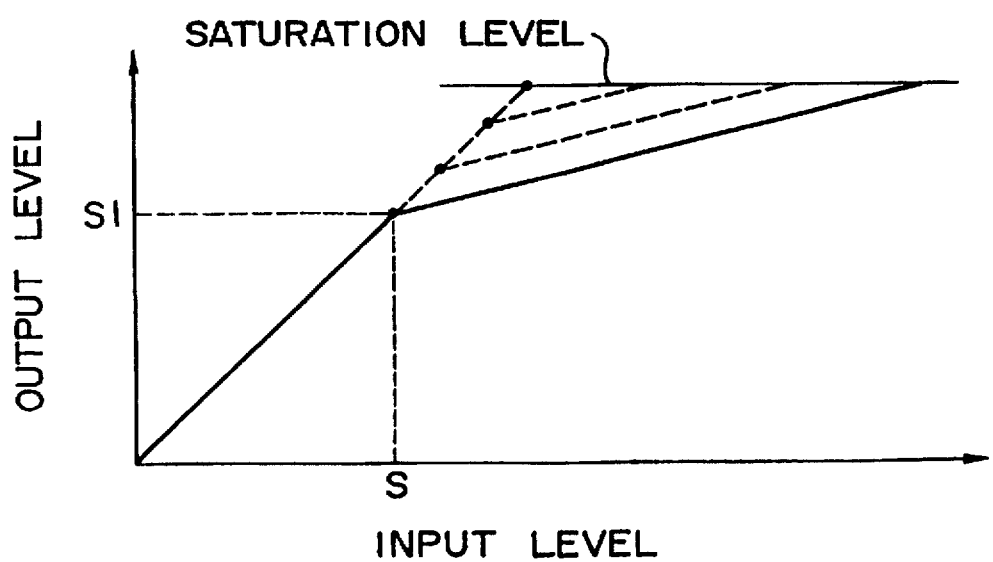
FIG. 11 is a graph showing the relationship between the amount of light incident on the CCD and the output of the CCD.

FIG. 11 shows the characteristic of the knee circuit 86. The knee circuit 86 compresses the data when the amount of light is larger than S. Below this level, the knee circuit 86 has a linear characteristic. If the point from which the compression is applied is lowered, the saturation level becomes great. In the embodiment, the knee characteristics as shown in FIG. 11 are changed stepwisely based on the control signal A2.

The control signals A1 and A2 are analog voltage signals, which are generated with a D/A converter 22 by converting digital signals outputted from the CPU 15 as shown in FIG. 9. The D/A converter 22 has two output channels, each can output one of sixteen-stepped voltages between 0 and 5 volts based on the serial data $D_1$ through $D_4$ output from the CPU 15. This comparison of the serial data $D_1$ through $D_4$ and the output voltage is shown in FIG. 20.

Figure 12:
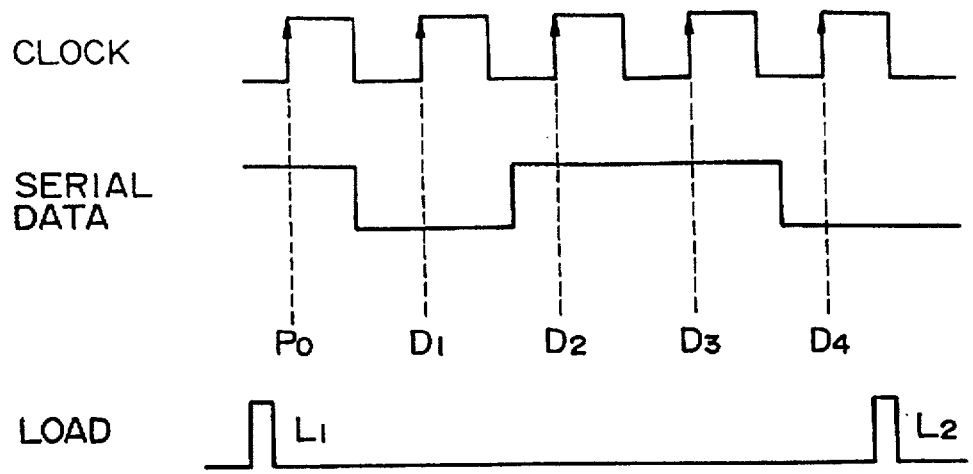
FIG. 12 is a timing chart showing a signal to be inputted to a D/A converter.

The CPU 15 also outputs a clock signal and a load signal to the D/A converter 22. FIG. 12 is a timing chart of these signals. After a first load signal L1 has been inputted, five bits of serial data $P_0$ and $D_1$ through $D_4$ is input synchronously with the clock pulse shown. When the second load signal L2 is inputted, the serial data $P_0$ and $D_1$ through $D_4$ is converted to a 5-bit parallel data inside the D/A converter 22, and further converted to the analog signals A1 and A2.

Figures 21, 22:
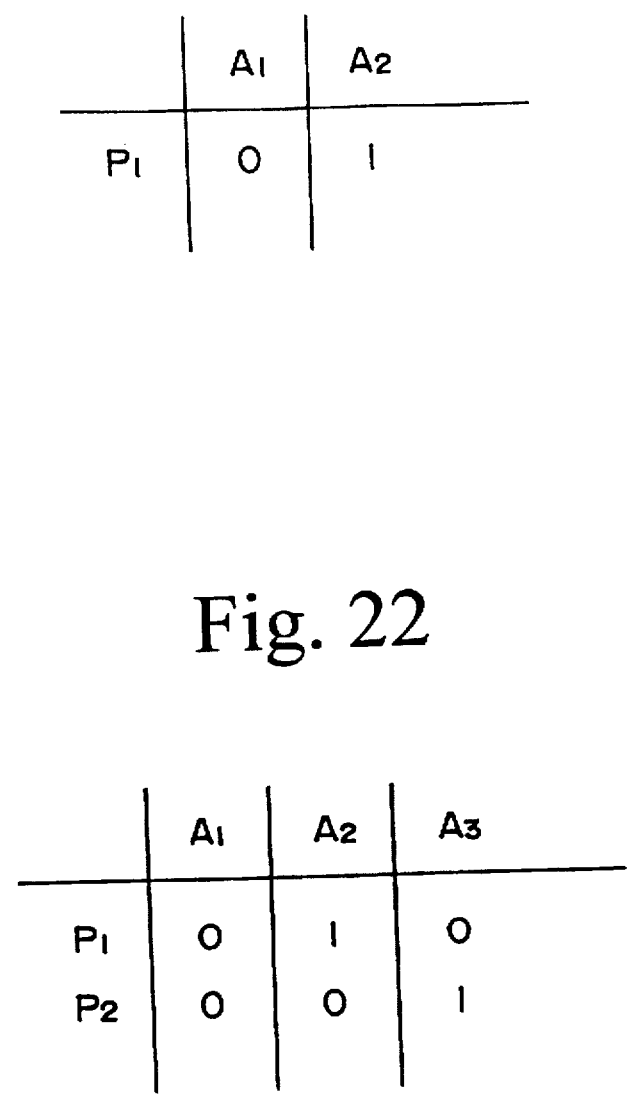

If the data $P_0$ equals 0, the voltage A1 is generated, if $P_0$ equals 1, A2 is generated (see, FIG. 21). The value of the voltage A1 or A2 is determined based on the combination of data $D_1$ through $D_4$; one of sixteen values is selected. When A1 or A2 is selected, the voltage value is sent to the VCA 82 or the knee circuit 86. The voltage value that is sent is stored by the respective circuit until a new value is sent. The data C1 through C3, $P_0$, $D_1$ through $D_4$ are stored in a non-volatile memory 23 which is connected to the CPU 15.

Figure 13:
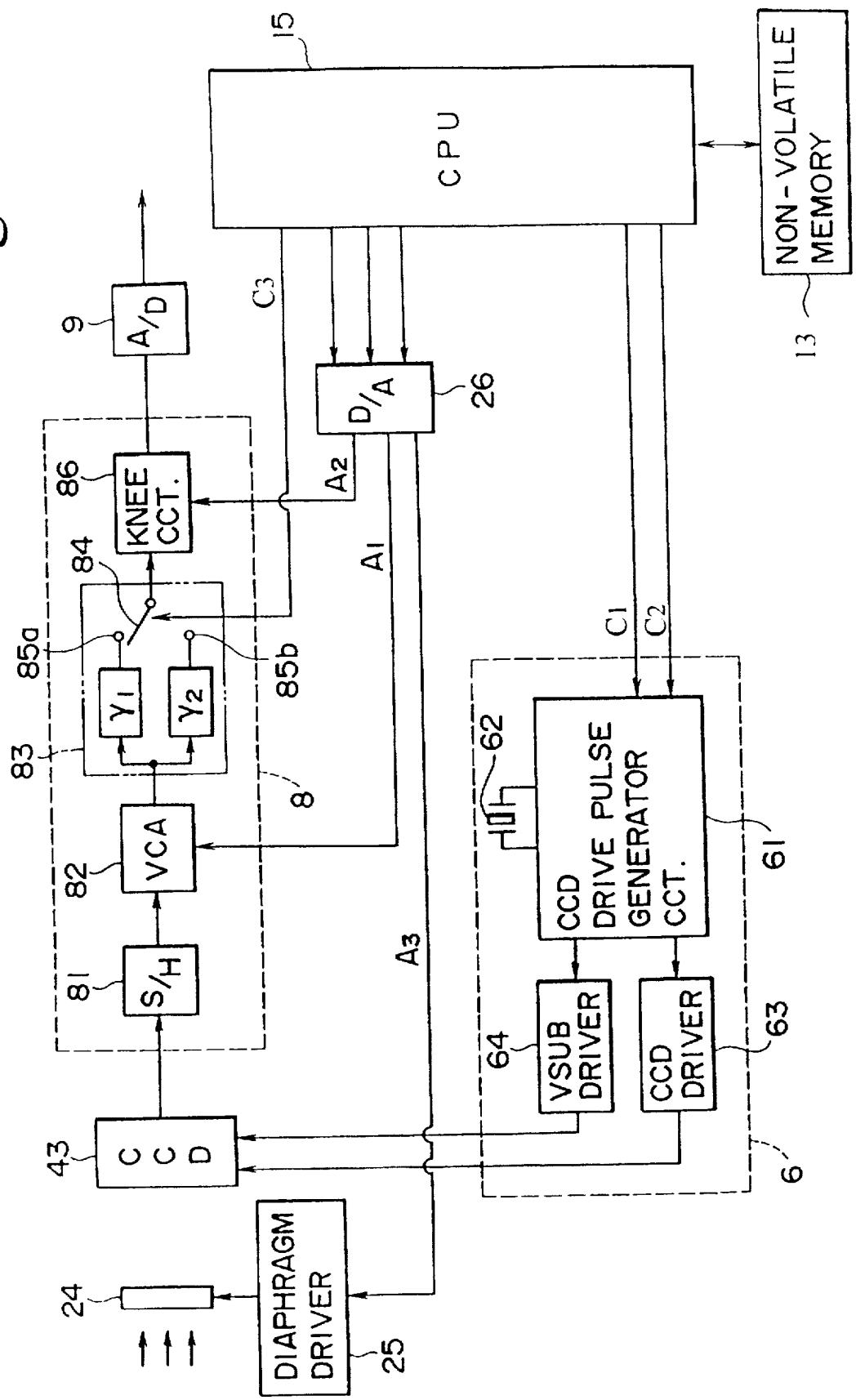
FIG. 13 is a block diagram showing modified CCD drive circuit and amplifier circuit.

FIG. 13 shows a third embodiment according to the present invention. The third embodiment is similar to the second embodiment described above except that a diaphragm mechanism 24 and a diaphragm driver 25 are provided. Elements similar to those described in the previous embodiments are indicated by the same reference numerals used hereinbefore.

Figure 14:
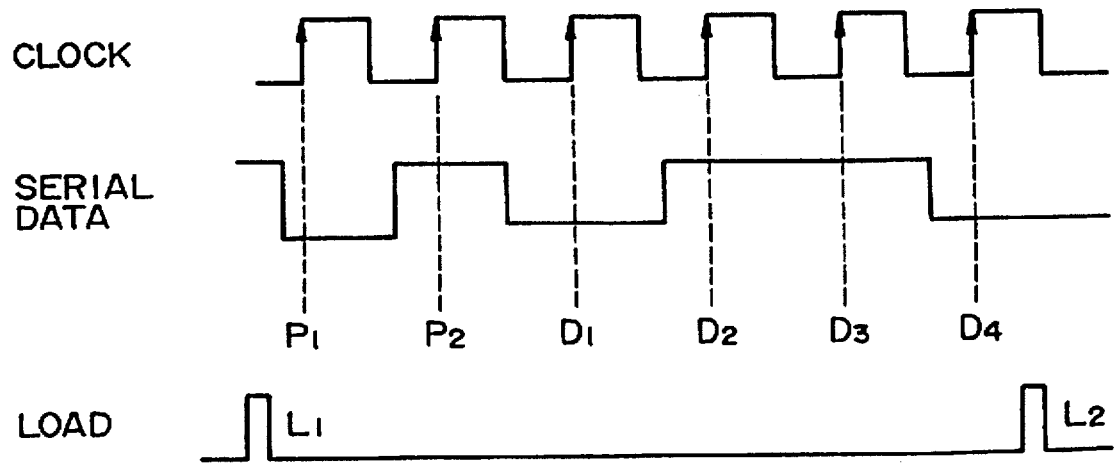
FIG. 14 is a timing chart showing a signal to be inputted to a D/A converter of the modified circuit shown in FIG. 13.

The diaphragm mechanism 24 is arranged in front of the CCD 43. The size of the aperture formed by the diaphragm mechanism 24 is changed by the driver 25. The driver 25 is controlled by the CPU 15 with a signal A3. The signal A3 is generated similarly to the signals A1 and A2; one of sixteen values. An extra bit $P_1$ is required in order for the signal A3 to be selected. The serial data required is shown in FIG. 14, and is similar to the serial data shown in FIG. 12 except for the extra bit. Similarly, the selection of A1, A2 and A3 with respect to $P_0$ and $P_1$ is shown in FIG. 22.

Figure 23:
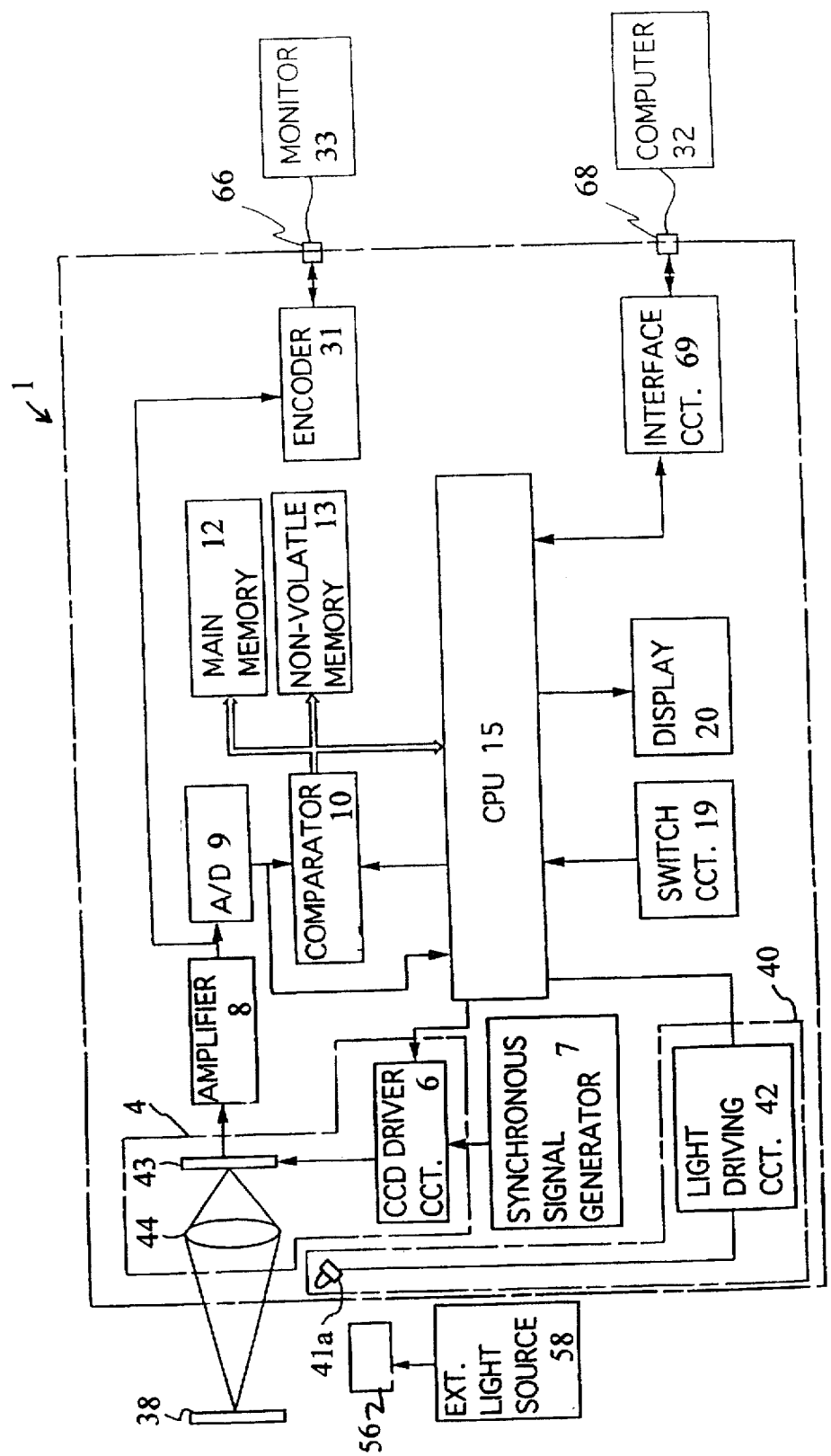
FIG. 23 shows a block diagram of another symbol reading device according to the present invention.

FIG. 23 shows a block diagram of a fourth embodiment of the symbol reading device 1 according to the present invention. Elements similarly to those in the previous embodiments are represented by the same reference numerals used hereinbefore.

Figure 33:
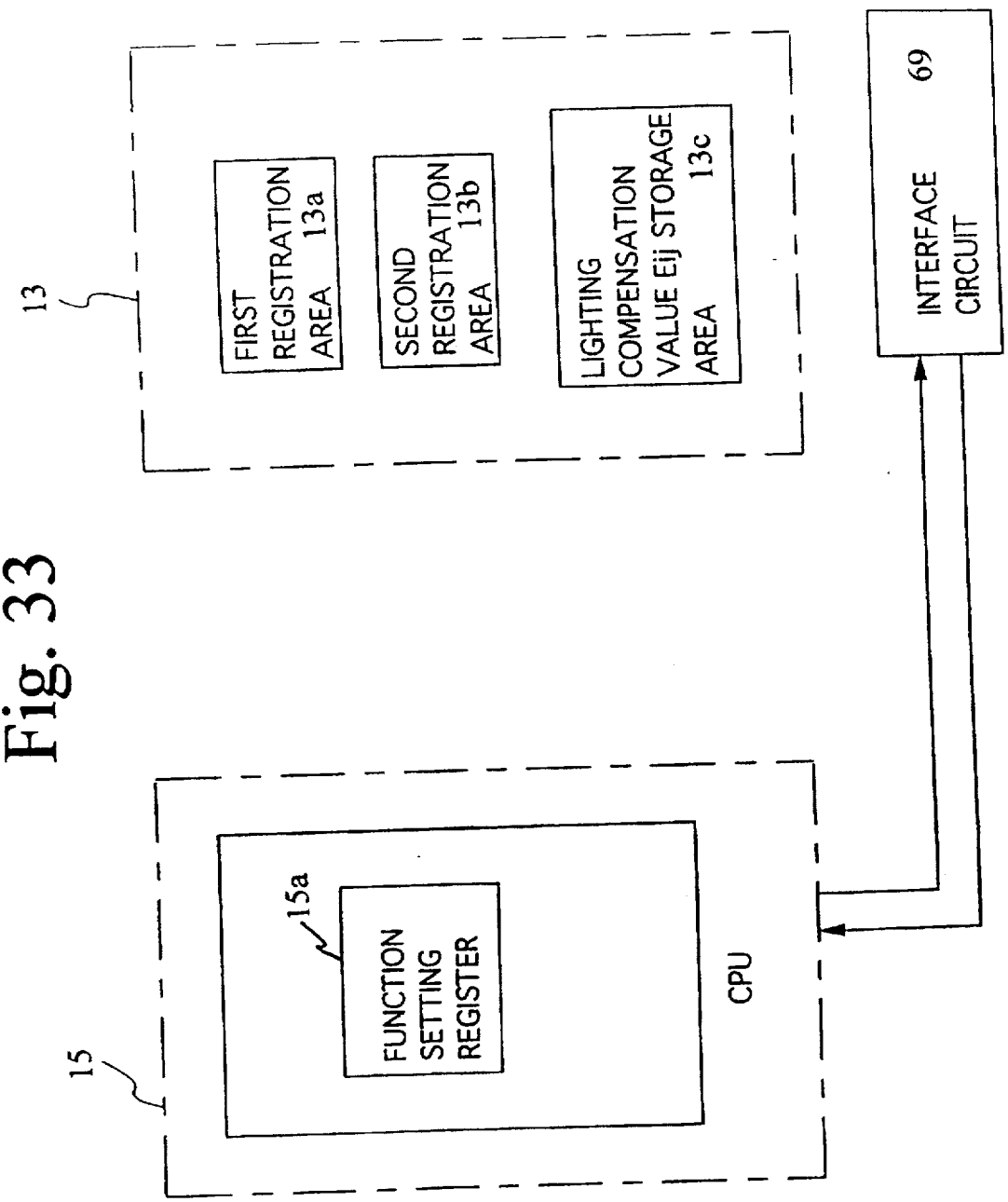
FIG. 33 shows a configuration of memory used in the symbol reading device shown in FIG. 23.

According to the fourth embodiment, the amplified signal is fed to an internal encoder 31 where it is encoded and sent via a video terminal 66 to an external monitor 33 for viewing. As shown in FIG. 33, the non-volatile memory 13 has a first registration area 13a for storing function setting values, a second registration area 13b for storing initial function setting values, and a compensation value storage area 13c for storing brightness compensation values Eij. The processed signal can also be sent to a computer 32 via an internal interface circuit 69 and a interface terminal 68.

Functions such as setting a timer interval Ti (described later), the turning ON/OFF of an image reversal mode and the turning ON/OFF of the automatic threshold mode, are controlled by command codes. The command codes are illustrated by communication data A shown in FIG. 24.

Figure 24:
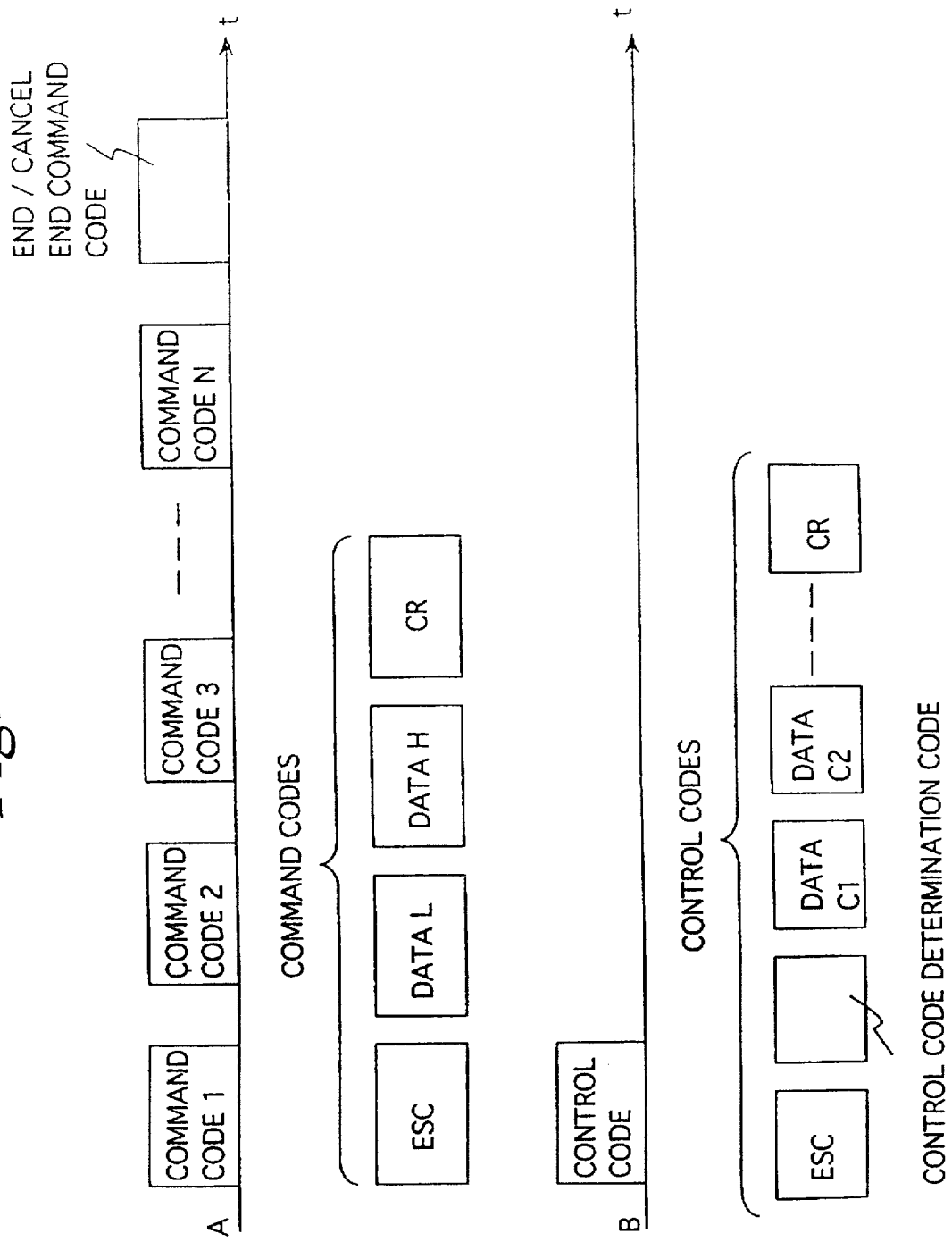
FIG. 24 shows a configuration of command and control codes used by the symbol reading device shown in FIG. 23.

The communication data A shown in FIG. 24 sends command code 1 through command code N, and then an "END"/"CANCEL END" command. Each of command codes 1, 2, . . . , N includes an escape code (ESC), data L, data H, and a carriage return (CR) code.

The "END"/"CANCEL END" command distinguishes the END or CANCEL END conditions. If the "END" command is output, all of command codes 1, 2, . . . , N are valid. If the "CANCEL END" command is output, none of them are valid (i.e., command codes 1, 2, . . . , N are all canceled).

Communication data B, which sends control codes, includes an escape code (ESC), a control code determination code, data C1, data C2, . . . , and a carriage return (CR) code.

The control code determination code is a code for identifying whether the communication data is data which includes command codes or control codes. For example, if the control code determination code has been identified as "P", then the presence of the code "P", will indicate the presence of the control code.

Figure 25A:
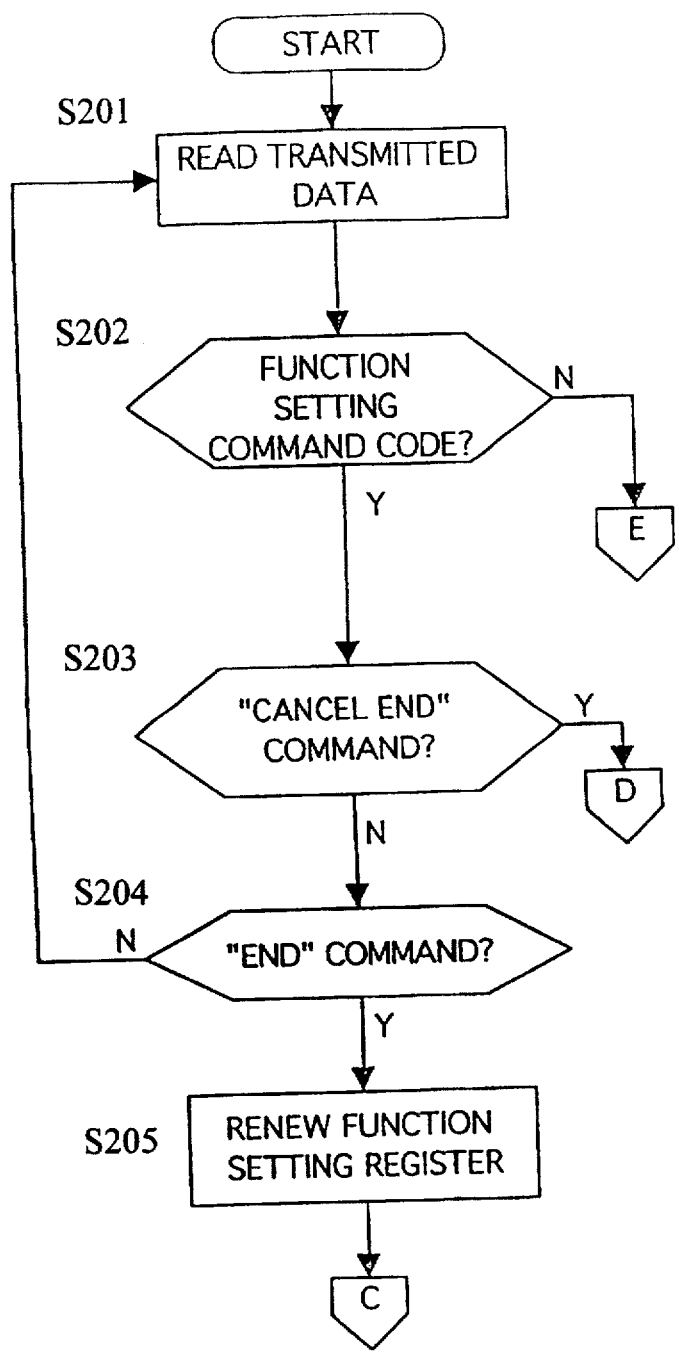
FIGS. 25A, 25B and 25C show a flowchart of a communication interruption procedure.
Figure 25B:
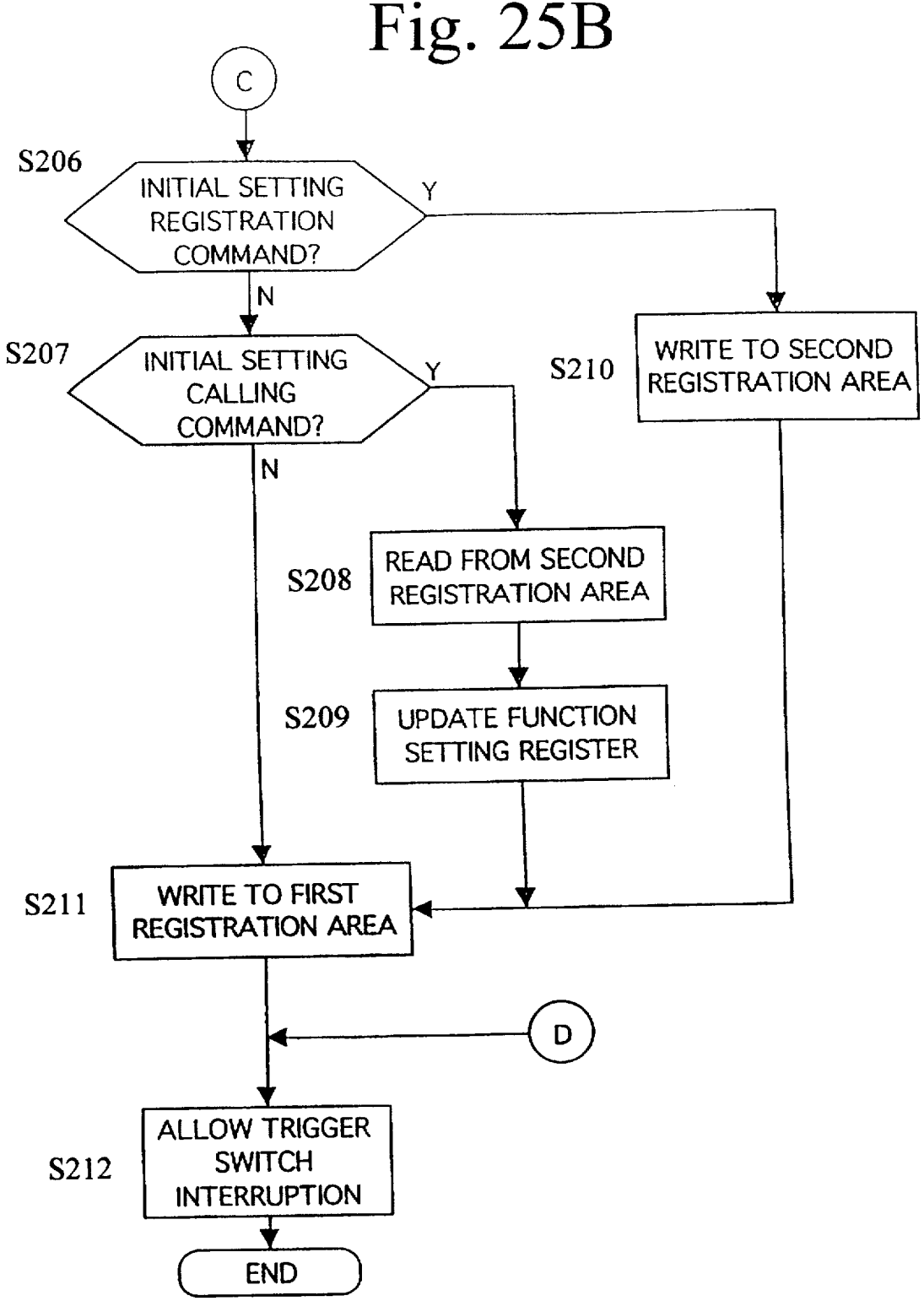
Figure 25C:
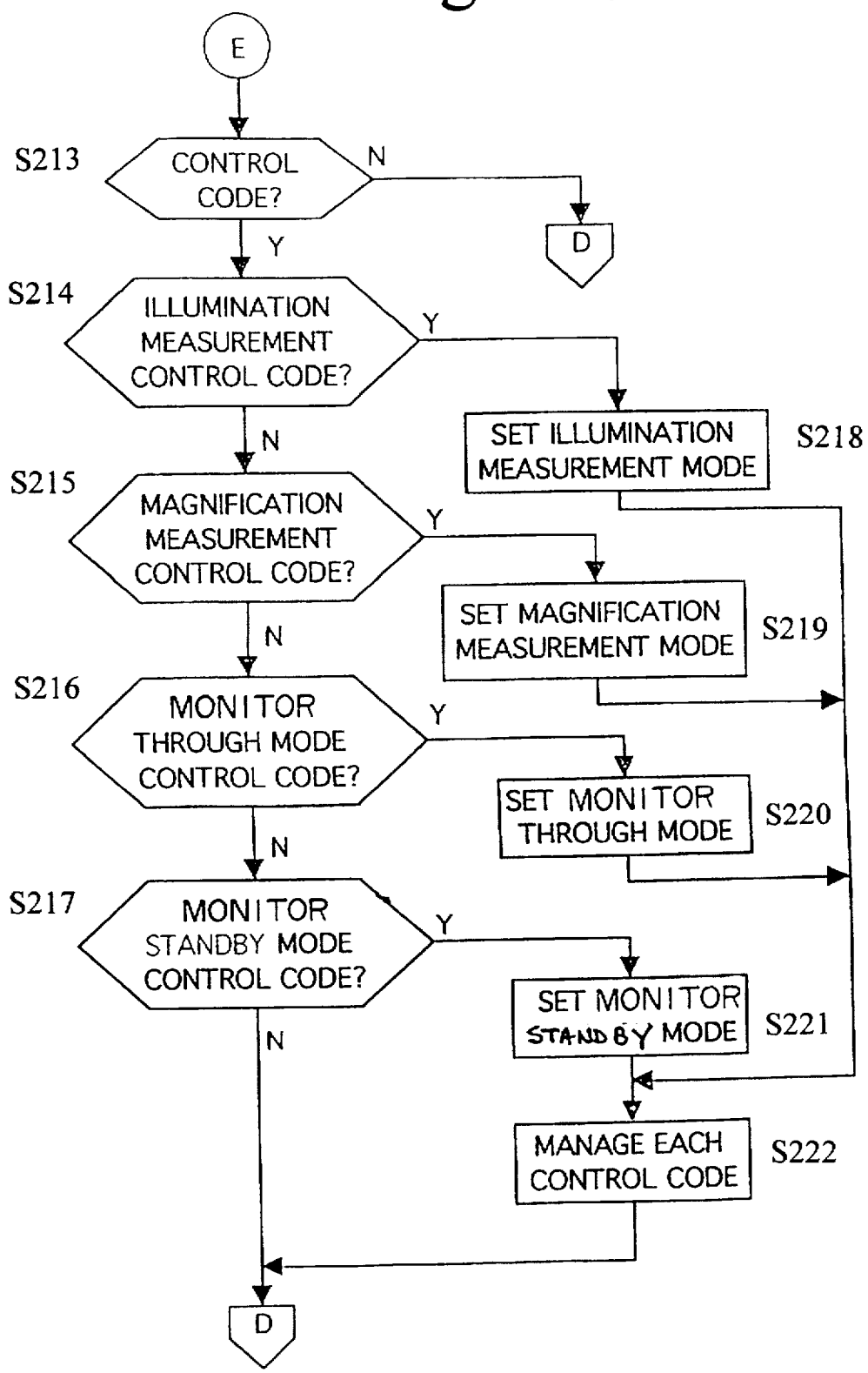

The communication interruption procedure which is used to receive the command and control codes, is shown in the flowchart of FIGS. 25A, 25B and 25C, and will be described in more detail below.

In the communication interruption procedure, the communication data is read in step S201. Step S202 determines whether the data is a function setting command code. If the data is not a function setting command code (S202:N), control goes to step S213. Otherwise control proceeds to step S203 which determines whether the data is a "CANCEL END" command. If the data is the "CANCEL END" command, all the received codes are invalidated and control goes to step S212 where the trigger switch 3 interruption is allowed.

If the command is not the "CANCEL END" command (S203:N), then step S204 determines whether the code is an "END" command. If the command is not the "END" command (S204:N) then control goes to step S201 and the transmitted data is read again. Otherwise, a function setting register 15a (see, FIG. 33) of the CPU 15 is updated in step S205, and control proceeds to step S206.

Step S206 determines whether the code is an initial setting registration command. If the command is the initial setting registration command (S206:Y), then a function setting value which has been stored in the function setting register 15a is written in the second registration area 13b of the non-volatile memory 13 in step S210 as an initial function setting value (i.e., an initial value of the function setting value).

If the command is not the initial setting registration command (S206:N), then step S207 determines whether the command is an initial setting calling command. If the command is the initial setting call command (S207:Y), the initial function setting value is read out of the second registration area 13b in step S208, and the function setting register 15a is updated in step S209. Then in the first registration area 13a, the function setting value which as been written in the function setting register 15a is written as the function setting value in step S211.

If it is determined that the command is not the initial setting call command in step S207, the function setting value which has been stored in the function setting register 15a is written in the first registration area 13a as a function setting value is step S211.

After the step S211 is executed, the trigger switch 3 interruption procedure is allowed in step S212.

If step S202 determines that the code is not the function setting command code, then control proceeds to step S213 which determines whether the data is a control code. If the data is not a control code, then control goes to step S212, where the trigger switch 3 interruption is allowed.

If the code is a control code (S213:Y), then the type of control code is determined in steps S214 through S217.

These control codes correspond to some of the modes of operation of the symbol reading device 1, described above.

Step S214 determines whether the received control code is an illumination measurement mode control code. If the control code is the illumination measurement mode control code (S214:Y), then the mode is set to the illumination measurement mode in step S218.

If the control code is not the illumination measurement control code (S214:N), then at step S215, it is determined whether the control code is a magnification measurement mode control code. If the control code is the magnification measurement mode control code (S215:Y), then the magnification measurement mode is set in step S219.

If the control code it not the magnification measurement mode control code (S215:N), then step S216 determines whether the control code is a monitor through mode control code. If the control code is the monitor through mode control code (S216:Y), then the monitor through mode is set in step S220.

If the control code it not the monitor through mode control code (S216:N), then step S217 determines whether the control code is a monitor standby mode control code. If the control code is the monitor standby mode control code (S217:Y), then the monitor standby mode is set in step S221.

If the control code is not the monitor standby mode control code (S217:Y), then control goes to step S212 where the trigger switch interruption procedure is allowed.

After the steps S218, S219, S220 or S221 are executed, one of the illumination measurement mode procedure (see, FIGS. 31A and 31B), the magnification measurement mode procedure (see, FIG. 29), the monitor through mode procedures (see, FIG. 26) or the monitor standby mode procedure (see, FIG. 27), is executed in step S222, according to the mode set.

Control then proceeds to step S212 where the trigger switch 3 interruption procedure is allowed to be executed. The trigger switch 3 interruption procedure is executed when the trigger switch 3 is turned ON. Then, the communication interruption procedure is completed.

As described above, the symbol reading device 1 can update the initial function setting values, the function setting values, and reset the function setting values to the initial setting values. Further, more than one control code and/or command code can be downloaded to the symbol reading device 1. For instance, the illumination measurement mode and monitor standby mode control code can both be downloaded to the symbol reading device 1. Then, when a trigger interruption procedure (described below) occurs, procedures related to both control codes will be activated.

Each of the various operation modes will be described below.

Figure 26:
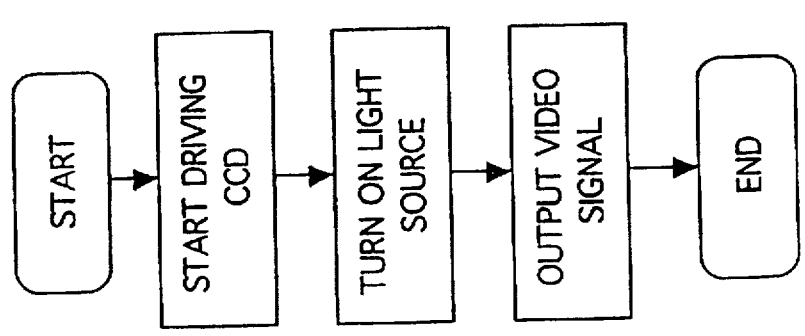
FIG. 26 shows a flowchart of a monitor through mode procedure.

FIG. 26 is a flowchart showing the monitor through mode (continuous mode) procedure. When the monitor through mode control code is received the operation mode of the symbol reading device 1 is set such that the symbol reading area of the encoded data symbol 38 is monitored through the monitor 33. Thus, in this mode, the image formed on the CCD 43 is directly displayed on the monitor 33.

In the monitor through mode, the CCD drive circuit 6 starts driving the CCD 43 in step S301. Then, in step S302, the light source driving circuit 42 turns ON the light source 41a. In step S303, the analog video signal is output, allowing an image of a reading area of the encoded data symbol 38 that is being read (i.e., the image received by the CCD 43) to be displayed on the monitor 33. Thus, in this mode, the video signal corresponding to the image received by the CCD 43 is transmitted from the terminal 66 to the monitor 33, thereby monitoring the symbol reading area.

Figure 27:
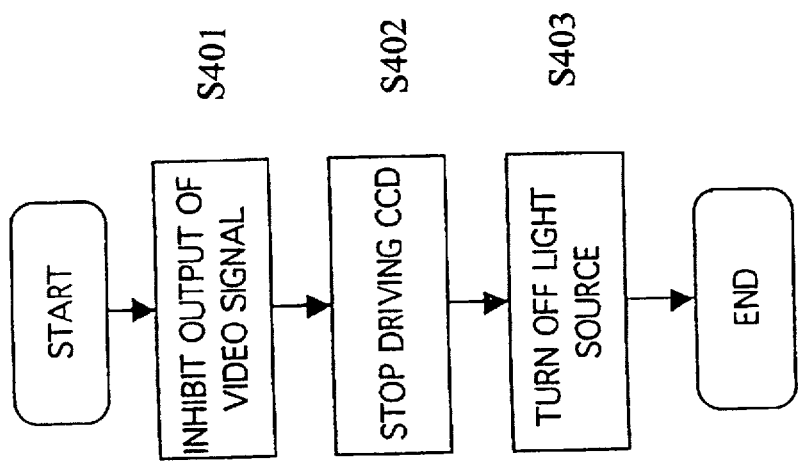
FIG. 27 shows a flowchart of a monitor standby mode procedure.

FIG. 27 is a flowchart illustrating a monitor standby mode procedure. This procedure is executed as soon as the symbol reading receives the monitor standby mode control code. The monitor standby mode inhibits the transmission of the video signal corresponding to the image of the area of the encoded data symbol 38 that is being read to the monitor 33, except for a predetermined time period after decoding has been performed.

In step S401, the transmission of the video signal is inhibited and, therefore, the video signal is not transmitted to the monitor 33, and the symbol reading area 36 cannot be monitored. This is achieved by having the CPU 15 transmit the mute signal to the encoder 31. When the mute signal is received, the encoder 31 outputs a monochrome image signal to the monitor 33, and thus a monochrome image is displayed on the monitor 33.

In step 402, the CCD drive circuit 6 stops driving the CCD 43. In step 403, the light source drive circuit 42 turns OFF the light source 41a. Since the encoded data symbol 38 is not read, it is not necessary to drive the CCD 43 and the light source 41a. Therefore, power can be saved.

FIG. 28 shows a timing diagram illustrating a comparison of the operation of the monitor through mode procedure and the monitor standby mode procedure. If the monitor through mode control code is input, the monitor through mode is set, and the symbol reading area of the encoded data symbol 38 is displayed on the monitor 33, as described above.

In the monitor through mode procedure, if the trigger switch 3 is ON, the exposure control and decoding procedures are performed, and the decoded data is output. In this case, as shown in FIG. 28, since the light source 41a, the CCD 43, and the video signal is always transmitted, a timer for the decoding procedure (described later) is not operated.

If the monitor standby mode control code is input, then the monitor standby mode procedure is executed and the transmission of the video signal is inhibited, except for a predetermined time after the decoding procedure.

In the monitor standby mode procedure, after the trigger switch 3 interruption procedure has occurred (described later), the video signal can be transmitted to the monitor 33, and the exposure and decoding are executed. Then the decoded data is output. the interval between turning ON the trigger switch and the outputting of the encoded data (or an error code) will be referred to as a main interval. After the decoded data has been output, the timer starts counting.

In the first registration area 13a (shown in FIG. 33), the timer interval Ti is stored. Unit the timer interval Ti elapses, (i.e., before the timer finishes counting), the transmission of the video signal remains enabled. After the timer interval Ti elapses, the transmission of the video signal, the light source 41a, and the CCD 43 are turned OFF.

In the monitor standby mode, power is saved. Further, the timer interval Ti can be visually recognized. During the main interval, and the timer interval Ti, the transmission of the video signal is allowed. Therefore, if the trigger switch is turned ON during the timer period Ti, the light source 41a, the CCD 43 and other circuits can be operated again without waiting for a warm-up period. Accordingly, a subsequent decoding procedure (reading operation) can be performed promptly.

Figure 29:
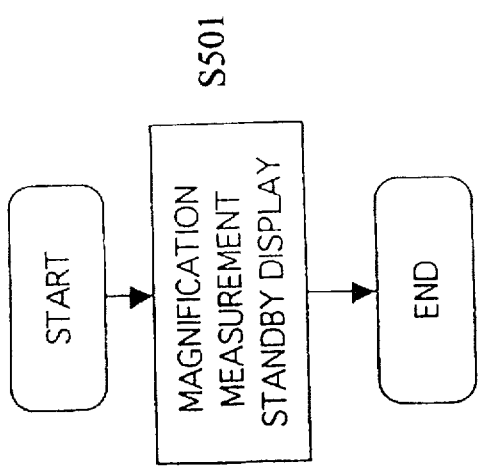
FIG. 29 shows a flowchart of a magnification measurement mode.

FIG. 29 is a flowchart illustrating the magnification measurement mode procedure.

The magnification measurement mode measures a magnification of the optical system 44. If the magnification measurement mode control code is input, the operation mode is set to the magnification measurement mode, and a magnification measurement mode procedure is executed.

In step S501 of the magnification measurement mode procedure (i.e., as soon as the symbol reading device receives the magnification measurement control code), a magnification measurement stand-by message indicating that the measurement of the optical system 44 can be executed, is indicated. The indication is made by continuously lighting, for example, the green LED of the display unit 20.

The measurement of the magnification of the optical system 44 in the magnification measurement mode will now be described.

Figure 30:
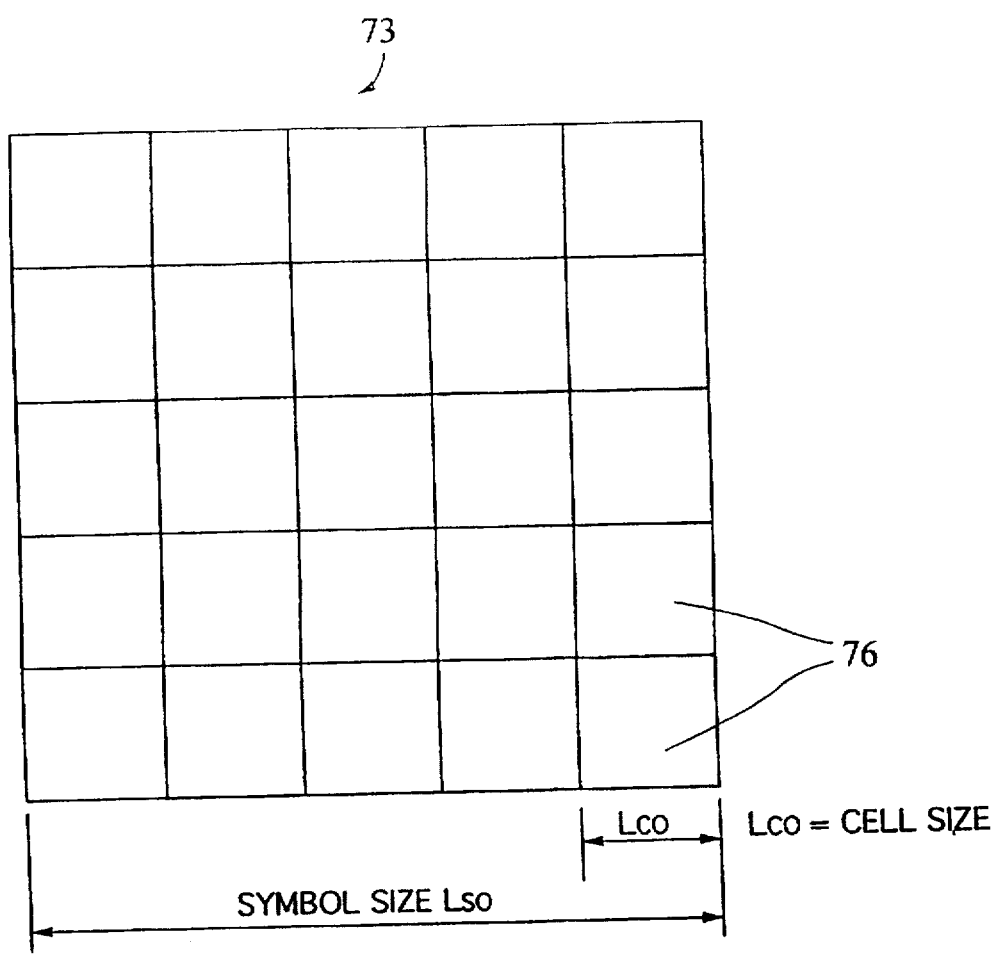
FIG. 30 shows an example of an encoded data symbol used for measuring the magnification of an optical system used in the symbol reading device shown in FIG. 23.

FIG. 30 shows an example of a symbol 73 for illustrating the measurement of the magnification of the optical system 44. In FIG. 8, the symbol 73 consists of cells arranged in an n×n matrix.

As shown in FIG. 8, a length of a side of the symbol 73 (i.e., the size of the symbol 73) is Lso, and the length of a side of each cell 76 is Lco. Further, the number of cells 76 in the symbol 73 is Nc, and the length of one side of the image of the encoded data symbol formed on the CCD 43 is Ls. Other parameters include the magnification (M) of the optical system 44, the number of pixels (Nsp) of the CCD 43 corresponding to the symbol size and the length of a side of a pixel (Sp) of the CCD 43. The equations (1), (2) and (3) below given the relationships between the above parameters.

(1) Lso=Lco×Nc;

(2) Ls=Lso×M; and (3) Ls=Nsp×Sp;

where the number of the pixels Nsp of the CCD 43 corresponding to the size of the symbol 73 is the number of pixels of a side of the image formed on the CCD 43, and the pixels along a side of the CCD 43 are parallel to each other. The number Nsp is obtained by converting the X-Y coordinates representing a side of the image into the number of pixels.

From the equations (1), (2), and (3), the following equation is obtained:

$$M = \frac{N_{sp} \times S_p}{L_{co} \times N_c} \quad (4)$$

In equation (4), the pixel size Sp has been stored in the ROM of the CPU 15, and the number of the pixels Nsp corresponding to the symbol size of the CCD 43 is determined a described above. The size of the cell Lco, and the number of the cells Nc, are transmitted as a magnification measurement control code. Thus, by substituting these parameters in equation (4), the magnification of the optical system 44 can be obtained.

Even if the magnification M of the optical system is unknown (e.g., when the magnification of the optical system 44 is changed), an encoded data symbol having a different number of cells Nc can be read (decoded) without detecting the size of the cells on the CCD 43.

Since the symbol reading device 1 is operable in the magnification measurement mode as described above, even if the size of the image of the encoded data symbol is changed (e.g., the magnification of the optical system 44 is change), with a simple operation (i.e., by inputting the cell size Lco and the number of the cells Nc), the magnification M of the optical system can be determined, and stored. Once the magnification M is stored, if either the cell size Lco or the number Nc of the cells is input, the other is automatically determined from equation (4). Thus, any data symbol can be read by inputting only one kind of data, which improves the operability of the device.

Generally, the cell size Lco is constant, and the number of the cells Nc is different. Thus, if the cell size Lco is stored, even if the number of cells Nc is changed, Nc can still be determined from equation (4) without being entered. Accordingly, an encoded data symbol having a different number of cells can be easily read.

FIGS. 31A and 31B show a flowchart illustrating the illumination measurement mode procedure.

When the symbol reading device 1 received the illumination measurement control code, the illumination measurement mode is started. In the illumination measurement mode, the distribution of the brightness of the background image of the symbol reading area is stored.

Step S601 of the illumination measurement mode procedure, sets the integration time (i.e., shutter speed) $T_1$ of the CCD 43. Then in step S602, the CCD drive circuit 6 starts driving the CCD 43, the light source 41a is turned ON by the light source driving circuit 42 in step S603. At step S604, an interruption of the trigger switch 3 is allowed. Step S605 determines whether an exposure level is proper, using a method described below.

Figure 32:
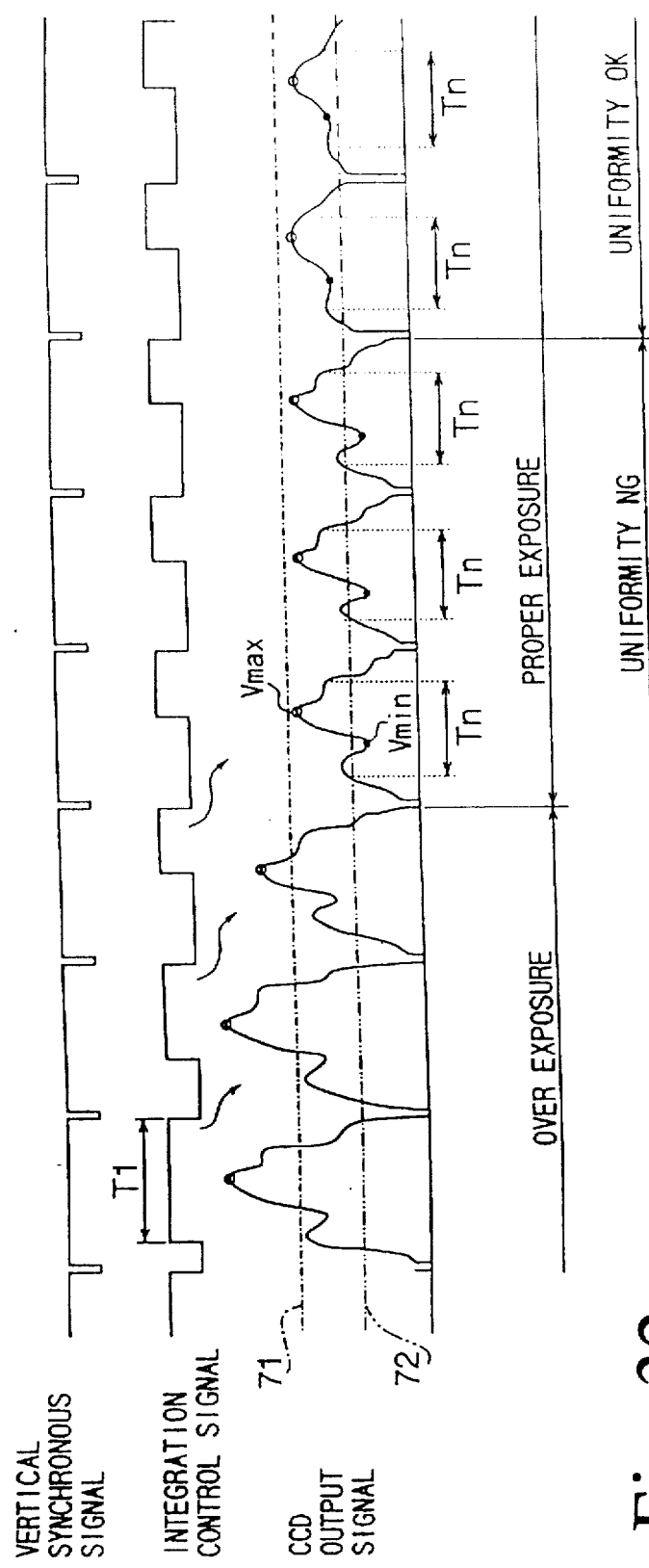
FIG. 32 shows a timing chart of the illumination measurement mode.

FIG. 32 is a timing diagram when the illumination measurement mode is selected. As shown in FIG. 32, if the maximum output value of the CCD 43 is between an upper threshold 71 and a lower threshold 72, the exposure is determined to be proper.

If the proper exposure level is achieved in step S605, the maximum value Vmax and the minimum value Vmin of the CCD output signal that occur within an examination period Tn, are determined in step S606. The examination period Tn is an interval of time between two successive pulses of the CCD output signal (i.e., the time interval between a falling edge of a pulse and a rising edge of a subsequent pulse).

By comparing Vmax and Vmin, the uniformity of the brightness distribution can be determined. The uniformity of brightness is determined if the equation (5) below is satisfied:

$$Vmin/Vmax > K; \quad (5)$$

where, K is a constant which is stored in memory.

Step S607 determines whether Vmin/Vmax>K. If this equation is satisfied (S607:Y), the image has uniform brightness and control goes to step S608 where the display unit 20 indicates that there is uniform brightness. If the condition is not satisfied (S607:N), the image does not have uniform brightness and control goes to step S609 where the display unit 20 indicates that the uniformity is no good (NG).

Then at step S610, the display unit 20 indicates that the exposure is proper. In this embodiment, uniform brightness is indicated by turning OFF the red LED of the display unit 20. Further, when the symbol reading device 1 is ready to make an exposure, the green LED of the display unit 20 is turned ON.

If Vmin/Vmax≦K (i.e., N in S607), a NG condition of the uniformity of the brightness and a proper exposure are indicated by turning OFF the red LED of the display unit 20, and by blinking the green LED.

After step S610 is executed, control returns to step S605.

If it is determined in step S605 that the exposure is not proper, then step S611 determines whether the image is overexposed.

If the maximum value of the output signal of the CCD exceeds the upper threshold value 71, then the image is over exposed. Conversely, if the maximum value is less than the lower threshold value 72, then the image is under exposed. If the image is over exposed in step S611, an integration interval $T_1$ of the CCD 43 is shortened in step S612 such that:

$$T_1 = T_1 / \Delta T;$$

where $\Delta T > 1$.

At step S613 it is determined whether $T_1 < T_s$, where $T_s$ is a lower limit of the integration period of CCD 43. If $T_1 \geq T_s$ in step S613, then control returns to step S605.

If $T_1 < T_s$, then $T_1$ is set to $T_s$ in step S614.

In step S615, an exposure NG condition is indicated, and then control returns to step S605. Exposure NG is indicated by turning OFF the green LED and blinking the red LED of the display unit 20.

If step S611 it is determined that the image is under exposed, then the integration interval $T_1$ is lengthened as follows:

$$T_1 = T_1 \times \Delta T;$$

where, $\Delta T > 1$.

Then step S617 it is determined whether $T_1 > T_L$. The value of $T_L$ represents an upper limit of the integration interval of the CCD 43. If it is determined that $T_1 \leq T_L$ in step S617, control returns to S605. If it is determined that $T_1 > T_L$, $T_1$ is set to $T_L$ in step S618 and control returns to step S615, where the exposure NG condition is indicated. Then control proceeds to step S605.

In the illumination measurement mode, automatic exposure control is performed. As shown in FIG. 31, if over exposure occurs, $T_1$ is shortened by dividing $T_1$ by $\Delta T$ such that $T_1 \geq T_s$ is always satisfied. The maximum value of the output signal of the CCD gradually decreases, and when the output signal becomes lower than the upper threshold value 71, a proper exposure is achieved. when the proper exposure is achieved, the integration interval Ti is kept constant.

If under exposure occurs (not shown in FIG. 31), then $T_1$ is lengthened within the range $T_1 \leq T_L$, by multiplying by $\Delta T$. When the output signal exceeds the lower threshold value 72, the proper exposure is achieved.

The symbol reading device 1 of the present invention has the illumination measurement mode as described above. Further, as described above, a proper exposure level (or exposure NG) and uniformity of brightness can be individually indicated.

Further, if the proper exposure level is not achieved, by changing the background pattern of the encoded data symbol or the light source 56, a proper exposure level can be obtained. When the proper exposure level is achieved, the encoded data symbol can be read. Further, illumination compensation values Eij and threshold values Sij for a comparison procedure can be easily obtained.

The methods of determining whether the exposure is proper and the methods of determining the uniformity of the brightness of the optical image are not limited to those described above. The exposure level can be determined based on whether an average value, center-weighted value, or a minimum value during a certain time interval of exposure is within a predetermined range. The uniformity can be determined in accordance with the ratios Vmin/Vav, or Vmax/Vav, where Vav is an average value.

As described above, when the illumination measurement mode control code is first received, the above steps are carried out until the trigger interrupt is received. The procedure performed after the trigger interruption has occurred will be described later.

The automatic threshold mode is set with a command code. In the automatic threshold mode, during every reading operation of an encoded data symbol, a threshold value Sij is obtained based on the CCD image data of the first exposure or by the procedure outlined above. The digital image signal obtained when the main exposure is executed is then compared with the threshold value Sij. The threshold value Sij is a value between adjacent maximum and minimum values of the CCD image data.

In the automatic threshold mode, the threshold values Sij are obtained based on the distribution of the optical image when the encoded data symbol 38 is read. The threshold values Sij can also be obtained as previously described. Binary data is then generated by using the threshold values Sij, and therefore the encoded data symbol 38 can be read accurately.

If the mode is not the automatic threshold mode (but a simplified threshold mode), the threshold values Sij are calculated based on the compensation values Eij which have been stored in the non-volatile memory 13. This procedure is faster than the automatic threshold mode.

The decoding procedure will be described below with reference to FIGS. 34A and 34B. The decoding procedure includes noise filtering sub-sampling, symbol edge detection and data decoding.

Initially, primary image data (i.e., binary data) corresponding to an obtained image is compressed by applying the noise filtering operation and sub-sampling operation to produce secondary image data (sub-sampling data). Then, the symbol edge detection is performed using the secondary image data. The secondary image data is only used for the symbol edge detection operation. The decoding of the encoded data symbol is performed using the primary image data corresponding to a portion of the image located within an area inside the edge of the encoded data symbol, as determined by the symbol edge detection operation.

The primary image data and the secondary image data are stored in different areas of the main memory 12.

Figure 34A:
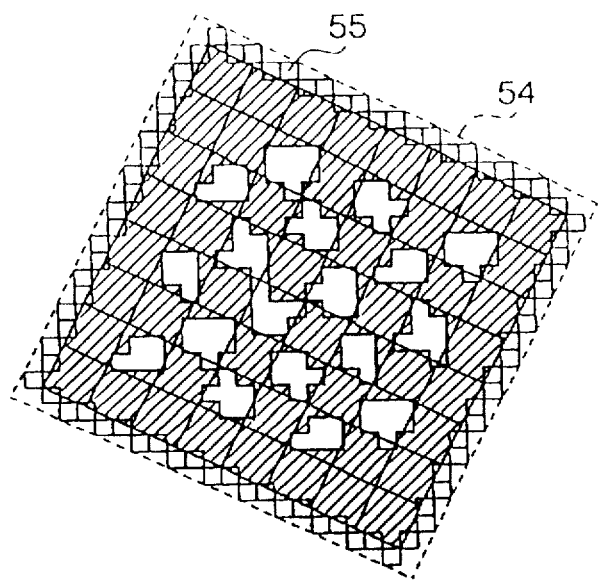
FIGS. 34A and 34B show examples of pre-sampled and post-sampled images of a data symbol.
Figure 34B:
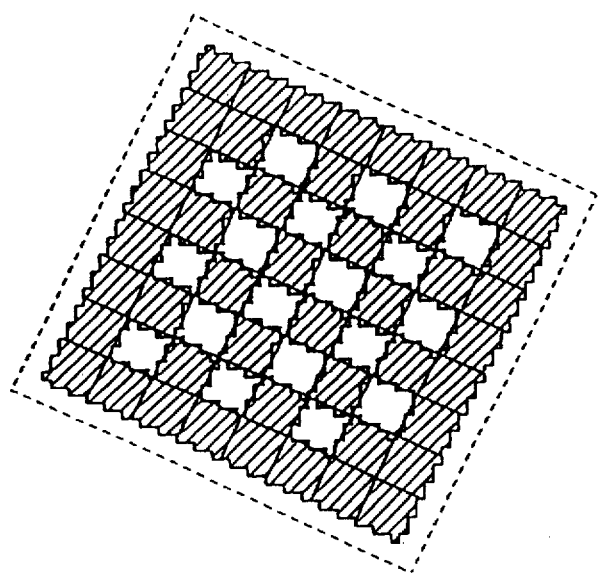

FIGS. 34A and 34B show examples of the secondary image (post-sampling image), and the primary image (pre-sampling image), respectively.

As shown in FIGS. 34A and 34B, noise filtering and sub-sampling operations are executed for a unit of four pixels (2×2 pixels). The sub-sampling operation is executed such that he pixel units do not overlap. Thus, if a unit of four pixels is processed (noise filtering is applied), and then an adjacent unit of four pixels is processed.

If at least two of the four pixels in the primary image are 'black', then all four pixels are set to 'black'. Otherwise all four pixels are set to 'white'. This process is applied to every unit of pixels. Further, each unit of pixels is represented by one bit, producing the secondary image data having less data than the primary image data.

As shown in FIG. 34B, in the symbol edge detection operation, an envelope 54 of white pixels 55 adjacent to the black pixels at the peripheral portions of the secondary image is detected. Therefore, by executing the noise filtering and sub-sampling operations, the secondary image data having less information than the primary image data, is obtained. Further, the noise in the data is reduced. This allows the symbol edge detection to be performed at high speed, thereby improving the overall efficiency of the symbol reading device 1. For the quick detection of the symbol edge, it is preferable that the encoded data symbol has a pattern which clearly indicates adjacent sides of the frame of the encoded data symbol 38.

After the edge of the encoded data symbol 38 has been detected, the decoding of the primary image data contained within the edges of the encoded data symbol 38, can be performed. In the decoding procedure, an image reversal mode (described below) is turned ON or OFF. If the image reversal mode is turned ON, the order of reading the primary data corresponding to the units of pixels of the encoded data symbol 38 is reversed (described below). If the image reversal mode is turned OFF, the reading order is unchanged.

The noise filtering, sub-sampling, and symbol edge detection operations, are not limited to those described above. Alternatively, the analog signal output by the CCD 43 can be filtered with a low pass filter, and then converted into a digital signal. The digital image signal is then compressed and stored in the main memory 12 at a predetermined address. The stored data can then be used as a secondary image data.

Further, the output signal of the CCD 43 can be converted into the digital signal without filtering, and stored in the main memory 12 in order to obtain the primary image data.

The image reversal mode will be described below with reference to FIGS. 35, 36 and 37.

Figure 35:
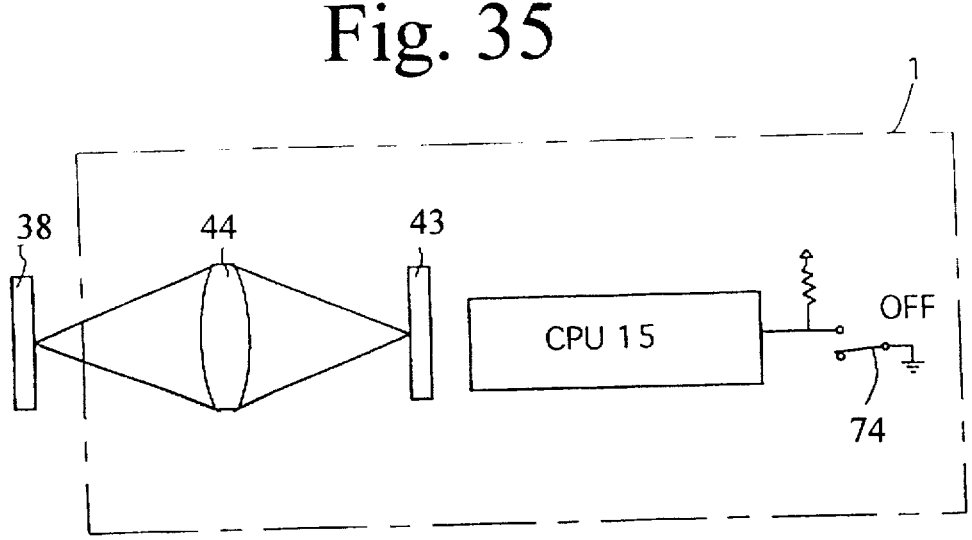
FIG. 35 shows a normal optical system which may be used in the symbol reading device shown in FIG. 23.
Figure 36:
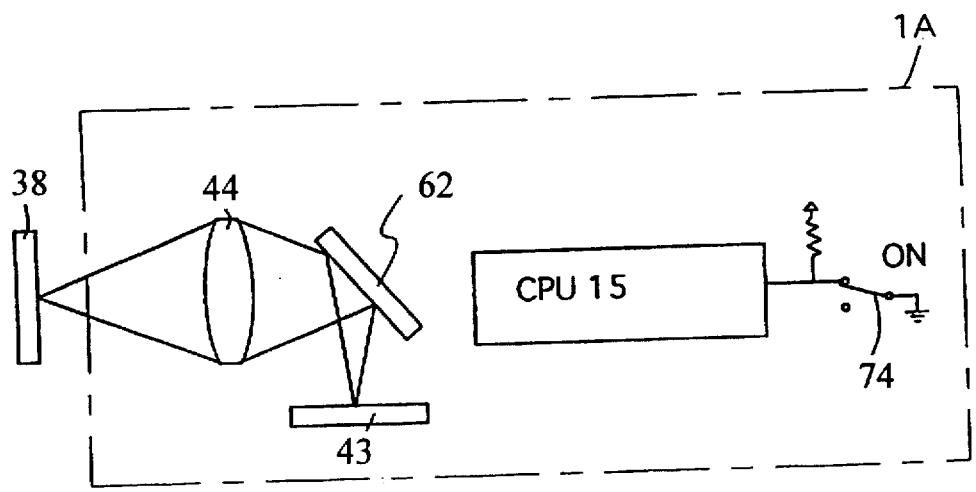
FIG. 36 shows an inverted optical system which may be used in the symbol reading device shown in FIG. 23.

FIG. 35 shows the symbol reading device 1 having a normal optical system while FIG. 36 shows a modified symbol reading device 1A which has an image reversing optical system.

As shown in FIGS. 35 and 36, the symbol reading devices 1 and 1A have an image inversion detection switch 74 for detecting whether the optical system 44 is an image reversing optical system. If the optical system 44 is an image reversing optical system, the optical system 44 has a mirror 62. The mirror 62 is used to form an inverse image of the encoded data symbol 38 on the CCD 43.

As shown in FIG. 35, if the optical system 44 does not reverse the image, then the image inversion detection switch 74 is set to an OFF position. However, if the optical system does reverse the image, as shown in FIG. 36, then the image inversion detection switch 74 is turned ON. Alternatively, if the reversed image is formed on the CCD 43, by turning OFF the image inversion detection switch 74, and transmitting the reverse picture command code from the computer 32 to the CPU 15, a normally oriented image can be formed.

Figure 37:
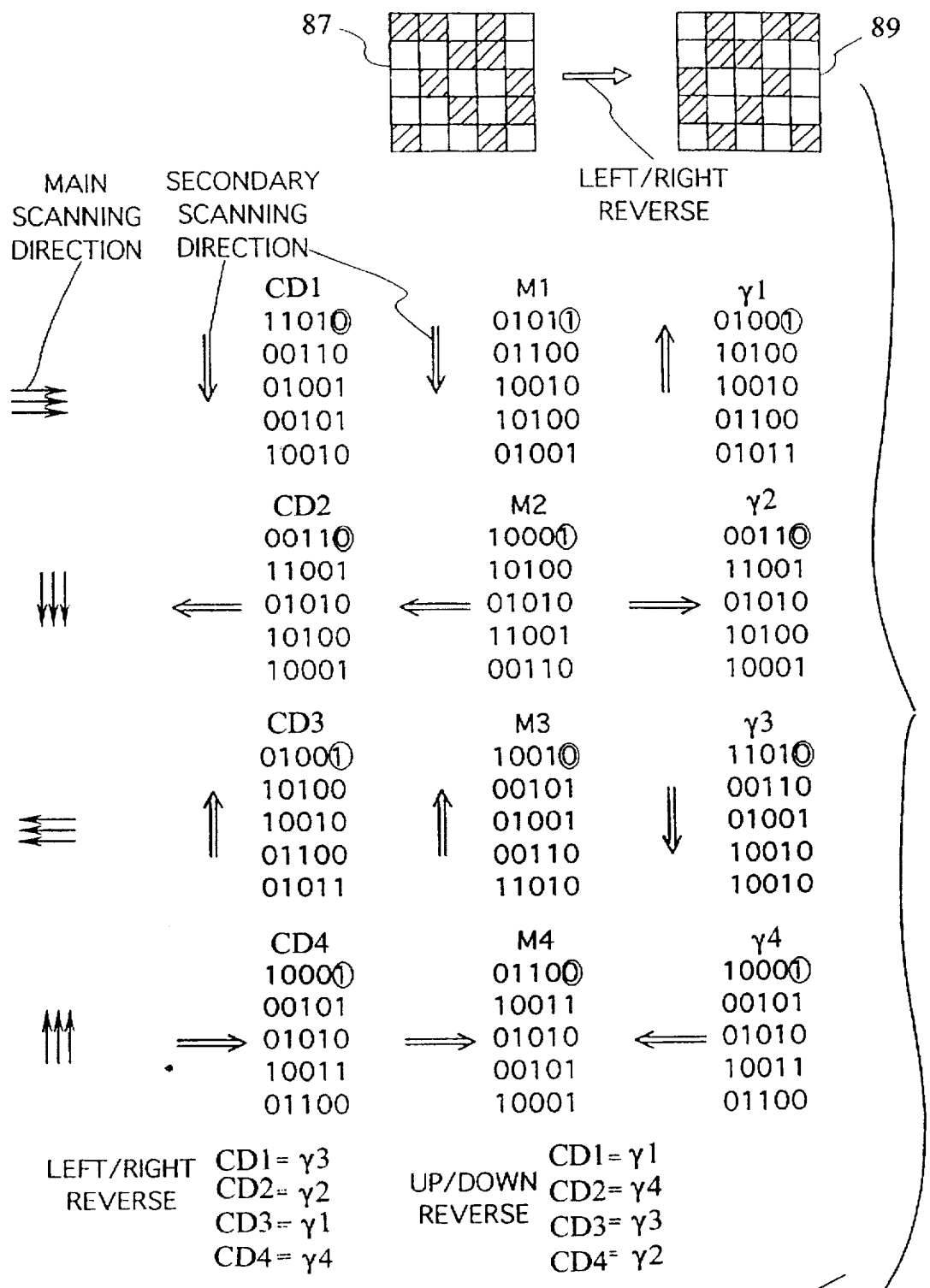

FIG. 37 is a chart showing a decoding procedure when the image reversal mode is ON. As shown in FIG. 37, if the encoded data symbol 38 is read normally, a correctly oriented image 87 would be obtained. If the encoded data symbol 38 or the optical system 44 is left/right reversal (as shown in the FIG. 37) and the encoded data symbol 38 is read normally, a reversed image 89 can be obtained.

If the correct image 87 is read from the memory in accordance with the sampling order (main scanning and secondary scanning) as indicated in the figure, cell data CD1, CD2, CD3 and CD4 are obtained. More specifically, the sampling order is defined with the main scanning direction and the auxiliary scanning direction. The image 87 is read four times by changing the main scanning direction such that the directions are parallel to sides of the symbol edge which has been detected with use of the secondary image, and that the auxiliary scanning direction is changed in accordance with the changed direction of the main scanning direction. The relationship of the auxiliary scanning direction relative to the main scanning direction for each sampling is unchanged. A main scanning direction for each sampling of the four sides of the image 87 is sequentially selected in a clockwise direction as indicated by an arrow in FIG. 37. Further, since the size of each cell is known, when the image data is read from the memory, sampling of the data is performed such that 1-bit of data is output for each cell. In other words, by knowing the cell size, one-bit data is generated to represent each cell. Therefore, the amount of data read out of the memory becomes much less than the amount of data stored in the memory.

If the reversed image 89 is read from the memory in accordance with the same sampling order as above, cell data M1, M2, M3 and M4 are obtained. As shown in FIG. 37, the data CD1 through CD4 are different from the data M1 through M4.

In this embodiment, if a reversed image is to be processed (as a result of turning on the image inversion detection switch 74), the encoded data symbol is read in the normal scanning direction (i.e., as if the image was not reversed) and the image data is stored in memory. Then, by reversing the reading order of the stored image data, the cell data Y1, Y2, Y3 and Y4 are obtained using the scanning directions shown in FIG. 37. When Y1 through Y4 are to be obtained, the main scanning direction is the same as that for obtaining cell data CD1 through CD4, however the secondary scanning direction is reversed.

If the encoded data symbol 38 is left/right reversed, then each of the cell data Y1 through Y4 corresponds to one of the cell data CD1 through CD4 (i.e., CD1=Y3, CD2=Y2, CD3=Y1 and CD4=Y4).

If the encoded data symbol 38 or the optical system 44 is reversed such that an upside down image (not shown) is produced, then with the same sampling order, each of the cell data Y1 through Y4 corresponds to the cell data CD1 through CD4 (i.e., CD1=Y1, CD2=Y4, CD3=Y3 and CD4=Y2).

As described above, one of the cell data Y1 through Y4 is correct. The identification of the correct cell data is determined based on a parity bit. For example, if the right-most bit on the first line of the data area is used as the parity bit (circled in FIG. 37), then the parity bit is "0" if the number of "1"s in the four cells of the first line is odd, and the parity bit is "1" if the number of "1"s of the four cells of the first line is even. Accordingly, the data Y3 is determined to be correct.

Even if the image reversal mode is OFF, the cell data is determined to be correct by checking the parity bit, as described above. However, the determination of the correct data is not limited to the parity bit method described above, but any method is applicable. For example, predetermined data can be inserted at a predetermined position (such as a corner), and the correct data can be selected by detecting the predetermined data located at the predetermined position.

Figure 38:
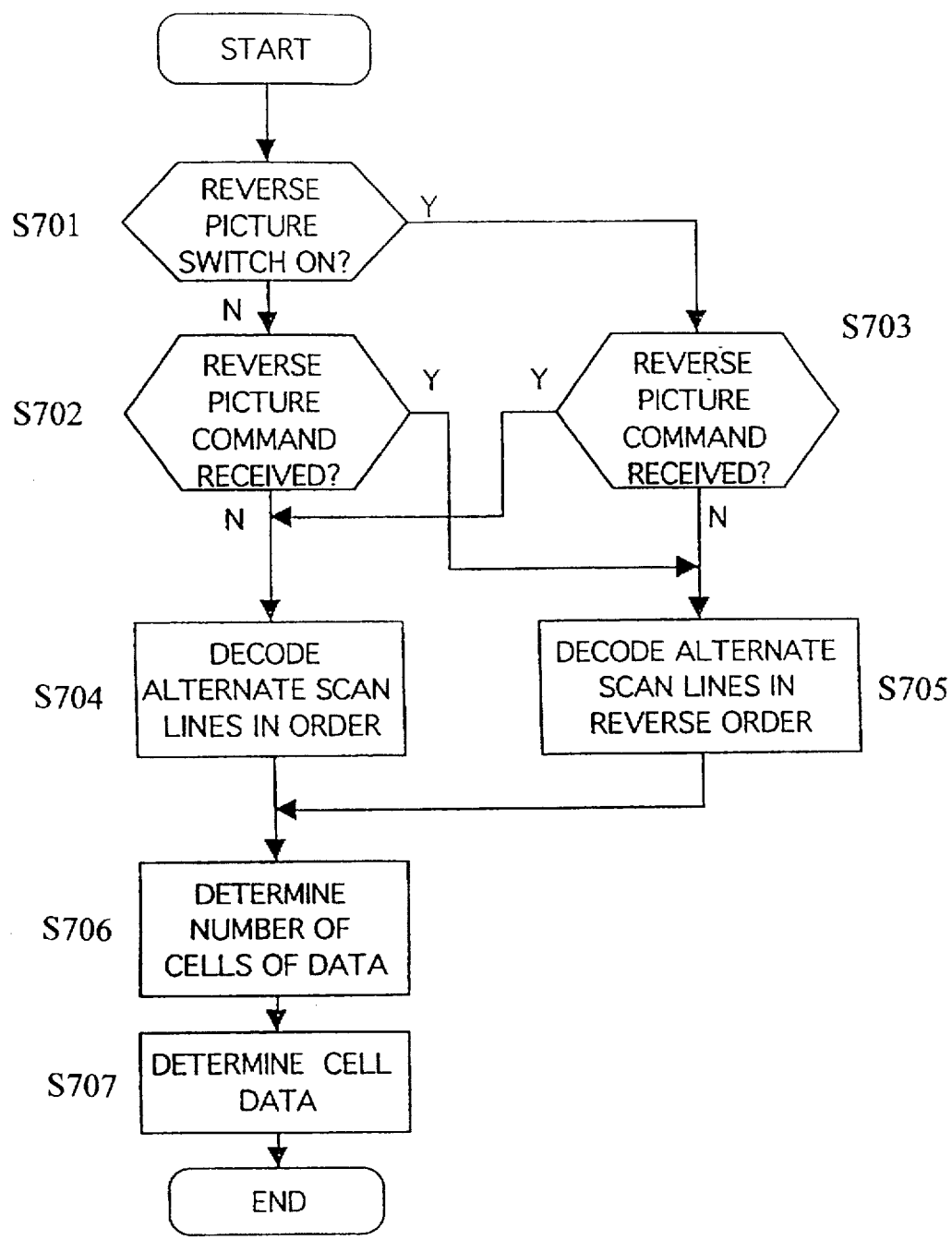
FIG. 38 is a flowchart of the decoding procedure shown in FIG. 37.
Figure 39A:
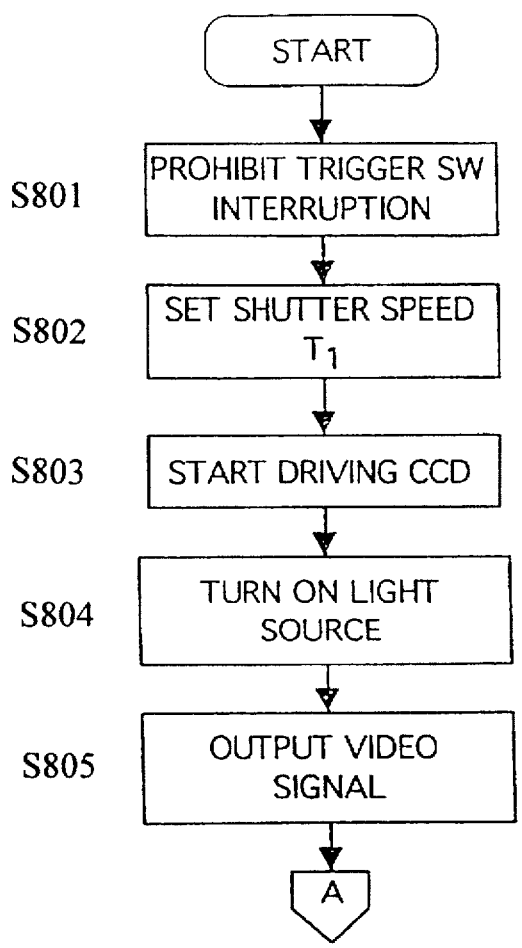
FIGS. 39A, 39B, 39C, 39D, 39E and 39F show a flowchart of a trigger switch interruption procedure.
Figure 39B:
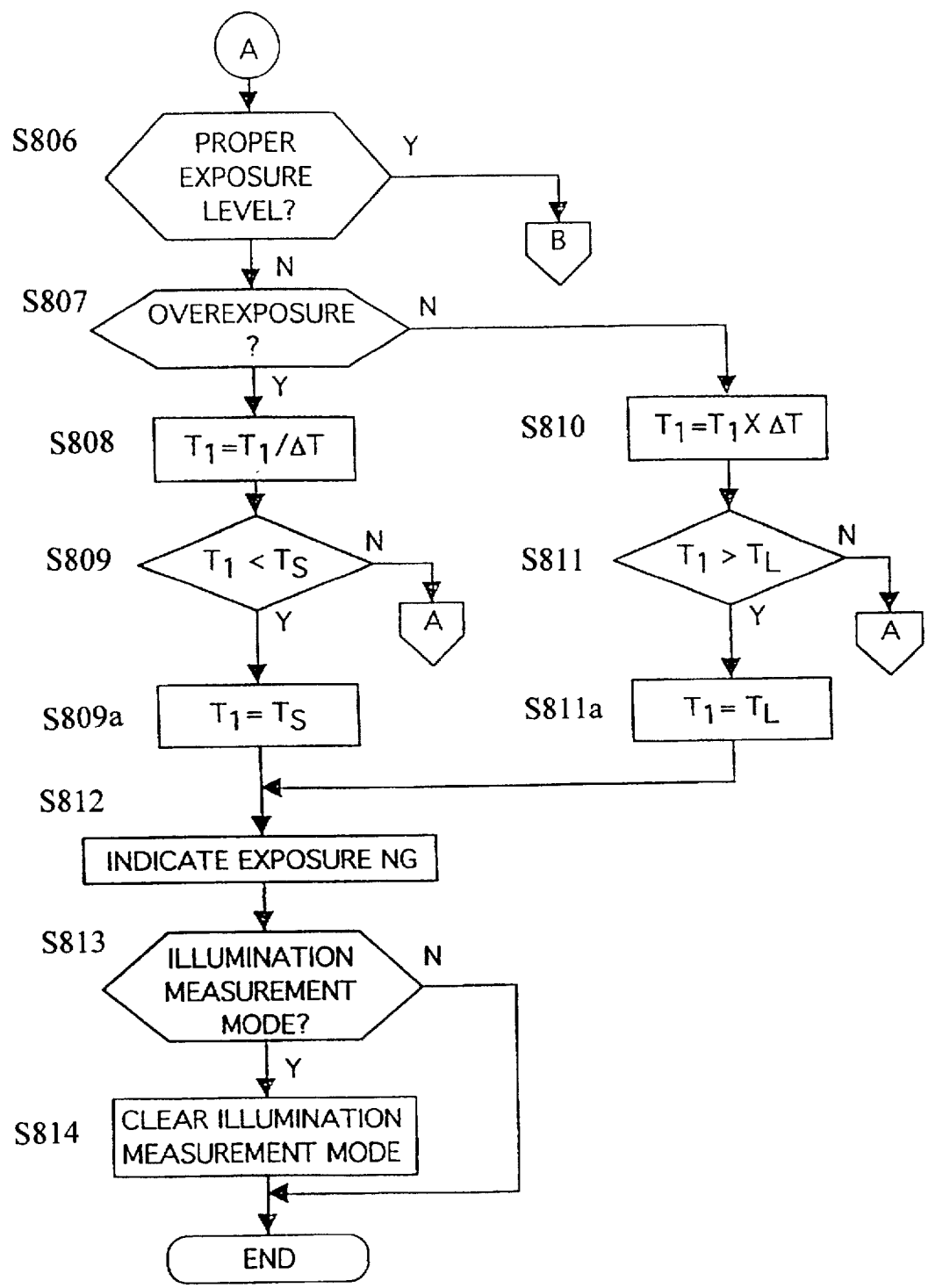
Figure 39C:
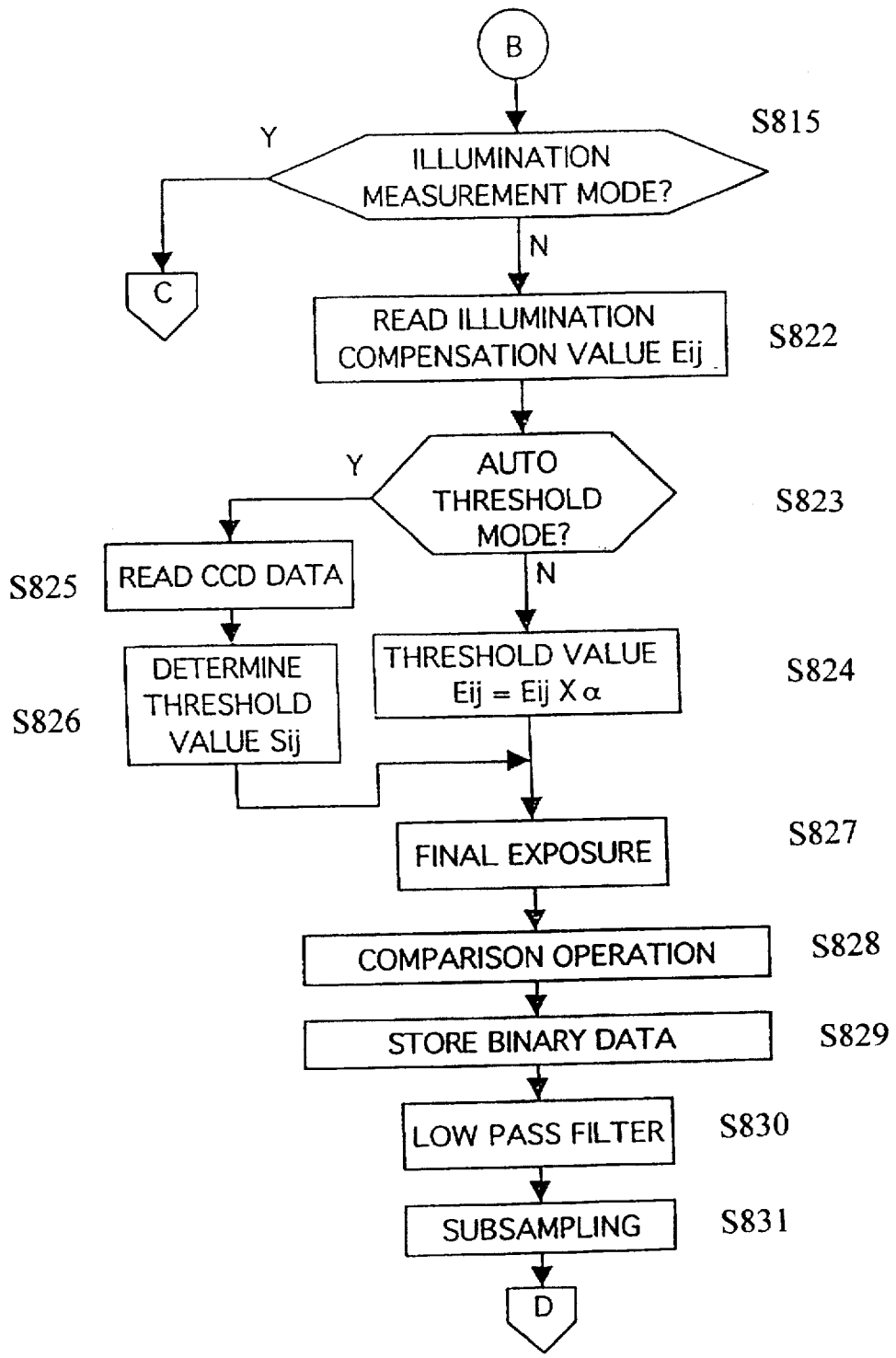
Figure 39D:
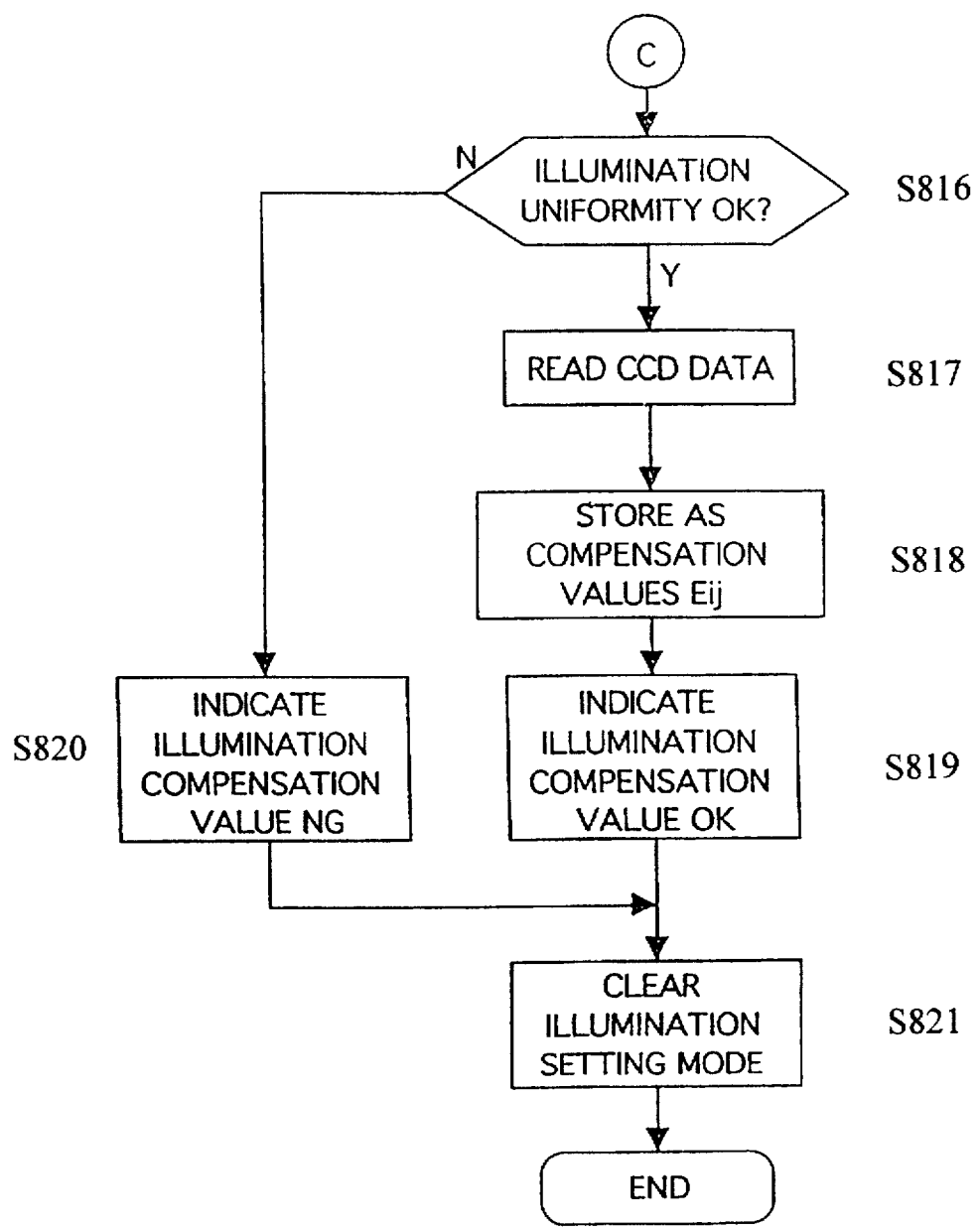
Figure 39E:
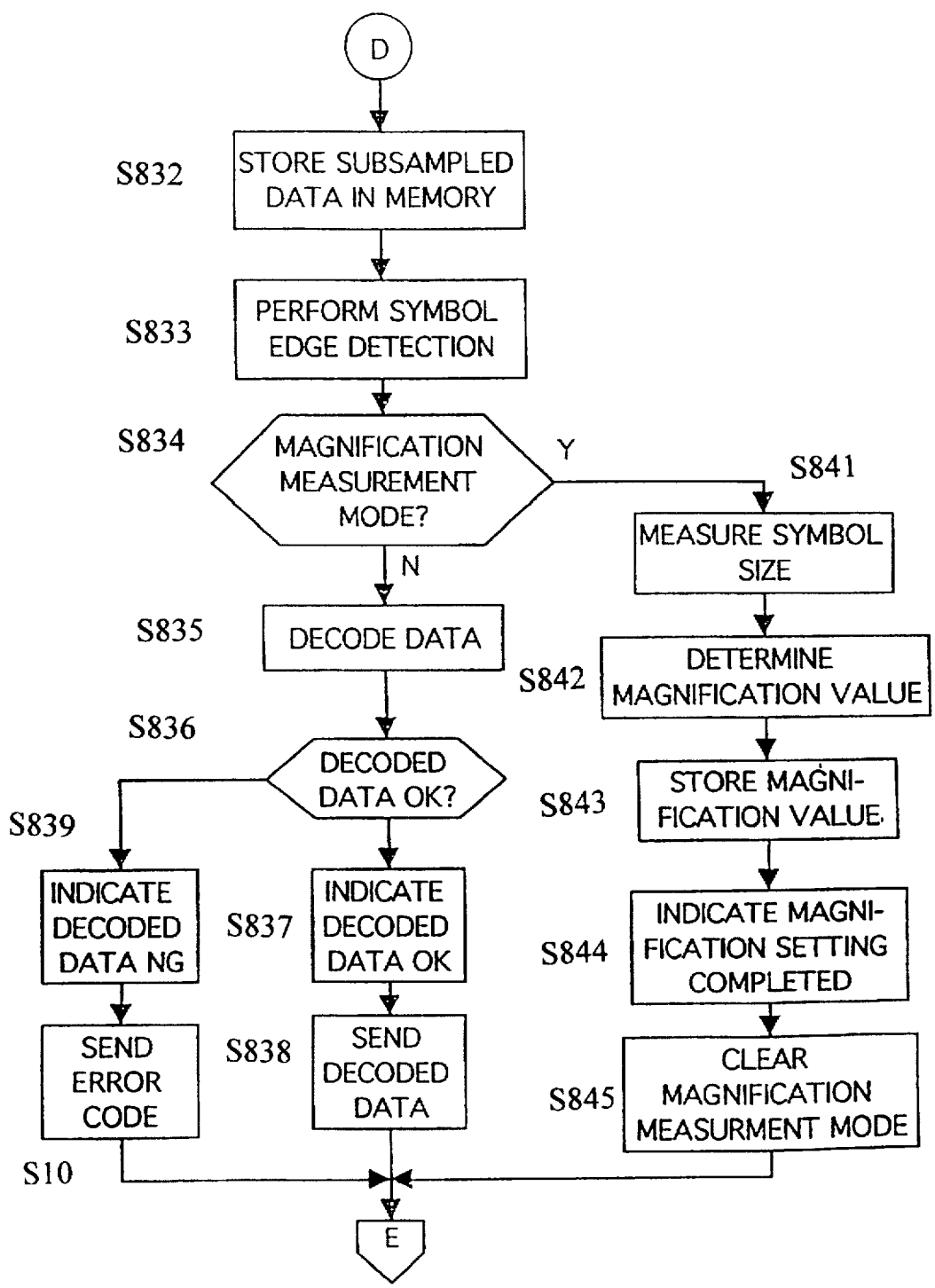
Figure 39F:
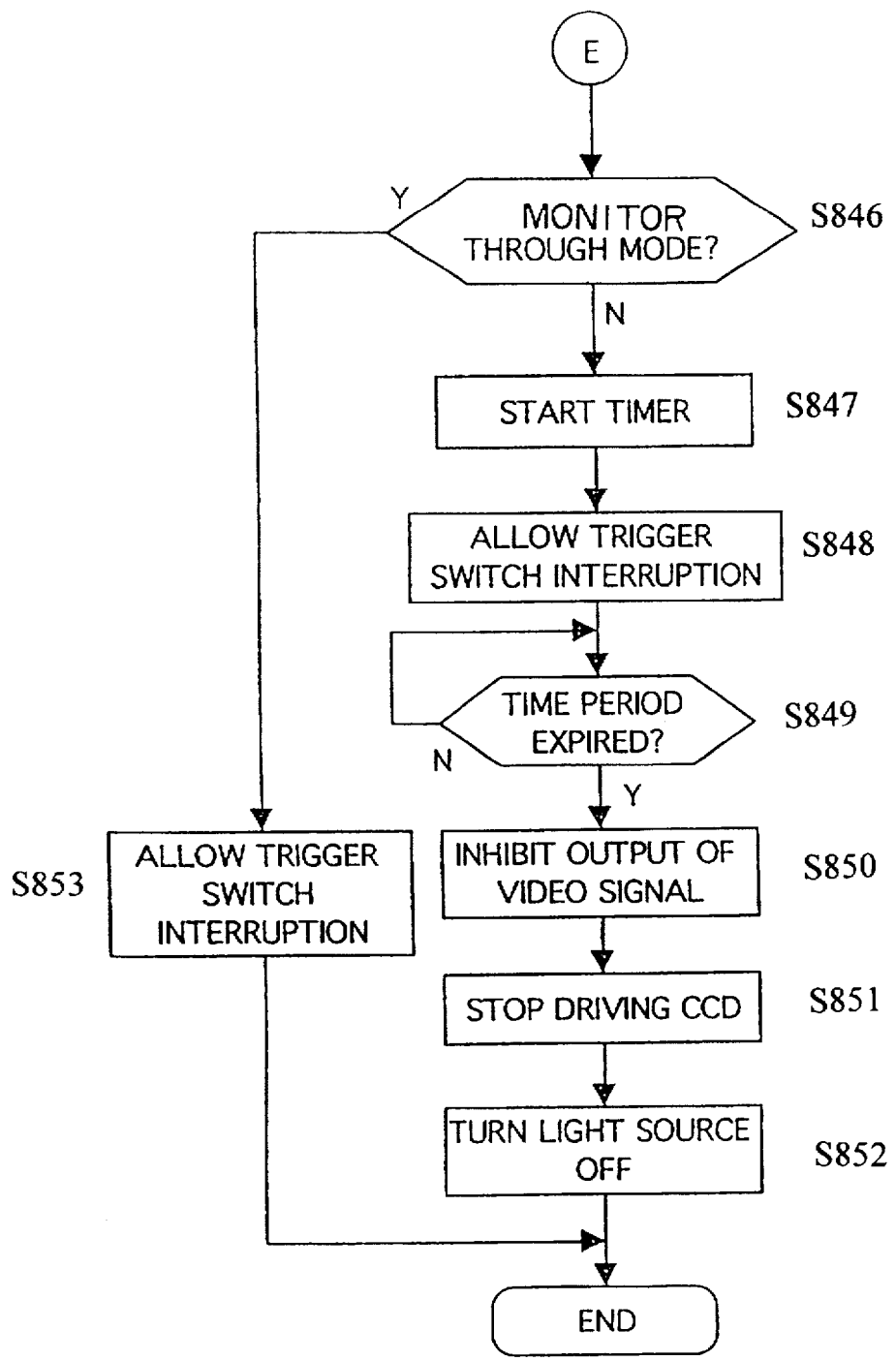

FIG. 38 is a flowchart illustrating a decoding procedure.

In the decoding procedure, an exclusive OR logical function is performed using the status of the image inversion detection switch 74 and the reverse picture command. Then the decoding of the lines is determined according to the XOR operation.

First, it is determined whether the image inversion detection switch 74 is on in step S701. Then, if the image inversion detection switch 74 is OFF (S701:Y), at step S702 it is determined whether the reverse picture command is received. If the reverse picture command is not received (S702:N), then the image reversal mode is set to OFF, and the direction of the auxiliary scanning is set to a normal direction in step S704.

If the reverse picture command is received (S702:Y), then the image reversal mode is set to ON, and the direction of the auxiliary scanning is set to a reverse direction in step S705.

If the image inversion detection switch 74 is turned ON in S701, then at step S703 it is determined whether the reverse picture command is received. If the reverse picture command is not received (S703:N) the image reversal mode is set to ON and the auxiliary scanning direction is set to the reverse direction to step S705.

If the reverse picture command is received, the image reversal mode is set to OFF, and the auxiliary scanning direction is set to a forward direction in step S704.

After step S704 or S705 is executed, data for determining the number of cells is executed in step S706. Thereafter, the size of the symbol is measured, the magnification value M of the optical system 44 stored in the non-volatile memory 13 is read out, and the size of the cell stored in the non-volatile memory 13 is read out. The number of the cells is then determined according to the equation (4).

Then, using the primary image data, the cell data is generated based on the number of the cells. Further, as described above, the data of the first four cells on the first line are read in a predetermined order, and the appropriate cell data is determined in step S707. Then the cell data is converted into decoded data.

As described above, the image data is not replaced in the memory, and the CCD 43 does not need to switch the addressing order when sending data to the memory. Further, the image does not need to be reversed. Furthermore, when the image data is read from the memory, sampling of the data is preformed such that one bit of data is output for each cell since the size of a cell is known.

The symbol reading device 1 according to the present invention reads the stored data out of the memory, according to four different scanning directions. Then a determination is made as to which of the read out data is correct.

For example, if the CCD 43 has a 500×500 pixel matrix, then the number of bits of data generated by the CCD 43 is 250,000. In the present embodiment, the 250,000 bits of pixel data is read once and converted to a small number of cell data (for example 20×20). This is stored in the memory and then read out according to the above described scanning directions. Since a small amount of data is read out of the memory the correct data can be determined quickly.

Further, without deciding whether the encoded data symbol is rotated, and regardless of whether the image is reversed, four types of image data having different scanning directions are obtained and the correct image data is selected. Accordingly, the symbol reading device 1 can be used for many tasks, and the processing speed is relatively high.

Next, the trigger switch 3 interruption procedure will be described with reference to the flowchart shown in FIGS. 39A, 39B, 39C, 39D, 39E and 39F.

The procedure starts when the trigger switch 3 of the symbol reading device 1 is turned ON.

In the trigger switch 3 interruption procedure, a subsequent interruption of the trigger switch is inhibited in step S801. Then, the integration interval $T_1$ of the CCD 43 is set in step S802. In step S803, the CCD 43 is driven by the CCD drive circuit 6. The light source 41a is turned ON by the light source drive circuit 42 in step S804, and transmission of the video signal to monitor 33 enabled, in step S805.

Then, as in the illumination measurement mode procedure, the exposure level is examined in step S806. If the exposure level not proper (S806:Y), then at step S807 it is determined whether the image is over exposed. If the image is over exposed (S807:Y), then the integration interval $T_1$ of the CCD 43 is shortened according to the equation:

$T_1 = T_1/\Delta T$ in step S808 where, $\Delta T > 1$.

Then, at step S809 it is determined whether $T_1 < T_s$. The value of $T_s$ represents the lower limit value of the integration interval, as described before. If $T_1 \geq T_s$ (S809:Y), control continues at step S806.

If the image is under exposed (S807:N), then the integration interval $T_1$ is lengthened according to the equation:

$T_1 = T_1 \times \Delta T$ in step S810 where, $\Delta T > 1$.

At step S811, it is determined whether $T_1 > T_L$. The value of $T_L$ represents the upper limit value of the integration interval, as described before.

If $T_1 \leq T_L$ (S811:Y), then control continues at step S806. If $T_1 < T_s$ (S809:Y), then $T_1$ is set to equal to $T_s$ in step S809A. Similarly, if $T_1 > T_L$ (S811:Y), then $T_1$ is set equal to $T_L$ in step S811A. Exposure NG is then indicated in step S812 to alert a user that a proper exposure cannot be made.

If at step S813 it is determined that the current mode is the illumination measurement mode, then at step S814 the mode is cleared and the trigger interruption procedure ends.

If at step S806 it is determined that the exposure is proper, then at step S815 it is determined whether the current mode is the illumination measurement mode. If the mode is the illumination measurement mode (S815:Y), then the uniformity of brightness is examined at step S816.

If the uniformity of brightness is acceptable at step S816, then the CCD image data is read out in step S817. In this step, the image signal is read out of the CCD 43 and is converted into a digital signal via the A/D converter 9. The digital image data is then transmitted to the CPU 15. The CCD image data is then stored as the brightness compensation values Eij in the compensation value storage area 13c of the non-volatile memory 13 (see FIG. 33). More specifically, the brightness compensation values Eij are data corresponding to the brightness of the background of the symbol reading area when no data symbol 38 is being read. For example, in the illumination measurement mode, the background is illuminated and the image data is obtained using an exposure time of $T_1$. The obtained image data is then stored in the compensation value storage area 13c of the non-volatile memory 13 (as described above).

Next, in step S819, the display unit 20 indicates that the brightness compensation values Eij have been stored in the non-volatile memory 13. The illumination measurement mode is then cleared in step S821.

In the illumination measurement mode, it is preferable to use a background which is to be used when the encoded data symbol 38 is read. However, a test chart may also be used to obtain accurate compensation values Eij, as described above.

If the brightness is not uniform (S816:N), an indication that the compensation values have not been stored, is made in step S820. The illumination measurement mode is then cleared in step S821.

If the mode is not the illumination measurement mode (S815:N), then the compensation values Eij that have already been stored in the storage area 13c of the non-volatile memory 13, are read in step S822.

Step S823 determines whether the current mode is the automatic threshold mode. If the mode is the automatic threshold mode (S823:Y), as described before, the image data of the CCD 43 is read in step S825. The threshold values Sij are then calculated from the CCD image data in step S826. More specifically, the threshold values Sij are set as an intermediate value (usually an average value) of data corresponding to two adjacent pixels at a border where the pattern of the encoded data symbol changes, the two adjacent pixels having different data (i.e., one is '1' and the other '0'). For the threshold values Sij corresponding to pixels having the same value (i.e., the pixels between the borders), the data calculated at the previous border is used. In other words, the calculated threshold values Sij are used for the other pixels until the threshold value of the next border is set.

If the mode is not the automatic threshold mode (i.e., the mode is the simplified threshold mode, S823:N), the threshold values Sij are obtained from the compensation values Eij. The threshold values Sij are proportional to the compensation values Eij according to the equation:

Sij=Eij×α; as shown in step S824, where a is a constant.

After the step S824 or S826 is completed, the main exposure is performed in step S827.

Then, in accordance with the threshold values Sij, the image signal obtained in the main exposure is converted into binary data in step S828. In step S829, the binary data is stored in the main memory 12 at predetermined addresses.

Next, as mentioned above, noise filtering is performed in step S830, and the sub-sampling operation is executed in step S831. In step S832, the sub-sampling data is stored in the main memory 12 at predetermined addresses. The symbol edge detection is then executed in step S833 based on the sub-sampled data.

At step S834 it is determined whether the current mode is the magnification measurement mode. If the mode is the magnification measurement mode (S834:Y), then the size of the symbol on the CCD 43 is measured in step S841. The magnification value M of the optical system 44 is then calculated in step S842.

In step S843, the magnification value M is stored in the non-volatile memory 13 at a predetermined address. Then the indication that the magnification has been measured is made in step S844, and then the magnification measurement mode is cleared in step S845.

However, if the mode is not the magnification measurement mode (S834:N) then the decoding procedure is performed on the binary data in step S835. The decoded data is then verified in step S836. If the decoded data is verified, then this is indicated in step S838, and the decoded data is output in step S838.

If the decoded data is not verified in step S836, then this is indicated in step S839, and an error code is output in step S840.

Control then proceeds to step S846 where it is determined whether the mode is the monitor through mode. If the mode is the monitor through mode (S846:Y), then a subsequent trigger interruption procedure is allowed in step S853. The trigger interruption procedure then ends.

However, if it is determined in step S846 that monitor through mode is not set, the timer of the CPU 15 is started in step S847. The trigger interruption procedure is then allowed in step S848.

Step S849 determines whether the timer has elapsed. If the time has elapsed (S849:Y), the transmission of the video signal to the monitor 33 is inhibited in step S850, the CCD drive circuit 6 then stops driving the CCD 43 in step S851, and the light source driving circuit 42 turns OFF the light source 41a in step S852.

According to the embodiment, the communication data is transmitted from the computer 32 through the interface circuit 69, in order to execute the proper settings and registration of commands. However, it is also possible to directly input the settings and the commands using an operation panel or switches. Further, in this embodiment the monitor 33 is external to the symbol reading device 1. However, a built-in monitor could also be provided.

The indication of various information is not limited to the display unit 20, but may also be performed by displaying characters or symbols on the monitor 33. The information may also be indicated by changing the brightness of color of an image seen on the monitor 33. Further, an audio indicator could be employed.

As shown in FIG. 1, the light projection unit 40 can be omitted. In this case, the illumination light is outputted by an external light source 56 controlled by an external light source driver 58 as shown in FIG. 23. Alternatively, the light source can be an ambient light.

The reading unit 4 is not limited to having the structure shown in FIG. 1. The reading unit 4 can be constructed such that the light passes through a symbol to be read. Further, the reading unit 4 can be independent of the other units.

The optical system 44 can be constructed such that the distance between the optical system 44 and the encoded data symbol 38 is variable, or fixed. The lens of the optical system 44 can be exchangeable. Further, an automatic focusing or zooming optical unit may be employed.

There are no limitations with respect to the shape of the symbol reading device 1. The symbol reading device 1 can be a portable (i.e., hand held) unit or a desk top unit.

The symbol reading device 1 can be used for general purposes, e.g., the desk top unit can be used for reading the product information on a production line in a factory.

As described above, the symbol reading device 1 according to the present invention reads a symbol and outputs a signal to external monitor 33. Further, three monitoring modes: through, cut and standby are provided to select whether the signal is to be displayed on the monitor.

The encoded data symbol reading device 1 reads the encoded data symbol 38, compares the data with threshold values Sij stored in memory 13, converts the serial data output by the comparator 10 to parallel data. The parallel data is then stored as 8-bit data in memory. The data is stored such that the address of the stored data corresponds to the horizontal and vertical synchronous signals generated by the synchronous generator. Thus, the pattern of data stored in the memory 12 resembles the pattern of actual data of each line scanned by the CCD 43.

The symbol reading device 1 also includes sample data stored in the memory 13. This is used to perform a self-test function, to confirm that he comparator 10, serial/parallel converter 11 and main memory 12 are all functioning normally. Further, the sample data can be used to give a demonstration of the functionality of the symbol reading device 1.

The symbol reading device 1 is not limited to the embodiments described above, but can include various modifications. For example, a wireless link could be used to connect the symbol reading device 1 to the external monitor 33 and computer 32.

The threshold values Sij are obtained by scanning a card having a uniform gray color across its entire surface. As described above, data for every eight pixel is stored in memory and used as the threshold values Sij for every eight pixels of a scanned symbol. However, fewer pixels could be stored as threshold values Sij, with each pixel being used as the threshold data Sij for more than eight pixels of scanned symbol 38, with minimum loss in accuracy. Further, threshold data Sij obtained for one field could be used for both fields when performing the scanning of the encoded data symbol Sij. This would reduce the memory requirements for storing the threshold values Sij, and thus reduce the cost of the encoded data symbol reading device 1.

Further, an 8-bit system has been illustrated, however, a system employing a more advanced CPU 15 having a word length of 16 bits or 32 bits can be employed. The memory 12 stores and 8-bit word, however, the word length is determined by the processor, the data bus 17 and the serial/parallel converter 11 and is therefore not limited to an 8-bit length.

In the above described embodiments, the output of the A/D converter 9 and the serial/parallel converter 11 are both 8-bits. This simplifies the design of the hardware required to construct the encoded data symbol reading device, since only one data bus configuration is necessary.

When the monitor through mode is selected, the light source 41a and CCD 43 are continuously driven. Since the light source 41a is primarily use to illuminate an encoded data symbol 38, the pressing of the trigger switch 3 can be used to activate the driving of the light source 41a. Therefore, the light source 41a is not continuously ON, and the power consumption of the encoded data symbol reading device 1 is reduced. Further, the symbol reading device 1 may be operated such that a video signal may be ON for only a short period of time, in case the standby mode is set, or only ON when the trigger switch 3 is pressed in the case of the monitor cut mode. Therefore, the utility of the symbol reading device according to the present invention is enhanced, and even though transmission of the video signal is inhibited after a predetermined interval using the monitor standby mode, the next symbol can be read without waiting, and power can be conserved.

Although the various embodiments of the symbol reading device disclosed herein operate in two monitoring modes (i.e., the monitor through mode in combination with either the standby mode or the cut mode), the symbol reading device can be constructed such that it can operate in all three monitoring modes. Such a three mode symbol reading device would include a mechanism (e.g., a switch or downloadable control codes) for changing the monitor operation modes.

The present disclosure relates to subject matters contained in Japanese Patent Applications HEI 5-090620, HEI 5-090621, HEI 5-090622, HEI 5-090623, HEI 5-090624, HEI 5-090625 (all filed on Mar. 25, 1993) and HEI 6-071575 (filed on Mar. 16, 1994), which are expressly incorporated herein by reference in their entirety.

What is claimed is:

1. An encoded symbol reader usable with a display for reading a two-dimensional encoded symbol, said encoded symbol reader being selectively operable at least in a monitor through mode and a monitor cut mode, said encoded symbol reader comprising:

an image reader that reads an image of said encoded symbol, said image reader outputting image data corresponding to said read image;

a processor that processes said output image data, said processing means outputting a video signal corresponding to said output image data; and monitor switching device that switches between said monitor through mode and said monitor cut mode, wherein when said encoded symbol reader operates in said monitor through mode, a predetermined data, along with said image of said encoded symbol, is displayed on the display, and wherein when said encoded symbol reader operates in said monitor cut mode, said image of said encoded symbol is not displayed on the display.

2. The encoded symbol reader according to claim 1, further comprising a light emitter that emits light to illuminate said encoded symbol, wherein when said encoded symbol reader operates in said monitor through mode, said light emitter is continuously ON, and wherein when said encoded symbol reader operates in said monitor cut mode, said light emitter is turned OFF after said predetermined operation.

3. The encoded symbol reader according to claim 1, wherein said image reader further outputs a control signal if one of said monitor through mode and said monitor cut mode is selected, said control signal indicating that output of said video signal is to be inhibited.

4. The apparatus according to claim 1, wherein said monitor cut mode inhibits output of said video signal.

5. The apparatus according to claim 1, wherein said monitor cut mode further comprises a standby mode, wherein said monitor cut mode inhibits output of said video signal, and said standby mode inhibits output of said video signal after a predetermined time interval has elapsed after said predetermined operation.

6. The apparatus of claim 1, further comprising a third operation mode, wherein when said encoded symbol reader operates in said third operation mode, said processor outputs said video signal until a predetermined time interval has elapsed after said predetermined operation has been executed, said output of said video signal being inhibited after said predetermined time interval has elapsed.

7. The apparatus of claim 6, wherein said image reader comprises a light source that illuminates said encoded symbol, wherein said light source is turned ON when said predetermined operation is triggered, and wherein said light source is turned OFF if said encoded symbol reader operates in said third operation mode and said predetermined interval has elapsed.

8. The apparatus of claim 6, wherein said image reader comprises an image receiving device, wherein said image receiving device is turned ON when said predetermined operation is triggered, and wherein said image receiving device is turned OFF if said encoded symbol reader operates in said third operation mode and said predetermined interval has elapsed.

9. The encoded symbol reader according to claim 1, further comprising a decoder that decodes said encoded symbol.

10. The encoded symbol reader according to claim 9, wherein when said encoded symbol reader operates in said monitor through mode, said decoder outputs first predetermined data if said encoded symbol is successfully decoded and outputs second predetermined data if said encoded symbol is not successfully decoded.

11. The encoded symbol reader according to claim 10, wherein said decoder outputs said first predetermined data and said second predetermined data to the display.

12. The encoded symbol reader according to claim 1, further comprising a memory that stores said image data, and wherein said image reader reads an imaging area, said image data stored in said memory being read from said imaging area.

13. The encoded symbol reader according to claim 12, wherein said memory stores two fields of said image data.

14. The encoded symbol reader according to claim 12, further comprising a generator that generates horizontal and vertical synchronous signals, said horizontal and vertical synchronous signals being used to determine an address of said memory where said image data is to be stored.

15. The encoded symbol reader according to claim 1, wherein said predetermined operation comprises the operation of decoding said electrical signal.

16. The encoded symbol reader according to claim 1, further comprising a trigger that triggers said predetermined operation.

17. The encoded symbol reader according to claim 1, wherein said video signal is output to a display for displaying an image.

18. The encoded symbol reader according to claim 1, wherein when said encoded symbol reader operates in said monitor cut mode, said processor outputs said video signal until a predetermined time interval has elapsed after said predetermined operation has been executed, said output of said video signal being inhibited after said predetermined time interval has elapsed.

19. The encoded symbol reader according to claim 18, wherein said image reader comprises a light source that illuminates said encoded symbol, wherein said light source is turned ON when said predetermined operation is triggered, and wherein said light source is turned OFF if said encoded symbol reader operates in said monitor cut mode and said predetermined interval has elapsed.

20. The encoded symbol reader according to claim 19, wherein said triggering of said predetermined operation is inhibited while said predetermined operation is being executed, and said triggering of said predetermined operation is permitted during said predetermined interval.

21. The encoded symbol reader according to claim 18, wherein said image reader comprises an image receiving device that receives an image, wherein said image receiving device is turned ON when said predetermined operation is triggered, and wherein said image receiving device is turned OFF if said encoded symbol reader operates in said monitor cut mode and said predetermined interval has elapsed.

22. The encoded symbol reader according to claim 21, wherein said triggering of said predetermined operation is inhibited while said predetermined operation is being executed, and said triggering of said predetermined operation is permitted during said predetermined interval.

23. An encoded symbol reader comprising:
    means for reading an image of an encoded symbol, said reading means outputting an electrical signal corresponding to said read image;
    means for processing said output electrical signal, said processing means outputting a video signal corresponding to said output electrical signal; and
    means for receiving data related to a mode of operation of said encoded symbol reader;
    wherein when said data receiving means receives data relating to a monitor through mode, said processing means outputs predetermined data that is superimposed on a display with said video signal until a predetermined period of time elapses, and when said data receiving means receives data relating to a monitor cut mode, said processing means is inhibited from outputting said video signal while said predetermined data is output.

24. An encoded symbol reader for reading a two-dimensional encoded symbol, said encoded symbol reader being operable at least in a monitor through mode and a monitor cut mode, said encoded symbol reader comprising:
    means for reading an image of said encoded symbol, said reading means outputting an electrical signal corresponding to said read image; and
    means for processing said output electrical signal, said processing means outputting a video signal corresponding to said output electrical signal;
    wherein when said encoded symbol reader operates in said monitor through mode, said processing means outputs predetermined data that is superimposed on a display with said video signal until a predetermined period of time elapses; and
    wherein when said encoded symbol reader operates in said monitor cut mode, said processing means is inhibited from outputting said video signal while said predetermined data is output.

25. The encoded symbol reader according to claim 24, wherein said processing means comprises a means for decoding said electrical signal, and said predetermined operation comprises the operation of decoding said electrical signal.

26. The encoded symbol reader according to claim 24, further comprising means for triggering said predetermined operation.

27. The encoded symbol reader according to claim 26, wherein said reading means comprises a light source that illuminates said encoded symbol, wherein said light source is turned ON when said predetermined operation is triggered, and wherein said light source is turned OFF if said encoded symbol reader operates in said monitor cut mode and said predetermined interval has elapsed.

28. The encoded symbol reader according to claim 27, wherein said triggering of said predetermined operation is inhibited while said predetermined operation is being executed, and said triggering of said predetermined operation is permitted during said predetermined interval.

29. The encoded symbol reader according to claim 26, wherein said reading means comprises an image receiving means, wherein said image receiving means is turned ON when said predetermined operation is triggered, and wherein said image receiving means is turned off if said encoded symbol reader operates in said monitor cut mode and said predetermined interval has elapsed.

30. The encoded symbol reader according to claim 29, wherein said triggering of said predetermined operation is inhibited while said predetermined operation is being executed, and said triggering of said predetermined operation is permitted during said predetermined interval.

31. The encoded symbol reader according to claim 24, wherein said video signal is output to means for displaying an image.

* * * * *